US010241505B2

(12) United States Patent
Cohen et al.

(10) Patent No.: US 10,241,505 B2
(45) Date of Patent: Mar. 26, 2019

(54) SYSTEM AND METHOD FOR PROVIDING OPTIMIZATION OR IMPROVEMENT MEASURES FOR ONE OR MORE BUILDINGS

(71) Applicant: Siemens Schweiz AG, Zurich (CH)

(72) Inventors: Henrik Cohen, Copenhagen (DK); Robert Gaertner, Oberaegeri (CH)

(73) Assignee: SIEMENS SCHWEIZ AG, Zurich (CH)

( * ) Notice: Subject to any disclaimer, the term of this patent is extended or adjusted under 35 U.S.C. 154(b) by 191 days.

(21) Appl. No.: 15/314,152

(22) PCT Filed: May 28, 2015

(86) PCT No.: PCT/EP2015/061916
§ 371 (c)(1),
(2) Date: Nov. 28, 2016

(87) PCT Pub. No.: WO2015/181338
PCT Pub. Date: Dec. 3, 2015

(65) Prior Publication Data

US 2018/0231967 A1 Aug. 16, 2018

Related U.S. Application Data

(60) Provisional application No. 62/003,928, filed on May 28, 2014.

(51) Int. Cl.
*G05B 15/02* (2006.01)
*G05B 23/02* (2006.01)
(Continued)

(52) U.S. Cl.
CPC ......... *G05B 23/0224* (2013.01); *G05B 15/02* (2013.01); *G05B 23/0208* (2013.01);
(Continued)

(58) Field of Classification Search
CPC ................ G05B 15/02; G05B 23/0208; G05B 23/0224; G05B 2219/2642; G06Q 10/06312; G06Q 50/06
See application file for complete search history.

(56) References Cited

U.S. PATENT DOCUMENTS 8,532,808 B2 9/2013 Drees et al. .................. 700/109
8,532,839 B2 9/2013 Drees et al. .................. 700/305
(Continued)

FOREIGN PATENT DOCUMENTS

AU 2010256694 B2 3/2015 ............. G05B 19/04
WO 2010/129913 A1 11/2010 ............ G06Q 10/00
(Continued)

OTHER PUBLICATIONS

Schein, Jeffrey et al., "A Rule-Based Fault Detection Method for Air Handling Units," Energy and Buildings, vol. 38, pp. 1485-1492, Apr. 2, 2006.

(Continued)

*Primary Examiner* — Bryan Bui
(74) *Attorney, Agent, or Firm* — Slayden Grubert Beard PLLC

(57) ABSTRACT

A computer-facilitated method and a computerized system for providing optimization or improvement measures for one or more buildings are disclosed. Based on asset data regarding the building and on corresponding performance data, improvement measures related to a consumable resource in the one or more buildings are determined using a computer system configured for analyzing the asset data and the respective corresponding performance data based on internal and/or external key performance indicators and rules provided by a database.

23 Claims, 25 Drawing Sheets

(51) Int. Cl.
*G06Q 10/06* (2012.01)
*G06Q 50/06* (2012.01)

(52) U.S. Cl.
CPC ....... *G06Q 10/06312* (2013.01); *G06Q 50/06* (2013.01); *G05B 2219/24048* (2013.01); *G05B 2219/2642* (2013.01); *Y02P 90/845* (2015.11)

(56) References Cited

U.S. PATENT DOCUMENTS

| | | | | |
|---|---|---|---|---|
| 8,600,556 | B2 | 12/2013 | Nesler et al. | 700/275 |
| 8,731,724 | B2 | 5/2014 | Drees et al. | 700/276 |
| 8,755,943 | B2 | 6/2014 | Wenzel | 700/276 |
| 8,788,097 | B2 | 7/2014 | Drees et al. | 700/275 |
| 8,843,238 | B2 | 9/2014 | Wenzel et al. | 700/277 |
| 9,069,338 | B2 | 6/2015 | Drees et al. | |
| 9,196,009 | B2 | 11/2015 | Drees et al. | |
| 9,286,582 | B2 | 3/2016 | Drees et al. | |
| 9,298,203 | B2 | 3/2016 | Wenzel | |
| 9,322,566 | B2 | 4/2016 | Wenzel et al. | |
| 9,348,392 | B2 | 5/2016 | Drees et al. | |
| 9,429,927 | B2 | 8/2016 | Nesler et al. | |
| 9,727,068 | B2 * | 8/2017 | Kamel | G01R 21/1333 |
| 2010/0324741 | A1 | 12/2010 | House et al. | 700/278 |
| 2011/0047418 | A1 | 2/2011 | Drees et al. | 714/57 |
| 2013/0134962 | A1 | 5/2013 | Kamel et al. | 324/103 R |
| 2015/0112497 | A1 * | 4/2015 | Steven | G06Q 50/06 700/291 |

FOREIGN PATENT DOCUMENTS

| | | | | |
|---|---|---|---|---|
| WO | 2010/141601 | A2 | 12/2010 | G06F 3/14 |
| WO | 2013/089782 | A2 | 6/2013 | G06Q 50/06 |
| WO | 2015/181338 | A1 | 12/2015 | G06Q 10/06 |

OTHER PUBLICATIONS

International Search Report and Written Opinion, Application No. PCT/US2015/032949, 10 pages, dated Aug. 12, 2015.

* cited by examiner

FIG 12

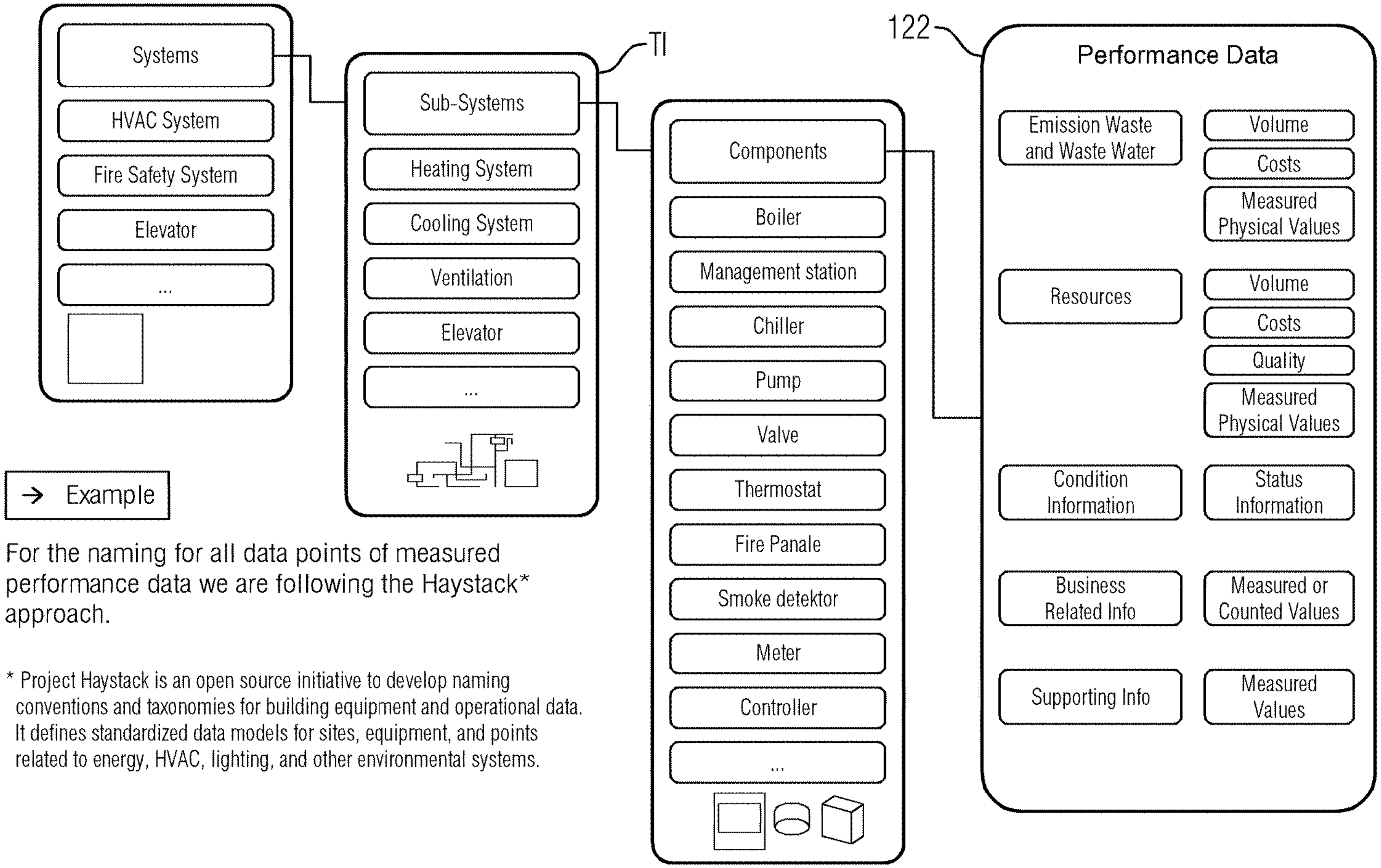

For the naming for all data points of measured performance data we are following the Haystack* approach.

* Project Haystack is an open source initiative to develop naming conventions and taxonomies for building equipment and operational data. It defines standardized data models for sites, equipment, and points related to energy, HVAC, lighting, and other environmental systems.

| Entity | Identifier |
|---|---|
| Company | 1001 |
| Site | 1001-1 |
| Building | 1001-1-1 |
| System | 1001-1-1-System-1 |
| HVACSystem | 1001-1-1-System-1-HVAC |
| AHU (1) | 1001-1-1-System-1-HVAC-AHU-1 |
| OccupiedMode | 1001-1-1-System-1-HVAC-AHU-1.OCCUPIEDMODE |
| Fan | 1001-1-1-System-1-HVAC-AHU-1-FAN |
| FanStatus | 1001-1-1-System-1-HVAC-AHU-1-FAN -STATUS |
| Sensor (SupplyAirTemperature) | 1001-1-1-System-1-HVAC-AHU-1-SENSOR.SUPPLYAIRTEMP |
| Sensor (ReturnAirTemperature) | 1001-1-1-System-1-HVAC-AHU-1-SENSOR.RETURNAIRTEMP |
| Sensor (MixedAirTemperature) | 1001-1-1-System-1-HVAC-AHU-1-SENSOR.MIXEDAIRTEMP |
| Sensor (OutsideAirFlowVolume) | 1001-1-1-System-1-HVAC-AHU-1-SENSOR.OUTSIDEAIRFLOWVOLUME |
| Sensor (SupplyAirFlowVolume) | 1001-1-1-System-1-HVAC-AHU-1-SENSOR.SUPPLYAIRFLOWVOLUME |
| Sensor (ReturnAirHumidity) | 1001-1-1-System-1-HVAC-AHU-1-SENSOR.RETURNAIRHUMIDDITY |
| SupplyAirTemperatureSetpoint | 1001-1-1-System-1-HVAC-AHU-1-SUPPLYAIRTEMPSETPOINT |
| AHU (2) | 1001-1-1-System-1-HVAC-AHU-2 |
| ...same structure as AHU (1) | ...using now prefix with 1001-1-1-System-1-HVAC-AHU-2 |
| AHU (3) | 1001-1-1-System-1-HVAC-AHU-3 |
| ...same structure as AHU (1) | ...using now prefix with 1001-1-1-System-1-HVAC-AHU-3 |
| Sensor (OutdoorAirTemperature) | 1001-1-1-System-1-HVAC-SENSOR.OUTDOORAIRTEMP |
| Sensor (OutdoorAirHumidity) | 1001-1-1-System-1-HVAC-SENSOR.OUTDOORAIRHUMIDITY |

Where:
- OAD = Outside Air Damper
- RAD = Return Air Damper
- RAT = Return Air Temperature
- MAT = Mixed Air Temperature
- OAT = Outside Air Temperature
- SAT = Supply Air Temperature
- SATSP = Supply Air Temperature Setpoint
- STPT = Setpoint
- HHV = Hot water Heating Valve
- CCV = Chilled water Cooling Valve

FIG 21

ITS ISP

| Inputs -Time Series | | Inputs - Static parameters | |
|---|---|---|---|
| MODE | Heating/Economizer/ Cooling Mode (To be calculated in step 1) | DT.SFAN | Termerature rise across supply fan (default = 10°F, adjustable) |
| MAT | Mixed Air Temp (°F) | EPSILON.T | Threshold for errors in temperature measurements (default =-20°F, adjustable) |
| SATSP | Supply Air Temp Setpoint (°F) | T.ECON.HI.LMT | Economizer high limit temperature () (default = 70°F, adjustable) |
| OAT | Outside Air Temp (°F) | T.ECON.LO.LMT | Economizer low limit temperature () (default = 45°F, adjustable) |
| SFS | Supply Fan Status | ELECT.RATE | The electric utility energy rate in S/kWh (default = 0.06S/kWh, adjustable) |
| OCC | Unit Occupied Mode Status | | |
| SAFLOW | Supply Airflow (cfm) | | |
| OAFLOW | Outside Airflow (cfm) | | |
| SAT | Supply Air Temp () | | |
| OARH | Outside air relative humidity (percent, 0-100%) | | |
| RARH | Return air relative humidity (percent, 0-100%) | | |
| RAT | Return Air Temp () | | |
| AVE.PLANT. KW.PER.TON | The average plant kW/ton of the chiller plant (take as constant value 0.9 kW/ton) | | |

FIG 23

| | Code (MC) | Mode (MD) | Mode Rule (MR) |
|---|---|---|---|
| M0 | 0 | Unoccupied | OCC=OFF (Following modes OCC=ON) |
| M1 | 1 | Heating | MAT<SATSP-DT.SFAN<br>And<br>OAT T.ECON.LO.LMT |
| M2 | 2 | Cooling with outdoor air only (100% Economizer) | T.ECON.LO.LMT OAT T.ECON.HI.LMT<br>And<br>MAT SATSP-DT.SFAN |
| M3 | 3 | Mechanical cooling with 100% outdoor air (Economizer with cooling) | T.ECON.LO.LMT OAT T.ECON.HI.LMT<br>And<br>MAT SATSP-DT.SFAN |
| M4 | 4 | Mechanical cooling with minimum outdoor air | OAT >T.ECON.HI.LMT<br>And<br>MAT SATSP-DT.SFAN |
| M5 | 5 | Unknown Occupied Modes(s) | |

Where:
OCC = Unit Occupied Mode Status
MAT = measured or calculated mixed air temperature
SATSP = supply (coil discharge) air temperature setpoint
OAT = outside air temperature (sensor)
DT.SFAN = temperature rise across supply fan (e.g.2°F)
T.ECON.LO.LMT = low limit temperature for economizer operation
T.ECON.HI.LMT = high limit temperature for econmizer operation

SYSTEM AND METHOD FOR PROVIDING OPTIMIZATION OR IMPROVEMENT MEASURES FOR ONE OR MORE BUILDINGS

CROSS-REFERENCE TO RELATED APPLICATIONS

This application is a U.S. National Stage Application of International Application No. PCT/EP2015/061916 filed May 28, 2015, which designates the United States of America, and claims priority to U.S. Provisional Application No. 62/003,928 filed May 28, 2014, the contents of which are hereby incorporated by reference in their entirety.

TECHNICAL FIELD

This application relates to the field of resource management of one or more buildings.

BACKGROUND

The energy & sustainability market for buildings has evolved significantly over the past ten years. Energy performance, operational efficiency and sustainability solutions for buildings and infrastructures of such buildings are important topics nowadays. Building owners and building operators are striving to achieve sustainability, energy-consumption and cost-reduction targets, while facing: resource and capital constraints, lack of internal in-depth energy knowledge, aging infrastructure, and constantly changing energy market.

International patent application WO2010141601A2 provides methods for integrating multiple management domains based on sensed conditions received from multiple management domains and furthermore displaying information indicative of the sensed conditions and actions related to consumable resources.

The management of energy is the combination of actions taken to maximize energy efficiency and optimize energy supply without sacrificing occupant needs and comfort. To achieve these building performance goals, actions may include reducing end use, increasing efficiency, eliminating wasted energy, finding alternative energy sources and minimizing procurement costs. Energy management also involves managing the availability of energy and its long-term financial impact. This often includes the strategic selection of alternative energy technologies and facility location. When no energy management strategies are in place, consumption remains unchanged and energy prices are left exposed to market variability and uncertainty. As a result, the organization incurs higher operating costs and risk.

SUMMARY

One embodiment provides a computer-facilitated method for providing optimization or improvement measures for one or more buildings, the method comprising: receiving first asset data corresponding to assets of a category 1 in the one or more buildings, wherein the assets of the category 1 include at least one of the one or more buildings, components within such buildings, or at least one space within such buildings and wherein the first asset data comprises information regarding the location of the assets of category 1; receiving second asset data corresponding to assets of a category 2 in the one or more buildings, wherein the assets of the category 2 comprise at least one of the components within the technical infrastructure of such buildings and the second asset data comprises information regarding said technical infrastructure components; receiving third asset data of assets of a category 3 in the one or more buildings, wherein the assets of the category 3 comprise one or more spaces within such buildings and the third asset data comprises information regarding the physical structure of such one or more spaces; receiving performance data of the assets of category 1 and/or category 2 and/or category 3, wherein the performance data comprising operating data, usage data, and sensed data; and determining, based on the first, the second, and the third asset data and on the performance data, improvement measures related to a consumable resource in the one or more buildings by using a computer system configured for analyzing the asset data and the respective performance data based on internal and/or external key performance indicators and rules.

In one embodiment, the assets of category 1 comprise information regarding the country and/or the state and/or the county and/or the city and/or the site and/or the address of the one or more buildings and/or information regarding some or all of the local networks for traffic, electricity distribution, water distribution and gas distribution and/or regarding some or all of the local building service providers or replacement building component suppliers and/or regarding some or all of the local services for waste disposal or waste water removal.

In one embodiment, the assets of category 2 regarding the technical infrastructure comprise information regarding the equipment for climate control, and/or access control, and/or energy supply and control, and/or security and/or fire safety and/or computers and/or printers and/or mobile phones of the one or more buildings.

In one embodiment, the assets of category 3 regarding the physical building structure comprise information regarding the structural level and/or the number and structure of the floors and/or the plant layout of the one or more buildings.

In one embodiment, the asset data comprise: quantities, and/or types, and/or parametrization and/or configuration data of the respective assets.

In one embodiment, the consumable resource is waste, sewage water, water, air, energy, electrical power, gas, or oil.

In one embodiment, the performance data are received in a resolution in between 1 and 60 minutes, in particular in a resolution in between 1 and 15 minutes.

In one embodiment, determining improvement measures is performed in a resolution in between 1 and 15 minutes.

In one embodiment, the improvement measures are tracked in a resolution in between 1 and 15 minutes.

In one embodiment, the performance data comprise: building control system data, and/or electricity metering, and/or heat metering, and/or water metering, and/or temperatures, and/or humidity, and/or pressure, and/or events, and/or alarms, and/or status, and/or weather, and/or prices, and/or data from other buildings.

In one embodiment, the improvement measures are derived from an improvement measure catalogue or database, comprising all improvement areas or aspects of buildings.

In one embodiment, the rules are based on expert knowledge from energy engineers and/or data analysts, and wherein the rules are provided in a comprehensive rules library.

In one embodiment, the asset data and/or the performance data and/or the improvement measures are displayed on an output device, especially in form of dashboards, especially by using animated widgets.

In one embodiment, the improvement measures comprise demand and supply side measures.

In one embodiment, the improvement measures comprise: replacement of assets (e.g. air ducts, boilers, dampers, lamps, HVAC equipment, chillers, boilers) and/or changing the operation modus of an asset.

In one embodiment, the method further comprises providing dedicated actions regarding to the consumable resource, based on the improvement measures, especially in form of a project plan (milestones, actions, responsibilities, etc.).

In one embodiment, the assets of category 2 comprise at least one ventilator drive that is operatively connected to a ventilator, and damper drives that are operatively connected to dampers, such ventilators and dampers being integrated into interconnected air ducts of the building, the performance data of the assets of category 2 comprise an indication of the energy consumption of the ventilator drive and indications of the positions of the dampers, the asset data of the assets of category 2 comprise the air flow capacity and energy consumption specifications of such ventilators and comprise air flow capacity specifications of such dampers, the internal and/or external key process indicators comprise the indicated energy consumption of the ventilator drive at various position indications of the dampers, as well as the energy consumption specifications of the ventilator, the rules are appropriate for concluding increased flow resistance in a specific air duct section and/or for concluding ventilator or damper impediment, and the improvement measures comprise accordingly recommending inspection of ventilator, ventilator drive, damper, damper drive or air duct section, and/or induce replacement thereof.

In one embodiment, the external key performance indicators are provided by NIST (National Institute of Standards and Technology).

In one embodiment, the improvement measures comprise adjusting the settings and/or configurations of dedicated actors and/or sensors in the one or more buildings.

Another embodiment provides a computer-readable medium containing a set of instructions that causes a computer to perform any of the methods disclosed above.

Another embodiment provides a computer program product loadable into the memory of a digital computer comprising software code portions for performing any of the methods disclosed above when said product is run on a computer.

Another embodiment provides a system for providing optimization or improvement measures for one or more buildings, the system comprising: a unit for receiving first asset data corresponding to assets of a category 1 in the one or more buildings, wherein the assets of the category 1 include at least one of the one or more buildings, components within such buildings, or at least one space within such buildings and wherein the first asset data comprises information regarding the location of the assets of category 1; a unit for receiving second asset data corresponding to assets of a category 2 in the one or more buildings, wherein the assets of the category 2 comprise at least one of the components within the technical infrastructure of such buildings and the second asset data comprises information regarding said technical infrastructure components; a unit for receiving third asset data of assets of a category 3 in the one or more buildings, wherein the assets of the category 3 comprise one or more spaces within such buildings and the third asset data comprises information regarding the physical structure of such one or more spaces; a unit for receiving performance data of the assets of category 1 and/or category 2 and/or category 3, wherein the performance data comprising operating data, usage data, and sensed data; and a unit for determining, based on the first, the second, and the third asset data and on the performance data, improvement measures related to a consumable resource in the one or more buildings by using a computer system configured for analyzing the asset data and the respective performance data based on internal and/or external key performance indicators and rules.

In one embodiment, the units are realized by using computerized means.

In one embodiment, assets of category 2 comprising: equipment for climate control, and/or air ducts, and/or dampers, and/or lamps, and/or chillers, and/or boilers, and/or controllers, and/or building management system and/or access control, and/or energy supply and control, and/or security or fire safety.

Another embodiment provides a computer-implemented method for providing optimization or improvement measures for one or more buildings, the method comprising: receiving at a computer connection data concerning the one or more buildings, wherein the connection data at least comprise information regarding the location of the one or more buildings and/or regarding the local networks for traffic, electricity distribution or gas distribution and/or regarding local service providers or replacement component suppliers for the infrastructure of the building; receiving at the computer infrastructure data concerning the one or more buildings, wherein the infrastructure data at least comprise information regarding systems of the one or more buildings for heating, ventilating or cooling, for access control, for intrusion detection, for fire detection, for lighting, for elevator control, for electricity distribution, for electricity generation, or for heat collection; receiving at the computer structural data concerning the one or more buildings, wherein the structural data at least comprise information regarding the orientation of the one or more buildings, or regarding the building envelope, in particular the materials, such as glass or concrete, with their properties, such as heat flow resistance, heat capacity or sound transmission, or regarding the inner structure, such as walls, rooms and their designated intended use, doors, stairs or elevators; storing the connection data, the infrastructure data, and the structural data in a memory device accessible by the computer; receiving at the computer performance data associated in each case with the connection data, the infrastructure data, or the structural data, or subsets of these data, wherein the performance data comprise at least lifecycle data of a device or a part thereof, utility usage data or sensed comfort data; and determining by the computer, based on the connection data, the infrastructure data, the structural data and the performance data, improvement measures related to at least one consumable resource in the one or more buildings, wherein the computer uses key performance indicators and rules.

In one embodiment, the improvement measures are determined by regression analysis, in particular the least squares method.

In one embodiment, the infrastructure data comprise information regarding the location of system components.

In one embodiment, the information regarding the inner structure comprises information regarding computers, copy machines, printers, coffee machines, refrigerator, or other white goods, in particular their location in the one or more buildings.

In one embodiment, the performance data are received at the computer in a time resolution higher than 60 minutes.

In one embodiment, the performance data are received at the computer in a time resolution in between 1 and 15 minutes.

In one embodiment, the improvement measures comprise adding and/or adjusting and/or replacing an infrastructure system component.

In one embodiment, at least one of the improvement measures reduces the consumption of at least one consumable resource in the one or more buildings.

In one embodiment, the resource is water, air, electrical power, gas, oil, organic waste for heating or sewage water for cooling.

In one embodiment, receiving of the connection data, the infrastructure data, the structural data, and of the performance data, and providing of the improvement measures is accomplished by a web portal.

In one embodiment, the method further comprises displaying information indicative to the improvement measure related to the respective consumable resource on a suitable output device.

In one embodiment, the method is performed in a web-based service platform or in a management system, in particular a building management system.

Another embodiment provides a service provisioning system, in particular a web-based platform, for providing optimization or improvement measures for one or more buildings, the system comprising: a first interface for receiving connection data concerning the one or more buildings, wherein the connection data at least comprise information regarding the location of the one or more buildings and/or regarding the local networks for traffic, electricity distribution or gas distribution and/or regarding local service providers or replacement component suppliers for the infrastructure of the building; receiving infrastructure data concerning the one or more buildings, wherein the infrastructure data at least comprise information regarding systems of the one or more buildings for heating, ventilating or cooling, for access control, for intrusion detection, for fire detection, for lighting, for elevator control, for electricity distribution, for electricity generation, or for heat collection; and receiving at the computer structural data concerning the one or more buildings, wherein the structural data at least comprise information regarding the orientation of the one or more buildings, or regarding the building envelope, in particular the materials, such as glass or concrete, with their properties, such as heat flow resistance, heat capacity or sound transmission, or regarding the inner structure, such as walls, rooms and their designated intended use, doors, stairs or elevators; a memory device for storing the connection data, the infrastructure data, and the structural data; a second interface for receiving performance data associated in each case with the connection data, the infrastructure data, or the structural data, or subsets of these data, wherein the performance data comprise at least lifecycle data of a device or a part thereof, utility usage data or sensed comfort data; and a computer for determining improvement measures related to at least one consumable resource in the one or more buildings, based on the connection data, the infrastructure data, and the structural data and on the performance data, or on subsets of these data, wherein the computer comprises a rules engine configured for analyzing and/or assessing the connection data, the infrastructure data, the structural data, and the respective performance data, or subsets of these data, based on internal and/or external key performance indicators and rules.

In one embodiment, the system further comprises an output device for displaying in particular information indicative to the improvement measures related to a consumable resource, in particular to predicted consequences of applying the improvement measures to the consumable resource, in particular in a defined time frame.

In one embodiment, the performance data are received and processed at the system in a resolution higher than 60 minutes, in particular in a resolution higher than 15 minutes.

In one embodiment, the system is part of a management system, in particular of a building management system.

BRIEF DESCRIPTION OF THE DRAWINGS

Example aspects and embodiments are described below with reference to the drawings, in which:

FIG. 12 illustrates an example for structuring technical infrastructure and related performance data that may be employed by the service platform system in accordance with disclosed embodiments of the present invention;

FIG. 19 illustrates on the left hand side an exemplary data model for asset data regarding a building to which rules for providing improvement measures shall be applied, and on the right hand side the mapping of the exemplary data model into a suitable implementation tree-structure;

FIG. 21 illustrates a table comprising the input parameters of the NIST APAR Rule 5 “Outside air temperature to warm for economic cooling”;

FIG. 23 illustrates a table depicting exemplary modes for operating an air handling unit and rules assigned to the respective modes;

DETAILED DESCRIPTION

Figure 1:
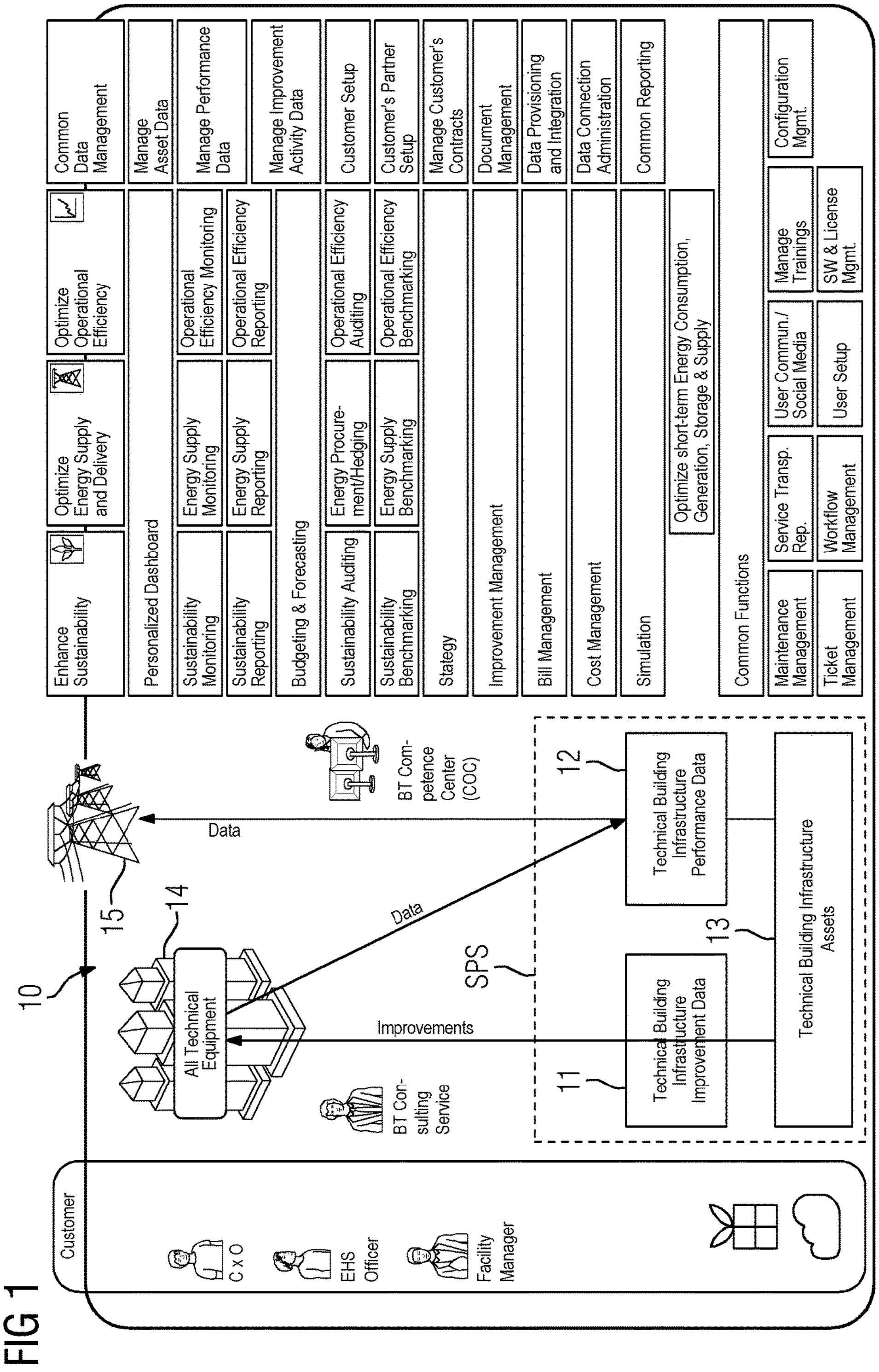
FIG. 1 illustrates an exemplary schematic overview diagram of a management system that depicts various aspects and embodiments of the present invention, where a service platform system that may be employed in the management system is shown in conjunction with various application modules that may be implemented in the service platform system.

Embodiments of the present invention provide resource-saving mechanisms for operating a building, e.g., for building owners and/or building operators.

Some embodiments provide methods and systems for efficient and effective energy management for one or more buildings. Further objects of certain embodiments are to increase operational efficiency and sustainability, and to optimize energy supply for the one or more buildings.

One embodiment provides a computer-facilitated method for providing optimization or improvement measures for one or more buildings, the method comprising:

receiving first asset data corresponding to assets of a category 1 in the one or more buildings, wherein the assets of the category 1 include at least one of the one or more buildings, components within such buildings, or at least one space within such buildings and wherein the first asset data comprises information regarding the location of the assets of category 1;

receiving second asset data corresponding to assets of a category 2 in the one or more buildings, wherein the assets of the category 2 comprise at least one of the components within the technical infrastructure of such buildings and the second asset data comprises information regarding said technical infrastructure components;

receiving third asset data of assets of a category 3 in the one or more buildings, wherein the assets of the category 3 comprise one or more spaces within such buildings and the third asset data comprises information regarding the physical structure of such one or more spaces;

receiving performance data of the assets of category 1 and/or category 2 and/or category 3, wherein the performance data comprising operating data, usage data, and sensed data;

determining, based on the first, the second, and the third asset data and on the performance data, improvement measures related to a consumable resource in the one or more buildings by using a computer system configured for analyzing the asset data and the respective performance data based on internal and/or external key performance indicators (KPIs) and rules, advantageously provided by a database, in particular by an expert database. Advantageously the key performance indicators (KPIs) and rules are represented in the database by using an object model with data structures and relations between data structures. This method provides an integrated approach for an “end-to-end” solution that combines supply- and demand-side offerings to meet all of the energy and sustainability needs of building owners or building operators. The integrated approach is flexible and scalable, so it can be tailored to the customer’s individual situation. Advantageously receiving asset and performance data is accomplished by conventional network-connections. Advantageously the method is implemented in a management system (e.g. a building management system) or in a web-based service provisioning platform. Customers (e.g. building owners or building operators) can interconnect with the service provisioning platform to receive dedicated improvement measures.

Key performance indicators (KPIs) e.g. can be derived from historical data and often comprise benchmarks which, when will be fulfilled, ensure e.g. lowering the consumption of a resource in the one or more buildings. Key performance indicators (KPIs) for operation buildings efficiently can also be acquired from a third party (e.g. a governmental agency).

The systems available nowadays are restricted either to asset management or to performance data management of buildings. Today's asset management systems are using as performance data only highly aggregated data (e.g. in monthly or daily resolution). On the other hand the existing performance data management systems are using only time series related assets for specific data points (e.g. meters, sensors) and do not comprise overall building infrastructure asset data.

An advantage of at least some embodiments involves the combination of a comprehensive asset management system with a comprehensive performance data management system based on a fine granularity of the performance data. This enables to provide benchmarking and/or improvement measures for a holistic building performance optimization.

In a first embodiment the assets of category 1 comprise information regarding the country and/or the state and/or the county and/or the city and/or the site and/or the address of the one or more buildings. Considering the location of the one or more buildings allows that current and actual situations and conditions e.g. regarding the current weather conditions at the location or regarding the current energy prices in the respective area can be taken into account.

In a further embodiment the assets of category 2 regarding the technical infrastructure comprise information regarding the equipment for climate control (HVAC), and/or access control, and/or energy supply and control, and/or security and/or fire safety and/or computers and/or printers and/or mobile phones of the one or more buildings. The information regarding the technical infrastructure of the one or more buildings comprises passive data (e.g. types and quantities of employed systems, subsystems, components) and respective setting data. Advantageously the information regarding the technical infrastructure is represented in an appropriate data model e.g. according to Industry Foundation Classes (IFC).

In a further embodiment the assets of category 3 regarding the physical building structure comprise information regarding the structural level and/or the number and structure of the floors and/or the plant layout of the one or more buildings. The information regarding the physical building structure comprises layout and space data of the respective buildings. A space has e.g. a size (in square meter), a volume (in cubic meter) and spatial dimensions (in x/y/z coordinates). Furthermore space consumes heat and has temperature. These kinds of information are also important to provide goal-oriented improvement measures for the respective buildings. Advantageously physical characteristics of the building itself are used to determine dedicated improvement measures. Physical characteristics of a building can be e.g. building material (of walls, of doors, etc.), heat flow resistance through walls.

In a further embodiment the asset data comprise: quantities, and/or types, and/or parametrization and/or configuration data of the respective assets. For the handling (in particular receiving, transmitting, and processing) of asset data respective suitable unities or entities (e.g. interfaces, hardware modules, or software modules) can be used.

In a further embodiment the consumable resource is waste, sewage water, water, air, energy, electrical power, gas, or oil. Reducing the consumption of the consumable resources is a proper way to safe costs on customer side. Furthermore reducing the consumption of the consumable resources is way to additive environmental protection.

In a further embodiment the performance data are received in a resolution in between 1 and 60 minutes, in particular in a resolution in between 1 and 15 minutes. This enables a fast response to customer requests with dedicated improvement measures IM for the customer.

In a further embodiment determining improvement measures is performed in a resolution in between 1 and 15 minutes. This enables a just in time response to customer needs.

In a further embodiment the improvement measures are tracked in a resolution in between 1 and 15 minutes. This enables to track the quality and efficiency of deployed improvement measures. Based on this tracked improvement measures further and/or other improvement measures can be provided for the customer.

In a further embodiment the performance data comprise: building control system data, and/or electricity metering, and/or heat metering, and/or water metering, and/or temperatures, and/or humidity, and/or pressure, and/or events, and/or alarms, and/or status, and/or weather, and/or prices, and/or data from other buildings (provided internally and/or externally). The more performance data are taken into account, the more dedicated and goal-oriented the improvement measures can be provided for a respective customer (e.g. building owner or building operator).

In a further embodiment the improvement measures are derived from an improvement measure catalogue or database, comprising all improvement areas or aspects of buildings. Collecting and administering improvement measures in a catalogue or database ensures e.g. an efficient best practice sharing.

In a further embodiment the rules are based on expert knowledge from energy engineers and/or data analysts, and wherein the rules are provided in a comprehensive rules library. Based on the rules library for example Case-Based Reasoning (CBR) can be used as methodology or tool to determine suitable improvement measures in an efficient way.

In a further embodiment the asset data and/or the performance data and/or the improvement measures are displayed on an output device, especially in form of dashboards, especially by using animated widgets. Advantageously the dashboard is provided as web-based platform collecting, processing, monitoring, analyzing, reporting and dashboarding all kinds of measured/metered data as well as alarms/events from buildings, energy data from meters and utilities, environmental, waste data from customer as well as weather data from geological institutes incl. cost calculation for any kind of relevant media.

In a further embodiment the improvement measures comprise demand and supply side measures. E.g. shortages or surpluses of respective consumable resources can be taken into account when determining improvement measures.

In a further embodiment the improvement measures comprise: replacement of assets (e.g. air ducts, boilers, dampers, lamps, HVAC equipment, chillers, boilers) and/or changing the operation modus (e.g. demand flow, optimized schedules, better control programs) of an asset. The improvement measures can comprise tangible and concrete tasks regarding actions in the field. These actions can be assigned to responsible persons e.g. in the framework of a project.

In a further embodiment the method further comprises: providing dedicated actions regarding to the consumable resource, based on the improvement measures, especially in form of a project plan. A project plan includes milestones, actions, responsibilities, etc. This means that decided tasks can be assigned to responsible persons who have to accomplish the respective task in a controllable and traceable timeframe. Advantageously the dedicated actions are provided to the customer (e.g. building owner or building operator) via a conventional communication connection (e.g. Internet, Intranet). For example the dedicated actions can be presented on customer side on a suitable control & monitoring station of a building automation system. Advantageously the dedicated actions are applied directly to the respective equipment or installation of the building to be analyzed. For instance by directly adjusting an actor, and/or a sensor, and/or a controller on customer side.

In a further embodiment the assets of category 2 comprise at least one ventilator drive that is operatively connected to a ventilator, and damper drives that are operatively connected to dampers, such ventilators and dampers being integrated into interconnected air ducts of the building,

- wherein the performance data of the assets of category 2 comprise an indication of the energy consumption of the ventilator drive and indications of the positions of the dampers,
- wherein the asset data of the assets of category 2 comprise the air flow capacity and energy consumption specifications of such ventilators and comprise air flow capacity specifications of such dampers,
- wherein the internal and/or external key process indicators comprise the indicated energy consumption of the ventilator drive at various position indications of the dampers, as well as the energy consumption specifications of the ventilator,
- wherein the rules are appropriate for concluding increased flow resistance in a specific air duct section and/or for concluding ventilator or damper impediment,
- whereas the improvement measures comprise accordingly recommending inspection of ventilator, ventilator drive, damper, damper drive or air duct section, and/or induce replacement thereof. This describes an exemplary scenario for applying the present invention.

In a further embodiment the external key performance indicators (KPIs) are provided by NIST (National Institute of Standards and Technology). Publicly accessible key performance indicators (KPIs) and rules which are provided by governmental authorities are a sound and comprehensive base for determining improvement measures.

In a further embodiment the improvement measures comprise adjusting the settings and/or configurations of dedicated actors and/or sensors in the one or more buildings. Actors belong to the physical equipment of a building and are used for instance to control or change the comfort and the climate within the building. For instance actors (e.g. a motor) are used to change the position of blinds, or to change the intensity of light within the building (e.g. by using a dimmer), or to change the temperature within the building (e.g. by using a thermostat). Actors can be activated manually or automatically by controllers by using corresponding sensors. The controllers can be used in an open loop control operating mode and/or closed loop control operating mode. Advantageously the improvement measures comprise adjusting the settings and/or configurations of the controllers of affected actors. Furthermore a determined improvement measure can be that the sensitivity of a sensor is changed. Furthermore a determined improvement measure can be that in a heating installation of a building the heating curve and/or the preheating temperature are adjusted.

Further embodiments of the invention are a non-transient computer-readable medium (e.g. CD, SSD or USB stick) and computer program product (e.g. a program module written in an adequate programming language, e.g. C++, Java) comprising instructions for performing the inventive method for providing optimization or improvement measures for one or more buildings. The computer-readable medium and the computer program product having program segments for, when executed on a computer device, causing the computer device (e.g. workstation, desktop computer, Laptop, tablet) to implement the inventive method. The computer program product is directly or indirectly loadable into the memory of a digital computer.

Computer readable media can be any available media that can be accessed by a computer. By way of example, and not limitation, computer readable media can exemplary comprise computer storage media and communication media. Computer storage media comprises volatile and non volatile as well as removable and non-removable media implemented in any method or technology for storage of information such as computer readable instructions, data structures, program modules or other data. Computer storage media for example comprises RAM, ROM, EEPROM, flash memory or other memory technology, CDROM, digital versatile disks (DVD) or other optical disk storage, or any other medium which can be used to store the desired information and which can be accessed by a computer.

Another embodiments provides a system (e.g. computer system) for providing optimization or improvement measures for one or more buildings, the system comprising:

- a unit for receiving first asset data corresponding to assets of a category 1 in the one or more buildings, wherein the assets of the category 1 include at least one of the one or more buildings, components within such buildings, or at least one space within such buildings and wherein the first asset data comprises information regarding the location of the assets of category 1;
- a unit for receiving second asset data corresponding to assets of a category 2 in the one or more buildings, wherein the assets of the category 2 comprise at least one of the components within the technical infrastructure of such buildings and the second asset data comprises information regarding said technical infrastructure components;
- a unit for receiving third asset data of assets of a category 3 in the one or more buildings, wherein the assets of the category 3 comprise one or more spaces within such buildings and the third asset data comprises information regarding the physical structure of such one or more spaces;
- a unit for receiving performance data of the assets of category 1 and/or category 2 and/or category 3, wherein the performance data comprising operating data, usage data, and sensed data;
- a unit for determining, based on the first, the second, and the third asset data and on the performance data, improvement measures related to a consumable resource in the one or more buildings by using a computer system configured for analyzing the asset data and the respective performance data based on internal and/or external key performance indicators (KPIs) and rules provided by a database, in particular by an expert database.

Advantageously the inventive system is implemented in a management system (e.g. a building management system) or as a service platform system which is realized as a cloud based platform, wherein the infrastructure and/or the platform and/or the software programs (or parts of the infrastructure or of the platform or of the software) are provided by a cloud service provider. Advantageously the performance data are received in a resolution in between 1 and 60 minutes, in particular in a resolution in between 1 and 15 minutes. This reduces the time a building is operated inefficiently especially regarding energy costs.

In a further embodiment the units are realized by using computerized means. The units can be realized by software and/or hardware modules. This enables that the inventive service platform system can be realized as a scalable system providing different possible stages of extension, according to the respective service provider needs and/or possible customer needs.

In a further embodiment the asset data comprising: quantities, and/or types, and/or parametrization and/or configuration data. Most of the asset data are changing infrequently or are static for a longer time period.

In a further embodiment the assets of category 2 comprising: equipment for climate control (HVAC), and/or air ducts, and/or dampers, and/or lamps, and/or chillers, and/or boilers, and/or controllers, and/or building management system and/or access control, and/or energy supply and control, and/or security or fire safety. Advantageously the assets of category 2 comprise all kinds or types of technical infrastructure or equipment which is used for operating and/or operating a building.

The object is further achieved by a computer-implemented method for providing optimization or improvement measures for one or more buildings, the method comprising:

- receiving at a computer connection data concerning the one or more buildings, wherein the connection data at least comprise information regarding the location of the one or more buildings and/or regarding the local networks for traffic, electricity distribution or gas distribution and/or regarding local service providers or replacement component suppliers for the infrastructure of the building;
- receiving at the computer infrastructure data concerning the one or more buildings, wherein the infrastructure data at least comprise information regarding systems of the one or more buildings for heating, ventilating or cooling, for access control, for intrusion detection, for fire detection, for lighting, for elevator control, for electricity distribution, for electricity generation, or for heat collection;
- receiving at the computer structural data concerning the one or more buildings, wherein the structural data at least comprise information
- regarding the orientation of the one or more buildings, or
- regarding the building envelope, in particular the materials, such as glass or concrete, with their properties, such as heat flow resistance, heat capacity or sound transmission, or
- regarding the inner structure, such as walls, rooms and their designated intended use, doors, stairs or elevators;
- storing the connection data, the infrastructure data, and the structural data in a memory device accessible by the computer;
- receiving at the computer performance data associated in each case with the connection data, the infrastructure data, or the structural data, or subsets of these data, wherein the performance data comprise at least lifecycle data of a device or a part thereof, utility usage data or sensed comfort data;
- determining by the computer, based on the connection data, the infrastructure data, the structural data and the performance data, improvement measures related to at least one consumable resource in the one or more buildings, wherein the computer uses key performance indicators (KPIs) and rules. The method provides a comprehensive approach to determine dedicated improvement measures for efficiently operating the one or more buildings by taking into account various aspects, in particular aspects with relationship to the location and surroundings (e.g. local service providers, local utilities) of the one or more buildings.

In a further embodiment the improvement measures are determined by regression analysis, in particular the least squares method. Statistical methods for analyzing and predicting facts can be easily implemented by commercial off the shelf (COTS) software programs.

Another embodiments provides a service provisioning system, in particular a web-based platform, for providing optimization or improvement measures for one or more buildings, the system comprising:

- a first interface
  - for receiving connection data concerning the one or more buildings, wherein the connection data at least comprise information regarding the location of the one or more buildings and/or regarding the local networks for traffic, electricity distribution or gas distribution and/or regarding local service providers or replacement component suppliers for the infrastructure of the building;
  - for receiving infrastructure data concerning the one or more buildings, wherein the infrastructure data at least comprise information regarding systems of the one or more buildings for heating, ventilating or cooling, for access control, for intrusion detection, for fire detection, for lighting, for elevator control, for electricity distribution, for electricity generation, or for heat collection;
  - for receiving at the computer structural data concerning the one or more buildings, wherein the structural data at least comprise information

- regarding the orientation of the one or more buildings, or
- regarding the building envelope, in particular the materials, such as glass or concrete, with their properties, such as heat flow resistance, heat capacity or sound transmission, or
  - regarding the inner structure, such as walls, rooms and their designated intended use, doors, stairs or elevators;
- a memory device for storing the connection data, the infrastructure data, and the structural data;
- a second interface for receiving performance data associated in each case with the connection data, the infrastructure data, or the structural data, or subsets of these data, wherein the performance data comprise at least lifecycle data of a device or a part thereof, utility usage data or sensed comfort data;
- a computer for determining improvement measures related to at least one consumable resource in the one or more buildings, based on the connection data, the infrastructure data, and the structural data and on the performance data, or on subsets of these data, wherein the computer comprises a rules engine configured for analyzing and/or assessing the connection data, the infrastructure data, the structural data, and the respective performance data, or subsets of these data, based on internal and/or external key performance indicators (KPIs) and rules. The connection data, the infrastructure data, and the structural data can also be received by separate interfaces. The connection data, the infrastructure data, the structural data, and the performance data can also be received by a common interface.

In a further embodiment the system further comprises an output device for displaying in particular information indicative to the improvement measures related to a consumable resource, in particular to predicted consequences of applying the improvement measures to the consumable resource, in particular in a defined time frame. A user can observe the impact of an improvement measure over time in a graphical animation.

The suggested integrated approach to energy & sustainability provided by the management system embodiments disclosed herein in accordance with features and aspects of the present invention will maximize energy efficiency, minimize utility expense and enhance the sustainability of such buildings. Because buildings consume 41% of energy worldwide and produce 21% of $CO2$ emissions, reductions in building energy usage have a substantial impact on an organization's carbon footprint. The integrated approach employed by the disclosed embodiments of management systems is flexible and scalable, so it can be tailored to the customer's individual situation.

In one embodiment, the integrated approach comprises several phases or aspects:

Strategy & Planning

Developing actionable, strategic plans that meet customer's (e.g. building owners) legislative and corporate mandates and energy and sustainability goals. The phase begins with transparency with the energy and sustainability totals of the customer's one or more buildings and infrastructure components before the integrated approach employed by the disclosed embodiments of present invention are provided; this phase results in an understanding of where the respective customer is today and the generation of a corresponding baseline recognized by the disclosed embodiments of management systems for implementing the integrated approach described in detail herein (the "Baseline").

During this phase, identifying the customer's return on investment and funding requirements may also be a factor captured as part of the Baseline.

Evaluation & Assessment

Using the established strategies and plans as a guide, it is possible to identify improvement areas, financial options and available utility incentives and then calculate the financial metrics (collectively "Assessments") via management systems disclosed herein. Improvement areas comprise e.g. spaces or areas of a building, or technical areas (heating, ventilation, etc.) of the building or building management areas (e.g. selection of energy supplier).

Such Assessments become the roadmap for program implementation for management systems suited towards the customer's one or more buildings in accordance with the disclosed embodiments.

Program Implementation

Program implementation of such management systems consistent with features and aspects of the present invention enable tracking and tracing records (e.g. logged historical asset data and respective performance data), delivering the respective projects and solutions on time, within budget and at the quality level the respective customer needs.

Ongoing Services & Optimization

By continually improving the Baseline, management systems consistent with the present invention as disclosed herein maintain or exceed the customer's investment return goals. Advantageously a backward and forward capability history is strong proof to stick with a customer for the life of his buildings and infrastructure.

Measurement & Reporting

Deploying information management technology via management systems consistent with the present invention ensures savings goals are met and further improvements are identified. Features and/or deliverables of such management systems comprise monitoring, measuring/quantifying and reporting on performance of identified assets of the customer's buildings.

Throughout each of the five phases, continuous data analysis may be conducted via management systems consistent with the present invention to advantageously deliver value to the respective customers.

In order to deliver optimal results for the customer (e.g. building owner or building operator or Facility Manager), an important integration between energy efficiency, energy supply and sustainability must take place in each of the five phases.

To achieve the above mentioned building performance goals, a management system consistent with the present invention employs computer equipment (e.g. processor(s), input/output devices, memory, communication infrastructure such as or including the Internet) with respectively configured software (e.g. word processor(s), spreadsheet(s), database(s)) as described in further detail herein.

Advantageously, each database employed in the management systems may be an in-memory database and/or optimized for time series handling.

The conventional management systems available nowadays are restricted either to asset management or to performance data management. Today's asset management systems are using as performance data only highly aggregated data (e.g. in monthly or daily resolution).

On the other hand, conventional performance data management systems typically use only time series related assets for specific data points (e.g. meters, sensors) and do not comprise overall building infrastructure asset data.

An advantage of the invention is provided in the disclosed management systems that include a combination of a comprehensive asset management system with a comprehensive performance data management system based on a fine granularity of the performance data. This enables the management system to provide or generate benchmarking and/or improvement measures for a holistic building performance optimization.

A combined asset management and performance data management system for providing optimization measures for one or more buildings comprises advantageously following functionality. This functionality is provided by a computerized system having suitable hardware (input devices, output devices, data storage media, processing means, communication means, etc.) and software (rule engine, dash-boarding, data analytics, etc.).

Advantageous functionality and/or business functions for providing optimization measures for one or more buildings are:

Dashboarding

Detailed Description:

Dashboard view: A compilation of data visualizations that present key performance indicators in a simplistic navigational environment.

Widget: A relatively simple and easy to use mini-application that is a component of a larger software application.

Standard dashboard view: A standardized view of widgets that can be designed by country admins and assigned to customers. Customer users would not be able to edit the standard dashboard view because they are not the respective owner.

Personalized dashboard view: A customized view according to customer needs and/or preferences.

This business function visualizes data in different graphical formats. It covers the following areas

- Predefined visualization elements (e.g. pie charts, histogram, . . . )
- Configuration of which data is visualized in which format
  - Store this configuration (views) for different uses (global, internal, role-specific, customer-specific)
  - Edit/Delete views; Visualize views
  - Users can configure their own preferred views and save as standard or additional views
- Drill-down/filtering on data; add data to visualization, e.g. forecast to measured data
- Selection of units and conversion between units
- Visualize alerts, recommendations, and activities
- Data Input:
- Performance data
  - All data in all formats and types
- Asset data
  - All data in all formats and types
- Improvement activity data
  - Improvement Goals
  - Applied Improvements
  - Improvement Execution
- Scheduling data
  - All data
- Service Performance Data
- Data Output:
- Views (i.e. Charts, Widgets, Maps)
- Strategy
- Detailed Description:

This business function supports to the definition of a customer strategy and the goals/objectives that are to be achieved, identifies the current condition vs. the objectives to show the "Gap" that requires management attention, identifies and prioritizes actions, services and projects that can be undertaken to achieve the objectives, and ultimately serves to help visualize the strategy.

- Aspects Regarding the Strategy:
- Capturing and analysis of initial situation: Provide resource consumption, cost and emission overviews by various views (organization, region, building/production etc.) and drill-down by area (building, production, transport, supply chain, travel and others) and by resource type (energy, water, air, . . . )
  - Capture and store data
  - Select relevant KPIs from KPI catalogue
  - Analyze performance of selected assets
  - Manage KPI catalogue
  - Establish a Baseline condition
- Definition of targets and selection of improvement areas
  - Break down sustainability and energy targets (e.g. in terms of cost, consumption, carbon emissions, capital investment (constraints) and risk associated with achieving the objectives)
  - Gap analysis: Compare Baseline condition with strategic goals
- Identify improvement opportunities and build implementation plan
  - Access and select typical performance improvement areas
  - Build scenarios including confidence intervals: Show impact of scenario and visualize through abatement curves
  - Create and manage improvement programs
  - Create and manage improvement projects
  - Initialize Measurement & Verification and continuous monitoring and assessment (function Monitoring)
- Document scope of scenario (e.g. list of included optimization measures, investments required by country/organization, etc.)
  - Create proposal documents
  - Alignment with customer service packages
- Remarks:
- It's critical that all components of the strategy for supply, demand (operational efficiency) and carbon emissions be able to be linked and visualized but that there is not a requirement to link all elements (i.e. it can be tailored to the customer needs and interests and does not become cumbersome to apply)
- One of the key overarching design considerations should be to create a strategy module that links supply, demand and sustainability and creates a world class visualization of the strategy and implementation to support strategic relationships and customer buy-in.
- Data Input:
- Performance data
  - Resources and Emissions: Volume & Costs; Historical, Forecasted, Target/Budget & Benchmark Values
  - Business related Info: Measured or Counted Quantities; Historical & Target/Budget Values
  - Supporting information (prices, weather, . . . )
  - Business relevant information (occupation, . . . )
  - Overall cost, consumption, carbon or sustainability goals or commitments
- Asset data
  - Company, site, building, . . . system, sub-system
  - Overlay
- Improvement Activity Data:
  - Improvement Catalogue including building usage/occupancy and production process opt. measures
- KPI catalogue
- Data Output:
- Asset and performance data stored in the database
- Overall cost, consumption, carbon or sustainability goals or commitments
- KPI catalogue
- Improvement programs/projects/measures
- Configurable documents in MS Word format containing compare graphs of assets, Baseline condition, improvement targets, improvement potential, scenario information, abatement curves, improvement programs/projects/measures
- Potential Roles Using this Functionality:
- Energy Consultant
- Sustainability Consultant
- Sales persons
- Facility Manager
- Business Manager
- Financial Manager/CxO
- Chief Sustainability Officer (CSO)
- Sustainability Manager
- EHS/Compliance Manager
- Improvement Management
- Detailed Description:

This business function provides the following functionality for the service groups sustainability, energy supply and operational efficiency Create improvement programs and projects
Add and customize improvement measures
Track improvement measures implementation
Track improvement measures to verify performance improvements
Generate reports
Manage improvement measures catalogue
Provide a high level program overview
Data Input:
Performance data
Asset data
Improvement Activity Data: Improvement Catalogue including building usage/occupancy and production process opt. measures
Data Output:
Customized improvement measures and projects
Reports in MS Word, PDF, Excel or online Reporting
Improvement measure templates
Potential Roles Using this Feature:
Energy Consultant
Sustainability Consultant
Energy Engineers (On-Site)
Energy Engineers (Remote)
Facility Manager
Real Estate Manager
Business Manager
Site Manager
Plant Manager
Sustainability Manager
EHS/Compliance Manager
Energy Efficiency Monitoring
Detailed Description:

This business function supports continuously monitoring of performance data and the generation alerts for the purpose of optimizing operational efficiency. It comprises the following steps Calculate KPIs (Key Performance Indicators) based on performance data and assets
Compare KPIs and trend data to historical data and existing budget values; Identify out of the ordinary events/KPIs/trends
Create rules to identify out-of-ordinary events, trends, patterns, thresholds etc.
Alert the user about such events/KPIs/trends by displaying alarms/warnings or dashboards views
Examples for Operational Efficiency KPI are:
Alarms by buildings
Average downtime
Data Input:
Performance data
Resources: Volume & Costs; Historical, Forecasted & Target/Budget Values
Business related Info: Measured or Counted Quantities; Historical & Target/Budget Values
Supporting information (weather, prices,
Asset data
Data Output:
Performance data
Condition Information: Event
KPIs relevant to operational efficiency
Energy Supply Monitoring
Detailed Description:

This business function monitors energy supply data and generates alerts for the purpose of enhancing energy supply situation. The overall objective is to provide an analysis and monitoring tool that enables our operations and procurement team to flag anomalies in our energy supply data, focus our resources on issues/opportunities associated with those anomalies thereby providing more value to the customer, better customer service and higher degree of confidence while improving Siemens resource efficiency.

Typical use cases are
Calculate KPIs based on energy supply data
Calculate trends for energy market prices for all relevant energy market indices and/or availability, cost and quality (i.e. reactive power) of own on-site generated energy
Compare KPIs and trend data to historical data and existing budget/forecast values; Identify out of the ordinary events/KPIs/trends (for energy supply cost and volume)
Check current/future market prices against customer defined values and/or risk management policy (e.g. in order to trigger a specific procurement or hedging action for a customer)
Create rules to identify out-of-ordinary events, trends, patterns, thresholds etc.
Alert the user about such events/KPIs/trends by displaying alarms/warnings and enable certain customizable alerts for proactive customer notification
Examples for Energy Supply KPI are:
Cost of MWh of energy (electricity, gas, oil, others)
Share of renewable energy
Energy price volatility market versus own
Data Input:
Performance Data
Utility bill data
Energy supply contract data
Risk policy information
Resources: Energy costs & volume (measured at customer site (meter) and provided by utility (invoices))
Prices—energy market price data
Historical, Forecasted, Target/Budget, and Benchmark values
Asset data
Data Output:
Condition Information: Events, alerts & triggers for actions
KPIs relevant to energy supply
Potential Roles Using this Function:
Consultants, account managers and analysts in BT Competence Center
Energy buyers
Risk Management
Real Estate Mgr
Facility Mgr
Business Mgr
Site Mgr
Plant Mgr (Factory Responsible)
Supply chain manager (Energy procurement)
Corporate energy manager
Financial Manager/CFO
Sustainability Monitoring
Detailed Description:

This business function supports continuously monitoring of performance data and the generation alerts for the purpose of optimizing sustainability. It comprises the following steps Calculate sustainability KPIs based on performance data and assets
Compare KPIs and trend data to historical data and existing budget values; Identify out of the ordinary events/KPIs/trends
Create rules to identify out-of-ordinary events, trends, patterns, thresholds etc.

Alert the user about such events/KPIs/trends by displaying alarms/warnings or dashboards views Examples for Sustainability KPI are:

GHG per sqm, per employee, per bed (hotel, hospital), production unit

Water liter per sqm, per employee, per bed (hotel, hospital), production unit

Waste kg per sqm, per employee, per bed (hotel, hospital, production unit)

Data Input:

Performance data

Emissions: Volume & Costs; Historical, Forecasted & Target/Budget Values

Resources: Volume & Costs; Historical, Forecasted & Target/Budget Values

Business related Info: Measured or Counted Quantities; Historical & Target/Budget Values Asset data Data Output:

Performance data

Condition Information: Event

KPIs relevant to sustainability

Potential Roles Using this Function:

Consultants in BT Competence Center

Chief Sustainability Officer (CSO)

Sustainability Managers

EHS Organization

Facility Manager

Energy Efficiency Reporting

Detailed Description:

A report shows a static overview of selected values and information (e.g. problems, consumption, generation, storage) of all media, time series and external contents. Reports can be displayed as screens (e.g. HTML) or as documents (e.g. PDF, DOCX)

Generates screens or electronic documents for presenting local and enterprise wide building operation information, e.g. specific report on energy consumption and energy generation. Aggregates and shows financial figures related to energy usage/saving or maintenance for a whole enterprise/one site There are 3 different kinds of reporting types:

1. Generic, fix formatted standard reports for specific use cases
2. Freely configurable ad hoc reports
3. Documents including bigger portion of text content and have to be conform to legal, national or customer guidelines Examples are:

Energy Flow Diagram: Showing an overview of the energy flows of the current situation or based on historical data (e.g. Sankey Diagram)

Reports an Overview of Control Performance efficiency KPI's normalized for all vendors includes non BT-disciplines (elevators, . . . )

KPI's are not all technical consider people flow, occupancy, core process

Examples for Operational Efficiency KPI are:

Alarms by buildings

Average downtime

Data Input:

Performance data

Resources: Volume, Costs & Quantity; Historical, Forecasted & Target/Budget,

Benchmark Values Condition Information: Condition Values

Historical, Forecasted & Target/Budget, Benchmark Values

Business related Info: Measured or Counted Quantities; Historical, Forecasted & Target/Budget, Benchmark Values Asset data Improvement Activities Data Data Output:

Reports as widgets or documents with graphs and tables relevant to operational efficiency Energy Supply Reporting Detailed Description:

A report shows a static overview of selected values and information (e.g. problems, consumption, generation, storage) of all media, time series and external contents. Reports can be displayed as screens (e.g. HTML) or as documents (e.g. PDF, DOCX)

Generates screens or electronic documents for presenting local and enterprise wide building operation information.

Aggregates and shows financial figures related to energy usage/saving or maintenance for a whole enterprise/one site There are 3 different kinds of reporting types:

1. Generic, fix formatted standard reports for specific use cases
2. Freely configurable ad hoc reports
3. Documents including bigger portion of text content and have to be conform to legal, national or customer guidelines Examples are:

Report a compilation of all energy costs, energy consumption and energy generation.

Data Input:

Performance data

Resources

Volume, Costs, Physical quantities

Historical, Forecasted, Target/Budget, Benchmark values

Asset data: Buildings, Overlay

Improvement activity data

Contract Data

Data Output:

Reports as widgets or documents with graphs and tables relevant to operational efficiency.

Sustainability Reporting

Detailed Description:

A report shows a static overview of selected values and information (e.g. problems, consumption, generation, storage) of all media, time series and external contents. Reports can be displayed as screens (e.g. HTML) or as documents (e.g. PDF, DOCX)

Generates screens or electronic documents for presenting enterprise wide emissions and environmental information (e.g. all types of energy, water, waste and air). Allow to compare/select from different calculation/segmentation methods (e.g. GRI, CDP, Kyoto etc.)

There are 3 different kinds of reporting types:

1. Generic, fix formatted standard reports for specific use cases
2. Freely configurable ad hoc reports
3. Documents including bigger portion of text content and have to be conform to legal, national or customer guidelines Examples are:

Reports showing the environmental compliance of a whole enterprise/site (e.g. for tax or certification purpose to external and governmental authorities).

Evaluate and report the current energy/GHG footprint of a product.

Aggregate and show financial figures related to GHG production/reduction.

Data Input:

Performance data

Resources: Volume, Costs & Quantity; Historical, Forecasted & Target/Budget, Benchmark Values Emissions, Waste, Water waste: Volume, Cost, Historical, Forecasted & Target/Budget, Benchmark Values Business related Info: Measured or Counted Quantities; Historical, Forecasted & Target/Budget, Benchmark Values Asset data Improvement Activities Data Data Output:

Reports as widgets or documents with graphs and tables relevant to operational efficiency Service Transparency Reporting Detailed Description:

This business function brings transparency to customers or BT Competence Center: It enables BT to provide an overview to the customer showing services provided/conducted by Siemens BT for the specific customer/building. The reports show a static overview of selected values and information (e.g. problems, consumption, generation, storage) of all media, time series and external contents.

The requirements include:

Define, build and maintain reports (report type 1-2) and documents (report type 3)

Run/administrate reports

Advantageously harmonizing with 'Reporting' functions.

Data Input:

Asset data: Buildings, technical infrastructure, building structure

Performance Data

Improvement Activities Data

Data on service activities

Data Output:

Reports as widgets or documents with graphs and tables relevant to service transparency Potential Roles Using this Function:

Sales representatives and consultants from BT Competence Center

Real Estate Manager

Facility Manager

Supply Chain Manager

Business Manager

Site Manager

Plant Manager (Factory Responsible)

Common Reporting

Detailed Description:

Common reporting covers all reporting activity that is not related to Energy Efficiency, Energy Supply and Sustainability. It also does not cover service transparency reporting. This includes reports of asset data structure, reports of logs e.g. from Data Provisioning and Integration and other The requirements include:

Define, build and maintain reports (report type 1-2) and documents (report type 3)

Run/administrate reports

Data Input:

Asset data: Buildings, technical infrastructure, building structure

Performance Data

Data on service activities

Data Output:

Reports as widgets or documents with graphs and tables relevant to service transparency Potential Roles Using this Function:

Sales representatives and consultants from BT Competence Center

Real Estate Manager

Facility Manager

Supply Chain Manager

Business Manager

Site Manager

Plant Manager (Factory Responsible)

Energy Efficiency Benchmarking

Detailed Description:

Compare objects (whole enterprises, sites, buildings, equipments with other similar objects or specific references figures regarding selected Operational efficiency KPIs (Key Performance Indicators). The following steps are included:

Classify asset objects

Select asset objects and operational efficiency KPIs to benchmark

Manage internal operational efficiency benchmark reference database

Select operational efficiency benchmark reference (from external and/or internal reference database/service)

Create operational efficiency KPI comparison reports

Identify improvement areas for operational efficiency

Data Input:

Performance data

Resources: Volume, Costs & Quantity; Historical, Forecasted & Target/Budget, Benchmark Values Condition Information: Condition Values Historical, Forecasted & Target/Budget, Benchmark Values Business related Info: Measured or Counted Quantities; Historical, Forecasted & Target/Budget, Benchmark Values Asset data, Buildings, Building Structure, Technical Infrastructure, Overlay Data Output:

Compare Reports, dashboards widgets or documents with graphs and ranking diagrams relevant to energy supply optimization Potential Roles Using this Function:

Consultants in BT Competence Center

Business Manager

Real Estate, Facility, Site Manager

Plant Manager (Factory Responsible)

Supply Chain Manager (Proc)

Energy Supply Benchmarking

Detailed Description:

Compare objects (whole enterprises, sites, buildings, equipments with other similar objects or specific references figures regarding selected energy supply KPIs. The following steps are included:

Classify asset objects

Select asset objects and energy supply KPIs to benchmark

Manage internal energy supply benchmark reference database

Select energy supply benchmark reference (from external and/or internal Reference Database/Service)

Create energy supply KPI comparison reports

Identify improvement areas for energy supply

Energy supply KPI examples are: cost per unit produced, actual cost vs budgeted/hedge cost, hedge prices vs market, market to market, etc.

Data Input:

Performance data

Resources: Volume, Costs & Quantity; Historical, Forecasted & Target/Budget, Benchmark Values Condition Information: Condition Values Historical, Forecasted & Target/Budget, Benchmark Values Business related Info: Measured or Counted Quantities; Historical, Forecasted & Target/Budget, Benchmark Values Asset data, Buildings, Building Structure, Technical Infrastructure, Overlay Data Output:

Compare Reports, dashboards widgets or documents with graphs and ranking diagrams relevant to energy supply optimization Potential Roles Using this Function:

Consultants in Building Technologies Competence Center

Energy buyers

Energy engineers

Business Manager

Real Estate, Facility, Site Manager

Plant Manager (Factory Responsible)

Supply Chain Manager (Proc)

Sustainability Benchmarking

Detailed Description:

Compare objects (whole enterprises, sites, buildings, equipments with other similar objects or specific references figures regarding selected sustainability KPIs. The following steps are included:

Classify asset objects

Select asset objects and Sustainability KPIs to benchmark

Manage internal sustainability benchmark reference database

Select sustainability benchmark reference (from external and/or internal Reference Database/Service)

Create sustainability KPI comparison reports

Identify improvement areas for enhancing sustainability

Data Input:

Performance data

Resources: Volume, Costs & Quantity; Historical, Forecasted & Target/Budget, Benchmark Values Condition Information: Condition Values Historical, Forecasted & Target/Budget, Benchmark Values Business related Info: Measured or Counted Quantities; Historical, Forecasted & Target/Budget, Benchmark Values Asset data, Buildings, Building Structure, Technical Infrastructure, Overlay Data Output:

Compare Reports, dashboards widgets or documents with graphs and ranking diagrams relevant to energy supply optimization Potential Roles Using this Feature:

Consultants in Building Technologies Competence Center

Business Manager

Real Estate, Facility, Site Manager

Plant Manager (Factory Responsible)

Supply Chain Manager (Proc)

Sustainability Auditing

Detailed Description:

The sustainability auditing functions includes the following enterprise wide steps for emissions, waste, and waste water:

Managing auditing checklist library for sustainability

Manage sustainability customer questionnaires

Execute sustainability audits

Manage sustainability audit tasks

Create sustainability audit reports

Energy Efficiency Auditing

Detailed Description:

The Operational Efficiency auditing functions includes the following enterprise wide steps for operational efficiency:

Manage auditing checklist library for operational efficiency

Manage energy efficiency customer questionnaires

Execute operational efficiency audits

Manage energy efficiency audit tasks

Create operational efficiency audit reports

The target is to provide a companywide standardized approach and a comprehensive list to improve the auditing process Simulation Detailed Description:

This business function describes the creation and use of simulations that help to understand and enhance business and engineering performance in all three fields: Sustainability, operational efficiency and energy demand. Simulation and equation-solving capabilities are relevant to performance analytics of systems, equipments, and components that can be described with various equations.

To meet the requirements regarding analytical capabilities and algorithms this function needs to allow (and might be realized by) connecting/integrating a technical computing or simulation environment (e.g. MATLAB, ENERGY+(Building Load), and other 3rd party simulation tools) with the service platform.

It would include the following requirements:

1. Create simulation model
   a. Building modeling for energy use and (GHG) emissions
   b. Modeling of customer core process, (e.g. production, hotel guests, occupancy, patients . . . )
      1. Building Occupancy Information Handling
      2. Core Process Information Handling
2. Execute simulation
3. Manage simulation models Non functional requirements to simulation:

System needs to be able to be extend accordingly to future need

System needs to be kept up to date regarding the newest versions of algorithms and mathematical capabilities.

Examples for simulation are

Calculation of annual energy savings of a night-time load shifting application

Performance analysis of a fan that uses static pressure strategy such as Demand Flow-VAV Simulation of cooling coil with variable supply water temperature using lumped-capacitance model Simulation of a room thermal performance that uses both variable temperature and flow using lumped-capacitance model FDD of a cooling equipment using Physics Based modeling approach Data Input:

Performance data:

Historical, Forecasted & Target/Budget Values for:

Emissions: Volume & Costs;

Resources: Volume & Costs;

Business related Info

Asset data

Data Output:

Simulation results/reports/models

Cost Management

Detailed Description:

This function consists of three requirements:

1. Calculate cost based on performance data and price/cost calculation models
2. Allocate these costs to internal cost centers of the customer
3. Prepare the allocated cost data in such a way that they can be transmitted to an ERP or billing system or as a report to processing for formal internal/external billing Associated reporting is covered by function "Energy Supply Reporting".

Example: Audit Report that enables the users to ensure that the allocated costs or consumption volumes are netted to the sum total by asset, utility meter, by aggregate invoice etc. This feature is a quality check to ensure the allocations are properly applied and that the net out is as anticipated Remark: The idea behind this module is to gather information which is stored (and linked to assets) in the service platform and calculate/prepare the related cost, in that way, that they could be transferred into our customer's ERP. The customer would need this information either to distribute the overall cost (e.g. of energy consumption) to charge cost centers in his own organization or to charge them to outside organization (e.g. in the case of a facility manager that pays the energy for a whole site, that he services, and charges them afterwards to all his customers on this site).

Remark regarding release plan: Costs could be either calculated through models or are provided by bill/invoice information.

Data Input:

Performance data

- Resources and Emissions: Costs and Volumes; Historical, Forecasted, Target/Budget & Benchmark Values
- Supporting Info: Exchange Rates Asset data

- Buildings
- Overlay

Contract data (e.g. pricing)

Data Output:

Costs

Potential Roles Using this Function:

Sustainability and energy consultants

CoC

Real estate organization

Business Manager

Facility/Site Manager

Program Manager

Financial Analyst/Manager

Bill Management

Detailed Description:

Bill Management provides workflows to support the entire bill management process consisting of the following steps. A Bill Management workflow must be always linked to a service package.

1. Request outstanding invoices
2. Receive invoice data electronically for auto-upload into data system or manually enter invoice details
3. Invoice validation and analysis
4. Exception management
5. Store invoice data in system
6. Invoice payment
7. Reporting The system must provide a possibility for confirmation/validation one step has been completed and hand over to the next step. Invoices that are unable to be processed (Example: account does not exist in the system), results in a "problem bill" that is handed over to the appropriate internal team for research and resolution (teams include: Setup, Production Analysis, Data Management, Data Capture, Document Management, Payment Management, Utility Analysis, Budget Analysis, Operations).

The system must be able to track stages of problem bill resolution, to include date stamping each time the invoice is handled/by whom and provide reporting on "pending" invoices (invoices that are not yet resolved). There are timelines to hold for the different steps within workflows. These trigger alarms if due. The system must support prioritization of tasks to manage resources.

Terminology remark: The term "Invoiced Account" is used in a contractual context and is defined as a provider invoice that covers a specific service period for a specific number of meters and/or services. An invoiced account is typically for one service, but can be for multiple services (i.e. gas, electric, etc.) depending on the provider. These invoiced accounts are associated with a facility from a hierarchy perspective.

Note: There are provider Group Accounts, which is one account number that acts as the parent account to multiple children accounts and/or meters. It is possible to break these accounts out and process each individually; however, one need to ensure there is a link within the system to that Group Account number.

Energy Procurement/Hedging

Detailed Description:

This business function supports the energy procurement process and the hedging activities.

This function is closely supported by the function "Workflow Management" to keep the communication with customers and customer's partners within the platform to have all information available in one system.

The function comprises procurement related requirements and risk management/hedging requirements.

Procurement requirements (handle the energy procurement and sales process directly with utilities, suppliers and aggregators):

Prepare procurement

Set up RFQ/RFP

Analyze bids and issue award

Review contract

Finalize deal

Risk management/hedging requirements (assure that policies are met and support efficient hedging):

Capture and align risk/hedging strategy

Monitoring

Hedging activity

Data Input:

Service package information

Customer information

Corporate strategy (improvement programs/projects/measures)

Energy demand report

Contract data (customer with its partners)

Current supply chain information

Invoices

Planned initiatives

Hedging policy

Risk policy

Performance data

- Resources: Volume & Costs; Historical, Forecasted, Target/Budget and Benchmark Values Business related Info: Measured or Counted Quantities; Historical & Target/Budget Values
Supporting Info: Others: energy prices (historic, spot, OTC, derivatives, basis, currencies, non-commodity cost components, taxes, etc.)
Condition Information: Notifications
Asset data
Buildings
Overlay
Data Output:
Contract details and parameters to contract
Complete procurement documentation
Procurement workflow (include all logs and communication)
Contract Documents (Master agreement, Confirmations, Amendments, etc.)
Hedges
Potential Roles Using this Feature:
Energy Procurement Manager
Consultants in BT Competence Center
Energy Manager
Supply Chain Manager (Procurement)
Site Operations Manager
Budgeting & Forecasting
Detailed Description:
This business function helps to forecast and budget enterprise-wide energy demand, emissions, waste and waste water and associated cost.
It comprises the following steps.
1. Create forecasting model
2. Execute forecast
3. Allocate budget
4. Manage forecast model library
5. Sign off forecasts
This function is for precise short term forecasting as well as mid and long-term forecasting. The difference between those different forecast requirements lies within created models and execution but the here mentioned functionalities have to cover both.
Data Input:
Performance data:
Historical, Forecasted & Target/Budget Values for:
Emissions: Volume & Costs;
Resources: Volume & Costs;
Business related Info
Asset data
Data Output:
Forecast and budget values for: energy demand, emissions, waste and waste water and associated costs
User Community/Social Media
Detailed Description:
This business function allows customers and service provider to interact with themselves and with each other using communities and social networks
Service provider employees/customer users share knowledge publically or internally with other Siemens employees/within their organization through social network (e.g. Social Cast)
Service provider employees/customer users share knowledge publically or internally with other employees/within their organization through Wiki
Chat between customer user and Service provider representative
Data Input:
Log in info, contact identification info
Data Output:
User generated content, e.g. posts, likes, followers, etc
Chat log (timestamp, content and participants)
Potential Roles Using this Function:
Building Technologies Competence Center
CxO
Energy manager
Sustainability Managers/Officer
Site/Building manager
EHS Organization
Facility Manager
Software & License Management
Detailed Description:
This business function ensures that customers use software according to license model (e.g. number of sites, users, computers, . . . ), and allows Siemens to monitor its customers' installed base. This includes usage of on site as well as centrally hosted software. The following functions need to be supported:
Manage software versions (transparency over installed base)
Activate, update or upgrade software (also reverse e.g. in case of compatibility issues)
Manage licenses
Data Input:
Software purchase data
Customer
Purchased Software
Type and number of licenses
Data Output:
Software installed base
Customer
Version of software
Usage (e.g. # of activated licenses)
Updates and upgrades
Potential Roles Using this Function:
Software developer
Technical consultant (installation, maintenance, service)
User activating software/IT department
Workflow Management
Detailed Description:
Workflows can be defined and provisioned for all applicable processes. It comprises of the following requirements
Workflow setup: Manage workflows that exist in the system
Workflow execution: Guide through workflow once it is started
Track workflow: Support overview and control mechanisms for active workflows
User Setup
Detailed Description:
Users have to be authenticated and authorized to access the solution and its modules. The entitlement of users should be based on roles. Functionality and data access is allowed or restricted depending on the role, hierarchy and organizational affiliation (incl. license).
Authentication should support
SSO and strong authentication of user accounts
Strong password (periodic change and given security standards)
Configuration consists of the following two requirements:
Manage users
Manage authorizations and roles
User information and authorization parameters must be managed and stored in a secure way (encrypted).

Data Input:

Customer (company) data

Data Output:

User data

User roles

User hierarchy

Authorization parameters

Manage Performance Data

Detailed Description:

This business function provides the following functionality:

Upload or update data: Acquire "raw" performance data via "Data Provisioning and Integration"

Manage performance data properties (e.g. categories, data types, value types, series types)

Extract data

Aggregate and calculate data

Enrichment of performance data

Normalize data

Ensure data quality

Manage data quality checks

Execute data quality checks

Execute data quality measures

For managing performance data the following two requirements should be generally applied (not described as a separate requirement)

Report successful data update (e.g. number of updated trends) Log all changes (who, when, what and status before and after the change).

Data Input:

Raw performance data

Asset data

Data Output:

Formatted, normalized, enriched and corrected performance data

Potential Roles Using this Feature:

Performance Data Specialist

Manage Asset Data

Detailed Description:

This business function provides the following functionality to manage asset data (this includes building data, building structure data and technical infrastructure data)

Upload or update data: Acquire raw data information automated or by manual inputs via "Data Provisioning and Integration"

Manage asset data properties

Manage overlay structures

Extract data

Enrichment of asset data

Normalize asset data

Report asset structure

Provide history

Ensure asset data quality

Manage data quality checks

Execute data quality checks

Execute data quality measures

For managing asset data the following two requirements should be generally applied (not described as a separate requirement)

Report successful data update (e.g. number of updated assets)

Log all changes (who, when, what and status before and after the change)

Manage Customer's Contracts

Detailed Description:

This business function handles all information of contracts between the customer and his (3rd party) business partners that are relevant to the services that Siemens is supplying to the customer, like energy supply contracts of the customer with utilities, maintenance contracts with 3rd party service suppliers (for TIM) etc.

It consists of the following business requirements:

Maintaining the contract (create, edit, delete, assign to assets and types, . . . )

Show contract information

Data quality check and measures

Manage remit information (if applicable)

Data Input:

Procurement details

Contract Documents

Raw Contract Data

Asset Data

Data Output:

Contract Documents

Contract Data

Asset Data

Views of contracts, contract details, metrics

Potential Roles Using this Function:

Contract specialist

Any ACS/CoC people dealing with 3rd party suppliers of the customer

Energy Procurement Manager

Consultants in BT Competence Center

Procurement

Facility Manager

Energy Manager

Manage improvement Activity Data

Detailed Description:

As a prerequisite of improvement activities and during the improvement execution a managing of those improvement activity data is needed. One can distinguish between:

Improvement Catalogue

Improvement Goals

Applied Improvements

Improvement Execution information

Document Management

Detailed Description:

This function should enable Siemens BT to:

Manage any of kinds documents incl. versioning and sophisticated search functionalities Exchange documents within the company and outside of the company (with customers and external partners)

Examples of documents would be: Contracts as pdf, Report as pdf, CAD/floor plans, maps, pictures, movies and other multimedia files, invoices in bill management, asset data sheets.

Data Provisioning and Integration

Detailed Description:

Central collection of all data and import into the BT Service Platform (ETL) incl. manual data entry as well as basic data validation and consistency checks as well as export/deployment of configuration data.

The data connection itself is established by the function Data Connection Administration while this function covers the actual transfer of data.

Data Input:

All Performance data

All Asset data, Buildings, Building Structure, Technical Infrastructure, Overlay All input files Data Output:

Structured and pre-validated performance, asset data documents and other data

Potential Roles Using this Function:

Remote Operators

System Specialists

IT Specialists BT Competence Center

Real Estate Manager

Facility Manager

Business Manager

Site Manager

Plant Manager (Factory Responsible)

Data Connection Administration

Detailed Description:

Manage data connection and the access rights of connections with interfaces as well as remote connections incl. auditing and tracking of user activities using or managing those remote connections 1. Configuration of connections to interfaces
2. Manage connection access rights
3. Configuration and use of remote user connections
4. Audit user connection access This function establishes the data connection itself, the actual transfer of data is covered by the function Data Provisioning and Integration. There are three usage scenarios for connections:

1. Transfer data (customer's system into service platform)
2. Remote access: The goal is to provide the on-site maintenance staff the best possible support by highly specialized experts located off-site either at own service organization or at third party service providers Automatic configuration of equipment from platform to building automation system (set point, scheduler, update control algorithm, . . . )

Data Input:

Asset data, customer data, address information, network information

User information, ID, Authentication

Data Output:

Access authorization parameters

Connectivity parameters (remote connection as well as connection with interfaces)

Access reports and audits

Potential Roles Using this Function:

Remote Operators

System Specialists

Energy Engineers BT Competence Center

Real Estate Manager

Facility Manager

Site Manager

Plant Manager (Factory Response.)

Customer Setup

Detailed Description:

A customer (also called client) is a company for that Siemens provides services via the BT Service Platform.

The customer setup comprises the following modules:

Manage customers: Create customer and manage general information

Manage customer service package: Add information regarding the contracts between Siemens and the customer Managing general ledger: Enter general ledger information e.g. for bill management customers and link this to the service package Manage customer's services: Add information regarding the contracts between the customer and its partners (e.g. with utilities) (advantageously covered by function "Manage Customer's Contracts")

Manage customer's users (advantageously covered by function "User Setup")

Remark: Advantageous approach: Asset will be linked to customer, not the other way around.

Customer's Partner Setup

Detailed Description:

This business function is dedicated to manage the information about customer's partners (current and potential, also called vendors etc., e.g. utilities) that are relevant for the services that Siemens offers to the customer. It consists of the following requirements:

Manage partners (general information)

Manage rates (e.g. enter utility tariff rates)

Rate partners

Data Input:

General information about customer's partner incl. address information, geographical area, type of services to be provided Data Output:

Customer's partner information data incl. its rates and rating

Potential Roles Using this Function:

Any ACS/CoC people dealing with 3rd party suppliers of the customer

Energy buyers etc.

Procurement

Strategy—Capture and Store Data

Detailed Description:

This function serves as a initial step to support the gathering of data for the analysis to come and the capturing of the customer's overall targets Use existing performance and asset data for preliminary analysis (if existing)

Enter asset and performance data for any asset type (supported by function "Data Provisioning and Integration")

Use audit functionality to capture and store missing performance and asset data (supported by 'Audit' functions Capture customer equipment which is frequently in use at customers' sites including key KPIs/values of this equipment type Capture customer's overall targets along asset tree hierarchy (e.g. cost, consumption, carbon or sustainability goals or commitments that have been made that set forth the strategic objectives}

Data Input:

Performance data

- Resources and Emissions: Volume & Costs; Historical, Forecasted, Target/Budget & Benchmark Values
- Business related Info: Measured or Counted Quantities; Historical & Target/Budget Values
- Supporting information (prices, weather, . . . )
- Business relevant information (occupation, . . . )
- Overall cost, consumption, carbon or sustainability goals or commitments Asset data

- Company, site, building, . . . system, sub-system
- Overlay

Improvement Activity Data:

- Improvement Catalogue including building usage/occupancy and production process opt. measures Data Output:

Asset and performance data stored in the database

Overall cost, consumption, carbon or sustainability goals or commitments

Potential Roles Using this Function:
Energy Consultant
Sustainability Consultant
Sales persons
Facility Manager
Business Manager
Financial Manager/CxO
Chief Sustainability Officer (CSO)
Sustainability Manager
EHS/Compliance Manager
Strategy—Select Relevant KPIs from KPI Catalogue
Detailed Description:

This requirement is especially relevant for initial (sales) contact with the customer. In an initial step, key numbers and performance indicators of the customer will be captured.

select asset type for that the KPIs should be captured
display KPI types relevant for this asset type
customize KPIs for that specific client
select KPIs that will be captured and stored for this asset
Data Input:
KPI catalogue
Data Output:
select KPIs that will be captured and stored for specific assets
Potential Roles Using this Feature:
Energy Consultant
Sustainability Consultant
Facility Manager
Business Manager
Financial Manager/CxO
Chief Sustainability Officer (CSO)
Sustainability Manager
EHS/Compliance Manager
Strategy—Analyze Performance of Assets
Detailed Description:
Select assets to be analyzed (incl. enabling setup for overall Enterprise view and being able to drill down to specific market areas, organizational units, facilities, assets, etc.)
For selected assets, analyze performance data by selecting value types, calculating and comparing performance indicators
For selected asset types, define and store typical analysis (analysis version should be current)
Apply stored analysis on selected assets
Provide access to benchmarks for defined KPIs: Compare captured KPIs with selected benchmark values (supported by 'Benchmarking' functions)
Sort and filter assets (e.g. sites, buildings, equipment) according to KPI and benchmark values to identify assets to focus for improvement
Data Input:
Performance data
a. Resources and Emissions: Volume & Costs; Historical, Forecasted, Target/Budget & Benchmark Values
b. Business related Info: Measured or Counted Quantities; Historical & Target/Budget Values
c. Supporting information (prices, weather, . . . )
d. Business relevant information (occupation, . . . )
Asset data
a. Company, site, building, . . . system, sub-system
b. Overlay
Improvement Activity Data:
a. Improvement Catalogue including building usage/occupancy and production process opt. measures
Data Output:
Compare graphs
KPIs
Sites, buildings and equipment to be focused for improvement
Potential Roles Using this Function:
Energy Consultant
Sustainability Consultant
Facility Manager
Business Manager
Financial Manager/CxO
Chief Sustainability Officer (CSO)
Sustainability Manager
EHS/Compliance Manager
Strategy—Manage KPI Catalogue
Detailed Description:
Create, delete, change KPI types to capture for different types of assets
Example: KPIs for hospital buildings, hotel buildings
Data Input:
Performance data
a. Resources and Emissions: Volume & Costs; Historical, Forecasted, Target/Budget & Benchmark Values
b. Business related Info: Measured or Counted Quantities; Historical & Target/Budget Values
c. Supporting information (prices, weather, . . . )
d. Business relevant information (occupation,
Asset data
a. Company, site, building, . . . system, sub-system
b. Overlay
Improvement Activity Data:
a. Improvement Catalogue including building usage/occupancy and production process opt. measures
Data Output:
KPI catalogue
Potential Roles Using this Function:
Energy Consultant
Sustainability Consultant
Strategy—Establish a Baseline Condition
Detailed Description:

Build a Baseline condition by projecting the historical and current condition forward incorporating known or expected business trends (without inclusion of projects that have not yet been implemented)

Create new Baseline and specify field (e.g. energy: total cost of energy (TEC)) and assets
Use forecast function to calculate Baseline (see function "Budgeting & Forecasting")
Remark: User a "do nothing" approach and incorporate business trends/macro changes of the environment
Document underlying assumptions
Aggregate Baselines along asset tree
Data Input:
Performance data
Resources and Emissions: Volume & Costs; Historical, Forecasted, Target/Budget & Benchmark Values
Business related Info: Measured or Counted Quantities; Historical & Target/Budget Values
Supporting information (prices, weather,
Business relevant information (occupation,
Asset data
Company, site, building, . . . system, sub-system
Overlay
Data Output:
Baseline: Probability distribution of potential future results (e.g. total energy cost)

Potential Roles Using this Function:
- Energy Consultant
- Sustainability Consultant
- Facility Manager
- Business Manager
- Financial Manager/CxO
- Chief Sustainability Officer (CSO)
- Sustainability Manager
- EHS/Compliance Manager Strategy—Break Down Sustainability, Energy and Efficiency Targets Detailed Description:
- Select and break down targets that have been captured within the function "Strategy—Capture and store data" to lower asset hierarchies (e.g. per region, per building, . . . )
- Modify targets
- Keep track on versions of targets and underlying assumptions Data Input:
- Performance data
  - Resources and Emissions: Volume & Costs; Historical, Forecasted, Target/Budget & Benchmark Values
  - Business related Info: Measured or Counted Quantities; Historical & Target/Budget Values
  - Supporting information (prices, weather,
  - Business relevant information (occupation,
  - Overall cost, consumption, carbon or sustainability goals or commitments
- Asset data
  - Company, site, building, . . . system, sub-system
  - Overlay
- Improvement Activity Data:
  - Improvement Catalogue including building usage/occupancy and production process opt. measures Data Output:
- Improvement targets for each asset type and improvement measure area Potential Roles Using this Function:
- Energy Consultant
- Sustainability Consultant
- Facility Manager
- Business Manager
- Financial Manager/CxO
- Chief Sustainability Officer (CSO)
- Sustainability Manager
- EHS/Compliance Manager Strategy—Gap Analysis Detailed Description:

Identify, analyze and illustrate the difference between targets and forecast towards the client. This function should be possible to apply at various stages of the whole strategy definition, e.g. as a overall analysis of Baseline and overall targets or as a detailed analysis including improvement areas
- Identify gap: Pull together target and forecast/Baseline information to identify the difference between the given goals and the Baseline ("do nothing approach") and incorporate the elements of cost, demand, risk/uncertainty, emissions and other pre-defined KPI's
- Analyze gap: Display potential impact of measures by categories (e.g. by improvement area) to close the gap
- Aggregate information along asset tree/organizational structures
- Illustrate information: Provide strong visualization of the gap analysis Data Input:
- Performance data
  - Resources and Emissions: Volume & Costs; Historical, Forecasted, Target/Budget & Benchmark Values
  - Business related Info: Measured or Counted Quantities; Historical & Target/Budget Values
  - Supporting information (prices, weather, . . . )
  - Business relevant information (occupation, . . . )
  - Improvement targets for each asset type and improvement measure area
- Asset data
  - Company, site, building, . . . system, sub-system
  - Overlay
- Improvement Activity Data:
  - Improvement Catalogue including building usage/occupancy and production process opt. measures Data Output:
- Information and visualization of difference between targets and Baseline Potential Roles Using this Function:
- Energy Consultant
- Sustainability Consultant
- Facility Manager
- Business Manager
- Financial Manager/CxO
- Chief Sustainability Officer (CSO)
- Sustainability Manager
- EHS/Compliance Manager Strategy—Access and Select Typical Performance Improvement Areas Detailed Description:
- Display typical performance improvement areas for selected enterprise and asset type
- Select one or many of these typical improvement areas and display related improvement measures Data Input:
- Performance data
  - Resources and Emissions: Volume & Costs; Historical, Forecasted, Target/Budget & Benchmark Values
  - Business related Info: Measured or Counted Quantities; Historical & Target/Budget Values
  - Supporting information (prices, weather,
  - Business relevant information (occupation,
- Asset data
  - Company, site, building, . . . system, sub-system
  - Overlay
- Improvement Activity Data:
  - Improvement Catalogue including building usage/occupancy and production process opt. measures Data Output:
- Improvement potential for each asset type and improvement measure area including supply management, operational efficiency and carbon reduction/sustainability Potential Roles Using this Function:
- Energy Consultant
- Sustainability Consultant
- Facility Manager
- Business Manager
- Financial Manager/CxO
- Chief Sustainability Officer (CSO)
- Sustainability Manager
- EHS/Compliance Manager Strategy—Build Scenarios Detailed Description:

Build scenarios to show impact of scenario in terms of energy cost reduction, investment and financial performance indicators (payback, IRR, etc.), include confidence intervals and visualize the prioritization of the recommendations, the details of the recommendations, and their impact on the strategic objectives Define a scenario including target/budget values Model definition and calculation Flexibility to create and calculate models for all types of customers and assets (buildings and equipment) for estimating impacts of improvement programs and measures (for each improvement measure there can be impacts for domains (supply, demand, sustainability))

Ability to connect to an external modeling tool by providing necessary information to that tool and collect the results back Ability to simulate multiple programs to assess cumulative impact Remark: This include the same KPI/normalization functionality as e.g. for benchmarking Add additional customer's projects (could be already planned/already running) to the overall picture Select improvement measures and estimate their potential Select applicable improvement areas by customer's characteristics/vertical markets/domains (supply (e.g. sourcing or hedging, demand, sustainability)

Select improvement measures out of selected improvement areas guided by customer's characteristics/vertical markets Display the improvement potential for selected assets (e.g. sites, buildings, equipment) based on model calculation Aggregate improvement potential for any selected asset hierarchy level (floor, building, campus, enterprise etc.)

Ability to input specific or estimated improvement impact for customized improvement measures Create abatement curves to provide strong visualization of scenarios Create and display different scenarios for selected assets with different improvement measures to compare effects of different combinations Store these scenarios Provide cost abatement curve for a scenario and be able to compare scenarios in terms of cost reduction, capital investment, carbon reduction, risk reduction and other customizable KPI's (i.e. cost per sq ft, kWh per sq ft etc).

Pull information of Gap analysis into visualization to set targets/restrictions

It is important to have strong visualization capabilities for abatement curves and be able to customize the graphics to tell the strategic story and drive home key messages. e.g. mouse-over improvement measure to show high level profile, drag and drop improvement measures to customize abatement curve Data Input:

Performance data

Resources and Emissions: Volume & Costs; Historical, Forecasted, Target/Budget & Benchmark Values Business related Info: Measured or Counted Quantities; Historical & Target/Budget Values Supporting information (prices, weather, Business relevant information (occupation, Asset data Company, site, building, . . . system, sub-system Overlay Improvement Activity Data:

Improvement Catalogue including building usage/occupancy and production process opt. measures Data Output:

Improvement potential for each selected assets and total potential for the enterprise Scenario with improvement areas and focus assets Abatement curves for strong visualization Potential Roles Using this Function:

Energy Consultant

Sustainability Consultant

Facility Manager

Business Manager

Financial Manager/CxO

Chief Sustainability Officer (CSO)

Sustainability Manager

EHS/Compliance Manager

Strategy—Create and Manage Improvement Programs

Detailed Description:

Add, modify and remove improvement programs at enterprise and/or any asset level down to buildings Display and change previously created improvement programs Explanation: An improvement program can be the implementation of a previously defined whole improvement scenario and consists of more than one improvement project, which itself is the realization of one or several improvement measures (e.g. a project is the collection of improvement measures for one building whereas a program is a collection of projects for several buildings). Improvement measures to be supply management, demand management, operational, sustainability and carbon related categories Data Input:

Improvement targets

Improvement scenarios

Data Output:

Improvement programs

Potential Roles Using this Function:

Energy Consultant

Sustainability Consultant

Facility Manager

Business Manager

Financial Manager/CxO

Chief Sustainability Officer (CSO)

Sustainability Manager

EHS/Compliance Manager

Strategy—Create and Manage Improvement Projects

Detailed Description:

Add and remove improvement projects

Display and change previously created improvement projects

Assign assets to projects

Assign projects to programs

Assign improvements measures to projects

Explanation: An improvement program can be the implementation of a previously defined whole improvement scenario and consists of more than one improvement project, which itself is the realization of one or several improvement measures (e.g. a project is the collection of improvement measures for one building whereas a program is a collection of projects for several buildings)

Data Input:

Improvement programs

Data Output:

Improvement projects

Improvement measures

Potential Roles Using this Function:
Energy Consultant
Sustainability Consultant
Strategy—Create Strategy Documentation
Detailed Description:
Create a pre-defined, customizable analysis summary report as MS Word, based on selected scenario, improvement program, management services and projects
Create a pre-defined, customizable preliminary proposal document report as MS Word, based on selected scenario, improvement program, management services and projects
Create a pre-defined, customizable binding proposal document as MS Word, based on selected scenario, improvement program and projects
Data Input:
Improvement programs, projects and measures
Performance data
Resources and Emissions: Volume & Costs; Historical, Forecasted, Target/Budget & Benchmark Values
Business related Info: Measured or Counted Quantities; Historical & Target/Budget Values
Supporting information (prices, weather, . . . )
Business relevant information (occupation, . . . )
Asset data
Company, site, building, . . . system, sub-system
Overlay
Improvement Activity Data:
Improvement Catalogue including building usage/occupancy and production process opt. measures
Compare graphs of assets
Baseline: Probability distribution of potential future results (e.g. total energy cost)
Improvement targets for each asset type and improvement measure area
Information and visualization of difference between targets and Baseline
Improvement potential for each asset type and improvement measure area including supply management, operational efficiency and carbon reduction/sustainability
Improvement potential for each selected assets and total potential for the enterprise
Scenario with improvement areas and focus assets
Abatement curves for strong visualization
Data Output:
Configurable documents e.g. in MS Word format
Potential Roles Using this Function:
Energy Consultant
Sustainability Consultant
Sales persons Improvement Mgmt—Add and Customize Improvement Measures Detailed Description:
Load a project out of a program,
Create a project in a program,
Add improvement measures to a project,
Select/copy Improvement Measures from catalogue,
Customize and paste into applied improvement programs/projects
Link measures to existing assets
Budget and/or forecast the cost for the improvement measures and store them
Create and store the base line for improvement measures
Save improvement measures
Data Input:
Improvement programs and projects
Data Output:
Customized improvement measures and projects
Potential Roles Using this Function:
Energy Consultant
Sustainability Consultant
Energy Engineers (On-Site)
Energy Engineers (Remote)
Facility Manager
Real Estate Manager
Business Manager
Site Manager
Plant Manager
Sustainability Manager
EHS/Compliance Manager Improvement Mgmt—Track Implementation of Improvement Programs, Projects and Measures Detailed Description:
select and customize pre-defined tasks for selected improvement measures or projects
set-up new tasks for improvement measures or projects
assign tasks to users/responsibles
set deadlines for tasks
set current status of tasks (e.g. traffic lights)
set forecasted completion date of tasks
track the implementation of improvement measures (cost, time, resources) and projects of an asset
track the implementation on program and project based on task completion
connection to (Siemens) project management tools
capture KPIs for reporting of implementation success towards the customer The results of this requirement/function should be provided to function "Analyze improvement measure performance" and trigger a check of the parameters in the improvement measure catalogue.

Data Input:
Improvement programs, projects and measures
Data Output:
Status and deviations about the improvement programs, projects and measures
Potential Roles Using this Function:
Energy Consultant
Sustainability Consultant
Energy Engineers (On-Site)
Energy Engineers (Remote)
Facility Manager
Real Estate Manager
Business Manager
Site Manager
Plant Manager
Sustainability Manager
EHS/Compliance Manager Improvement Mgmt—Measure, Track and Verify Performance Improvements Detailed Description:
Improvement measures and performance data is directly linked to one asset and can be tracked for comparison
Display KPIs before and after implementation of improvement measures
Before
After—target
After—as-is
Deviation
Create or change improvement measures in case of deviations The results of this requirement/function should be provided to function "Analyze improvement measure performance" and trigger a check of the parameters in the improvement measure catalogue.

Data Input:

Improvement programs, projects and measures

Performance data

Asset data

Data Output:

Effectivity, efficiency or deviations of the improvement measures

Potential Roles Using this Function:

Energy Consultant

Sustainability Consultant

Energy Engineers (On-Site)

Energy Engineers (Remote)

Facility Manager

Real Estate Manager

Business Manager

Site Manager

Plant Manager

Sustainability Manager

EHS/Compliance Manager

Improvement Mgmt—Generate Reports

Detailed Description:

Generate the following reports in a customizable format:

Baseline (e.g. energy, energy cost, emissions)

Budget (not only cost but also consumption or emission budgets/targets)

Cost/resources/emissions comparison

Ability to see both historical results and future projections

Flexible user defined timeline to match strategic planning horizon

Covered e.g. by 'Reporting' functions.

Data Input:

Improvement programs, projects and measures

Data Output:

Reports e.g. in MS Word, PDF, Excel or online Reporting

Potential Roles Using this Function:

Energy Consultant

Sustainability Consultant

Energy Engineers (On-Site)

Energy Engineers (Remote)

Facility Manager

Real Estate Manager

Business Manager

Site Manager

Plant Manager

Sustainability Manager

EHS/Compliance Manager

Improvement Mgmt—Provide a High Level Program Overview

Detailed Description:

Provide a program management capability that supports the customer engagement, communicates action and progress to customer:

Select a improvement program

Summarize the status of the improvement program within key KPIs

Visualizes overall project plan, key milestones and KPI of the improvement program Data Input:

Improvement programs, projects and measures

Performance data

Asset data

Data Output:

Overview and status of programs

Potential Roles Using this Function:

Energy Consultant

Sustainability Consultant

Energy Engineers (On-Site)

Energy Engineers (Remote)

Facility Manager

Real Estate Manager

Business Manager

Site Manager

Plant Manager

Sustainability Manager

EHS/Compliance Manager

Manage improvement Activity Data

Detailed Description:

As a prerequisite of improvement activities and during the improvement execution a managing of those improvement activity data is needed. One can distinguish between:

Improvement Catalogue

Improvement Goals

Applied Improvements

Improvement Execution information

Data Input:

Performance data

- Resources and Emissions: Volume & Costs; Historical, Forecasted, Target/Budget & Benchmark Values
- Business related Info: Measured or Counted Quantities; Historical & Target/Budget Values
- Supporting information (prices, weather,
- Business relevant information (occupation, Asset data

- Company, site, building, . . . system, sub-system
- Overlay

Improvement Activity Data:

- Improvement Catalogue including building usage/occupancy and production process opt. measures Data Output:

Improvement measure templates

Potential Roles Using this Function:

Energy Engineers (Remote)

Energy Buyer/Procurement Manager

Risk Analyst

Facility Manager

Real Estate Manager

Business Manager

Site Manager

Plant Manager

Chief Sustainability Officer (CSO)

Sustainability Manager

EHS/Compliance Manager

Manage Improvement Measures Catalogue

Detailed Description:

create, change and delete improvement measure templates assign them to different categories assign them to asset object types Data Input:

Performance data

- Resources and Emissions: Volume & Costs; Historical, Forecasted, Target/Budget & Benchmark Values
- Business related Info: Measured or Counted Quantities; Historical & Target/Budget Values
- Supporting information (prices, weather,
- Business relevant information (occupation, Asset data

- Company, site, building, . . . system, sub-system
- Overlay

Improvement Activity Data:
Improvement Catalogue including building usage/occupancy and production process opt. measures
Data Output:
Improvement measure templates
Potential Roles Using this Function:
Energy Engineers (Remote)
Energy Buyer/Procurement Manager
Risk Analyst
Facility Manager
Real Estate Manager
Business Manager
Site Manager
Plant Manager
Chief Sustainability Officer (CSO)
Sustainability Manager
EHS/Compliance Manager
Analyze Improvement Measure Performance
Detailed Description:
Compare the results of a series of the same implemented improvement measures with estimated results in original improvement measures in the catalogue
If there is a persistent similar deviation then update estimated results of this improvement measures in catalogue
Data Input:
Improvement measure templates
Implemented improvement measures
Asset data (linked to improvement measures)
Performance data (linked to improvement measures)
Data Output:
Improvement measure templates
Potential Roles Using this Function:
Energy Engineers (Remote)
Energy Buyer/Procurement Manager
Risk Analyst Known systems available nowadays for providing optimization or improvement measures for buildings (means single building or a plurality of buildings, e.g. a campus) are restricted either to asset data management or to performance data management. Today's asset management systems are using as performance data only highly aggregated data (e.g. in monthly or daily resolution). On the other hand the existing performance data management systems are using only time series related assets for specific data points (e.g. meters, sensors) and do not comprise overall building infrastructure asset data.

DETAILED DESCRIPTION OF THE DRAWINGS

FIG. 1 shows an exemplary schematic overview diagram of a management system 10 that depicts various aspects and embodiments of the present invention. The advantage of the invention is especially the combination of a comprehensive asset management system with a comprehensive performance data management system that manages a fine granularity of the performance data. This enables the management system 10 to provide or generate benchmarking and/or improvement measures for a holistic building performance optimization as further described herein.

Where a service platform system that may be employed in the management system is shown in conjunction with various application modules that may be implemented in the service platform system SPS.

As shown in FIG. 1, the management system 10 includes a service platform system (SPS) (illustrated in FIG. 1 with the dashed line) and databases 11, 12, 13 for "Technical Building Infrastructure Improvement Data", for "Technical Building Infrastructure Performance Data", and for "Technical Building Infrastructure Asset Data". The databases 11,12,13 are exemplary storage means of the service platform system SPS. The service platform system SPS further comprises suitable processing means (e.g. computers, in particular processing units) and communication means (e.g. interfaces and communication networks).

"Technical Building Infrastructure Asset Data" 13 comprises data regarding the equipment used in the one or more buildings to control environmental comfort, safety, security and other systems within such buildings, including information identifying type and structure of the HVAC system (Heat Ventilation Air Condition), the air handling unit, the dampers, smoke detectors, controllers and other equipment used in such buildings.

"Technical Building Infrastructure Performance Data" 12 comprises, for example, measured, counted, or calculated quantities pertaining to the building infrastructure assets. The database 12 for the performance data is populated by data provided from the one or more buildings 14 and/or from external energy suppliers 15.

"Technical Building Infrastructure Improvement Data" 11 comprise generic or specific measures generated by the SPS to achieve improvements for operating one or more buildings 14. The generic or specific measures to achieve improvements can be provided for the one or more buildings 14 by the SPS as part of a consulting service and/or directly to the building management system depending on the service level agreement between service provider (e.g. BT Competence Center) and customer. On customer side contact persons can be e.g. on executive level (CxO), the EHS officer (Environmental Health & Safety), or the facility manager.

In FIG. 1 on the right hand side the required functionality employed in the SPS of the management system 10 is illustrated in form of schematic block diagrams categorized in "Enhance Sustainability", "Optimize Energy Supply and Delivery", "Optimize Operational Efficiency", "Common Data Management", and "Common Functions".

For example, with respect to the category "Enhance Sustainability", the following functions are dedicatedly assigned by the SPS as employed in the management system 10: Sustainability Monitoring, Sustainability Reporting, Sustainability Auditing, and Sustainability Benchmarking.

For example to the category "Optimize Energy Supply and Delivery" the following functions are dedicatedly assigned by the SPS as employed in the management system 10: Energy Supply Monitoring, Energy Supply Reporting, Energy Procurement/Hedging, Energy Supply Benchmarking.

For example to the category "Optimize Operational Efficiency" the following functions are dedicatedly assigned by the SPS as employed in the management system 10: Operational Efficiency Monitoring, Operational Efficiency Reporting, Operational Efficiency Auditing, and Operational Efficiency Benchmarking.

Cross section technology functions, used in the categories "Enhance Sustainability" or "Optimize Energy Supply and Delivery", or "Optimize Operational Efficiency" by the SPS in the management system 10 include a Personalized Dashboard, Budgeting & Forecasting, Strategy, Improvement Management, Bill Management, Cost Management, or Simulation are shown as horizontal overall bars in FIG. 1.

In order to deliver optimal results for the customer (e.g. building owner or building operator or Facility Manager), a data centric integration between the functionality categories "Enhance Sustainability", "Optimize Energy Supply and Delivery", and "Optimize Operational Efficiency" has to be assured. Furthermore continuous data analysis via the SPS of the management is one of the key underlying components of the SPS for delivering value to the respective customers.

The achieve these building performance goals, computer equipment (e.g. processor(s), input/output devices, memory, communication infrastructure (e.g. Internet)) is used with respectively configured software (e.g. word processor(s), spreadsheet(s), database(s)) in the SPS.

Advantageously the used databases 11, 12, 13 are in each case in-memory databases advantageously optimized for time series handling.

It is also possible to use a common database comprising the "Technical Building Infrastructure Improvement Data", the "Technical Building Infrastructure Performance Data", and the "Technical Building Infrastructure Asset Data".

Advantageously the common database is an in-memory database advantageously optimized for time series handling. Advantageously the used databases are multi-tenant databases.

Advantageously the used in-memory databases comprise durability mechanisms.

Figure 2:
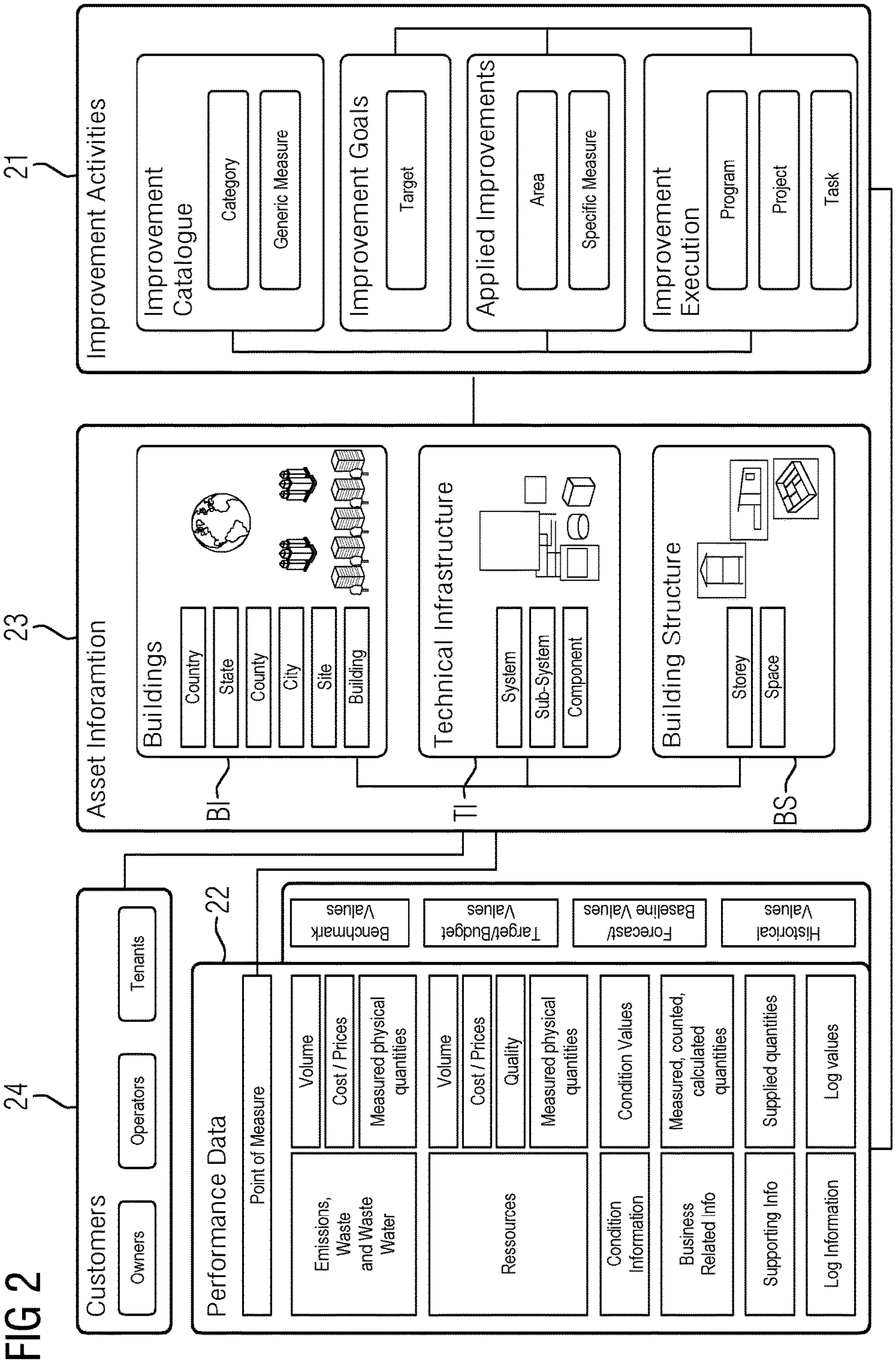
FIG. 2 illustrates an exemplary block diagram showing exemplary data structures for customer data, performance data, asset data, and improvement activities data that may be acquired, managed and/or generated by the service platform system in accordance with disclosed embodiments of the present invention.

FIG. 2 illustrates an exemplary block diagram showing exemplary data structures for performance data 22, asset information 23, improvement activities 21, and customers 24 in one embodiment. An important aspect of the present invention is the combination, respective integration of asset data and performance data of buildings to generate improvement activities or improvement data for the respective building owner, operator, or tenants.

The illustration according to FIG. 2 shows the collaboration of asset data 23 (e.g. location data BI of the buildings, technical infrastructure TI used in the buildings, and building structure BS) and performance data 22 (e.g. measured, counted, and calculated quantities). Advantageously the performance data 22 comprising operating data, usage data, and sensed data. Advantageously the performance data 22 are received in a resolution or frequency higher than 60 minutes (e.g. 5 minutes or 15 minutes). High resolutions or high frequencies in receiving performance data means that the performance data are received in small time intervals (e.g. 5 minutes or 15 minutes).

Based on the asset data 23 and on the performance data 22, improvement measures 21 related to a consumable resource in the one or more buildings are determined by using a computer system configured for analyzing the asset data and the respective performance data based on internal and/or external key performance indicators (KPIs) and rules provided by a database, in particular by an expert database.

Advantageously the building information data BI comprise information regarding the country and/or the state and/or the county and/or the city and/or the site and/or the address of the one or more buildings, to be analyzed.

Advantageously the technical infrastructure data TI comprise information regarding the equipment for climate control (HVAC), and/or access control, and/or energy supply and control, and/or security and/or fire safety and/or computers and/or printers and/or mobile phones of the one or more buildings, to be analyzed.

Advantageously the physical building structure data BS comprise information regarding the structural level and/or the number and structure of the floors and/or the plant layout of the one or more buildings, to be analyzed.

E.g. the consumable resource is waste, sewage water, water, air, energy, electrical power, gas, or oil. Advantageously the improvement activities comprising adjusting or reducing the consumption of the consumable resource.

Advantageously the performance data 22 are received dynamically in a resolution in between 1 and 15 minutes. This enables a fast response and/or reaction according to changed conditions or values.

The performance data 22 are for instance sensed data, measured physical quantities, counted quantities, calculated quantities, condition values, log values, supplied quantities, etc.

The improvement activities 21 can be provided for the customers 24 as improvement catalogue (e.g. comprising generic measures), as improvement goals (e.g. targets), as applied improvements (e.g. specific measures), or as deployable improvement execution program, project, or task.

Figure 3:
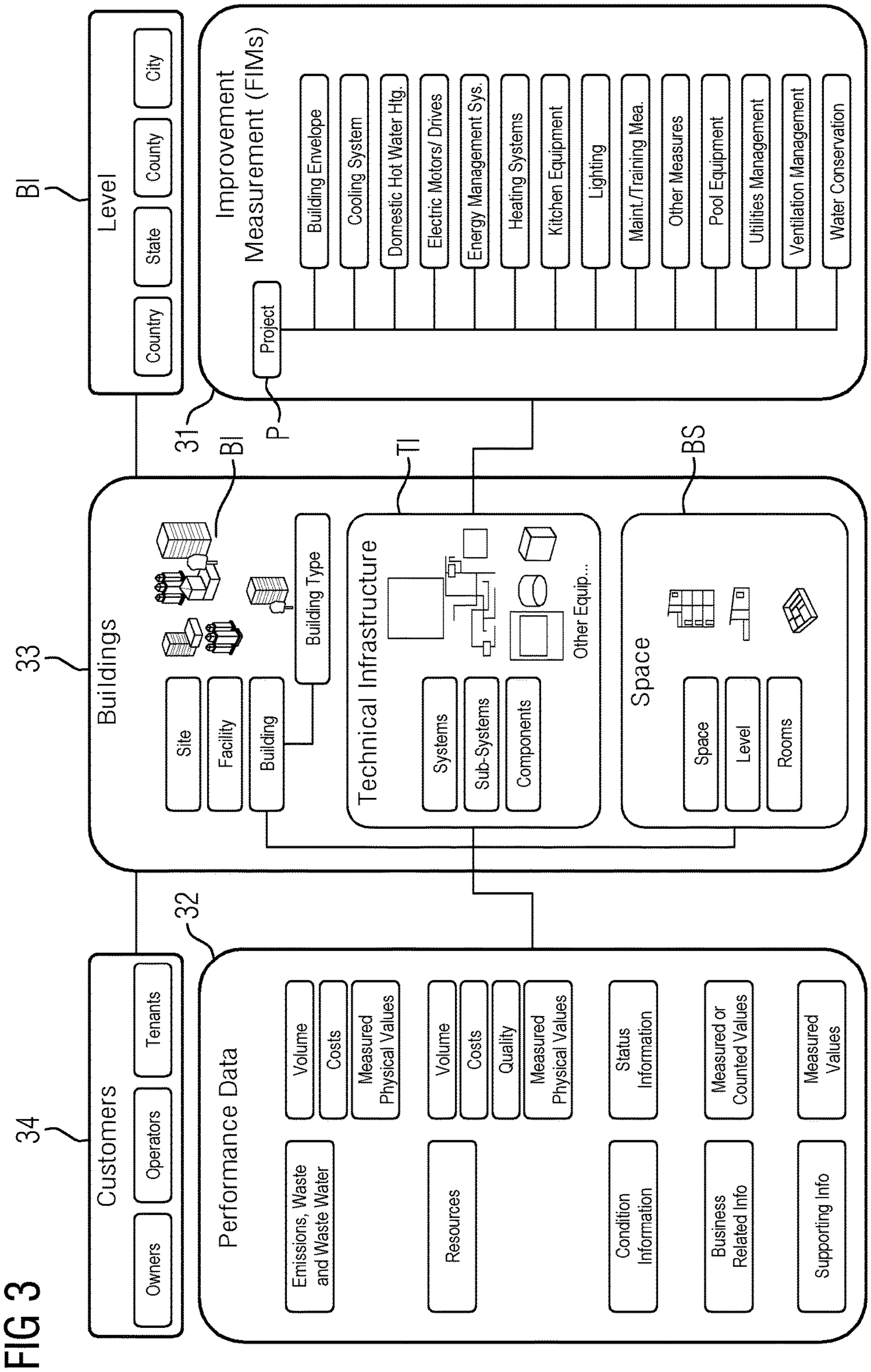
FIG. 3 illustrates an exemplary block diagram showing exemplary data structures and functional interconnectivity between the data structures for performance data, asset data, and improvement measures structured for a project that may be employed by the service platform system in accordance with disclosed embodiments of the present invention.

FIG. 3 illustrates an exemplary block diagram showing exemplary data structures for performance data 32, asset information 33, and improvement measures 31 structured as a project P for customers 34. The data structure illustrated in FIG. 3 can be used for performance assurance for a customer 34 (e.g. owner, operator, tenant) operating or living in a building comprising asset data 33. The asset data 33 are structured in building information BI (location of the building, building type, etc.), technical infrastructure TI (equipment used or installed in the building), and the physical building structure BS of the building (space, stories/levels, rooms, etc.). The data structure illustrated in FIG. 3 can be regarded as a high level data model comprising classes 31, 32, 33, 34 and sub-classes e.g. BI, TI, BS and relationships between the classes and sub-classes. The relationships are represented in form of connection lines. E.g. the connection line between "Building" and "Space" illustrates that a building has space. E.g. the connection line between "Building" and "Building Type" illustrates that a building has a type (e.g. residential building, office building, manufacturing plant). Based on the provided performance data 32 (e.g. measured physical values) for the installed technical infrastructure TI (e.g. HVAC System, air handling units, dampers, thermostats, etc.) improvement measures 31 for the respective customer 34 (e.g. building operator) are derived or determined. In FIG. 3 the improvement measures 31 are provided as a project tree P, showing exemplary aspects or tasks which have to be tackled and performed to achieve the pursued improvement (e.g. reducing energy costs) regarding the respective building. The exemplary project tree P in FIG. 3 shows exemplary tasks: Building Envelope, Cooling Systems, Domestic Hot Water Heating, Electric Motors/Drives etc.

The improvement measures 31 are related to a consumable resource in the one or more buildings. The improvement measures 31 are determined by using a computer system configured for analyzing the asset data 33 and the respective performance data 32 based on internal and/or external key performance indicators (KPIs) and rules provided by a database, in particular by an expert database. A proprietary or commercial off the shelf (COTS) rule engine can be used and the computer system provides a suitable runtime production environment for the rule engine. The rules can be provided by a proprietary expert data base comprising knowledge, expertise, and experience of experts of the improvement service provider (e.g. BT Competence Center) and/or by national authorities (e.g. National Institute of Standards and Technology, NIST).

Figure 4:
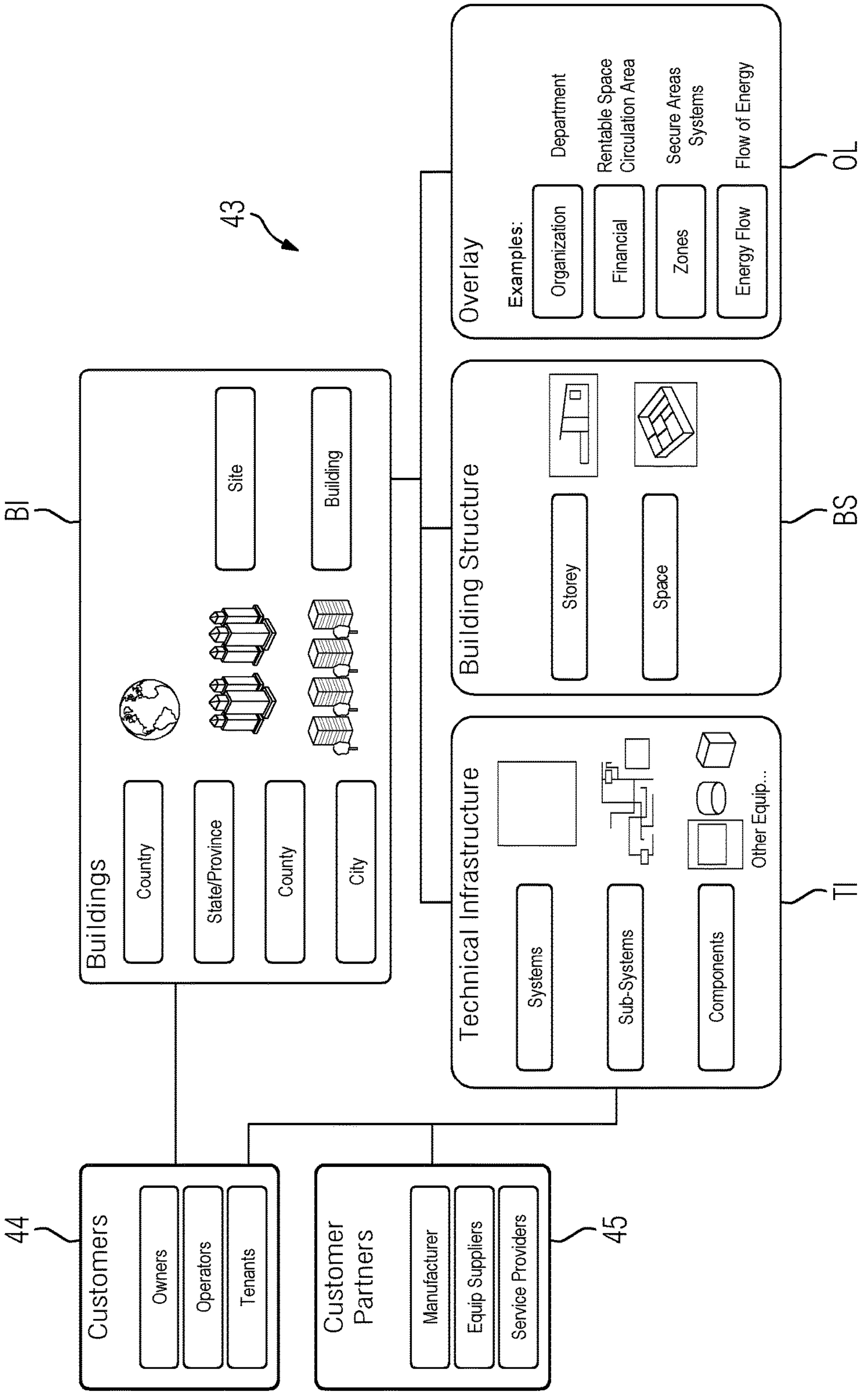
FIG. 4 shows an exemplary block diagram for an exemplary asset information structure that may be employed by the service platform system in accordance with disclosed embodiments of the present invention.

FIG. 4 shows an exemplary block diagram for an exemplary asset information structure 43. Asset data 43 regarding buildings comprise static data, which do not change at all or only after long time intervals. Static asset data are e.g.

building information data BI, as location (e.g. country, state, province, district, county, city, site) or type of the building to be analyzed (e.g. residential building, hospital) or data regarding the building structure BS of the building to be analyzed (e.g. space, rooms, storey). Asset data regarding buildings comprise also data which can change or vary, e.g. technical infrastructure data TI of the one or more building to be analyzed. Technical infrastructure data TI comprise information regarding the technical systems (e.g. air handling units, heating system, and the respective controllers), sub-systems, or components (e.g. dampers, smoke detectors) which are installed in the building to be analyzed. The asset data 43 can comprise also overlay information OL, e.g. regarding organization, financials, zones, or energy flow. Further aspects of asset data regarding buildings are the customers 44 (e.g. owners, operators, or tenants of the building to be analyzed) and the partners 45 of the customer. Considering the customer partners 45 is especially advantageously regarding the technical infrastructure TI, since the technical infrastructure TI (e.g. the installed equipment on customer side) is provided by manufacturers, equipment suppliers, or service providers (e.g. maintaining or operating the installed equipment). Considering the customer partners 45 in the asset data structure enables the service provider who provides optimization or improvement measures for the one or more buildings to be analyzed or serviced, to contact directly the respective customer partner 45 and to provide dedicatedly improvement measures the respective (means affected) customer partner 45. A dedicated improvement measure for a customer partner can be for instance the request to replace a particular component or the request for a new setting up of a system or sub-system. Therefore determined improvement measures can be deployed and implemented effectively. This increases the cost-saving aspect on customer side.

In the asset data structure 43 illustrated in FIG. 4, the relationships between the classes or objects are represented in form of connection lines.

Figure 5:
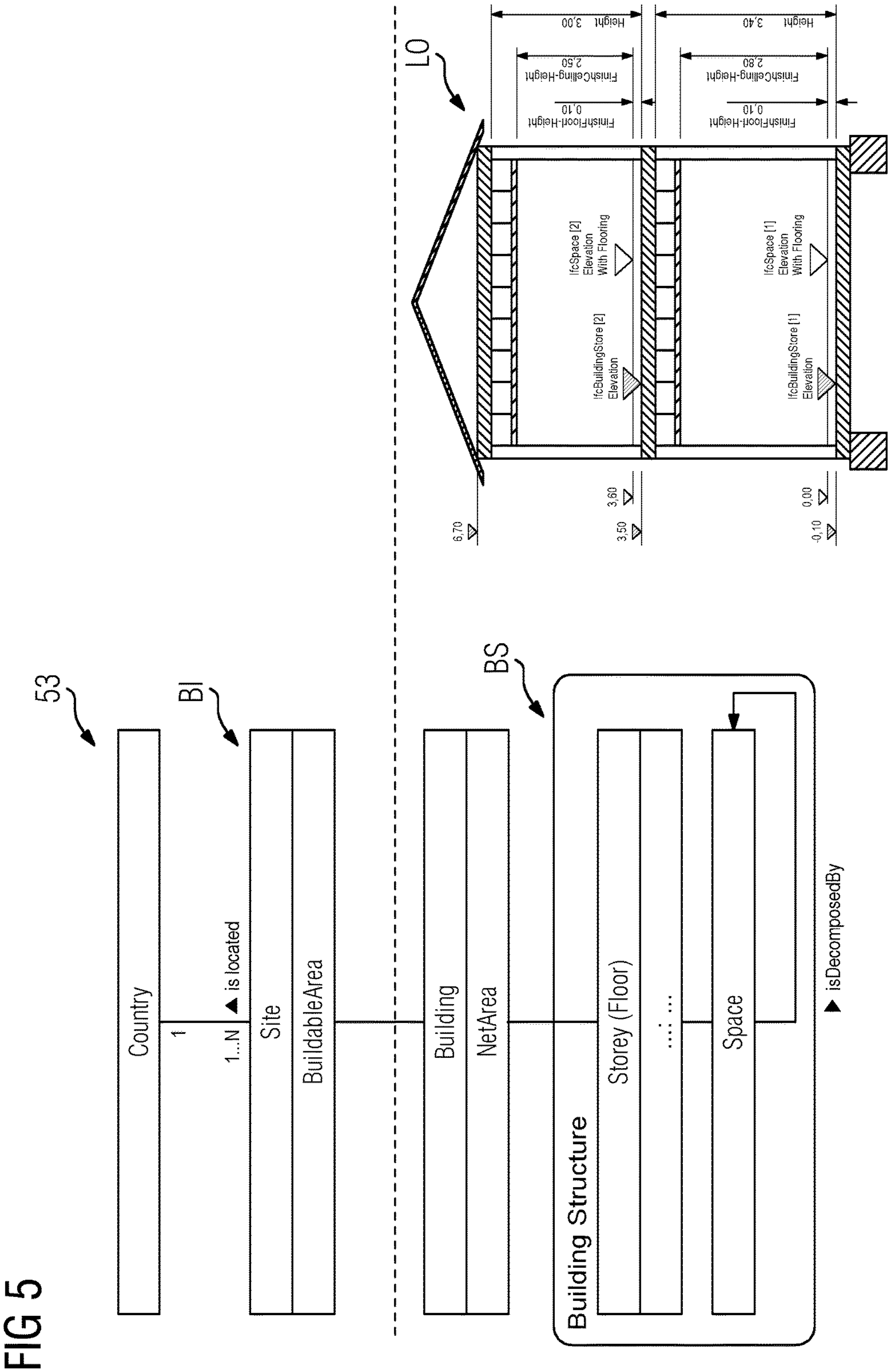
FIG. 5 illustrates on the left hand side an exemplary data model for asset data regarding a "Building" having a "Building Structure" that may be employed by the service platform system in accordance with disclosed embodiments of the present invention, and on the right hand side an exemplary layout of a building depicting attributes that may be used to define the "Building Structure"

FIG. 5 shows on the left hand side an exemplary data model for asset information 53 regarding "Building Information" BI and "Building Structure" BS, and on the right hand side an exemplary layout LO for a "Building Structure". The exemplary data model 53 on the left hand side is illustrated in an OMT-like (Object-Modeling Technique) notation. The notation showing exemplary relationships between classes or objects of the data model. E.g. the site of the one or more buildings (1 . . . N) is located in a country (is located relation), or the space (of a floor) consists of space (in the sense of "sub-space"), illustrated by the "isDecomposedBy"-relation. In the example shown in FIG. 5, the "isDecomposedBy"-relation is a recursive relation: a space is decomposed by space.

The technical drawing on the right hand side shows an exemplary layout LO for a physical "Building Structure". The physical "Building Structure" is mapped to and represented by the OMT-like notation BS on the left hand side in FIG. 5.

Figure 6:
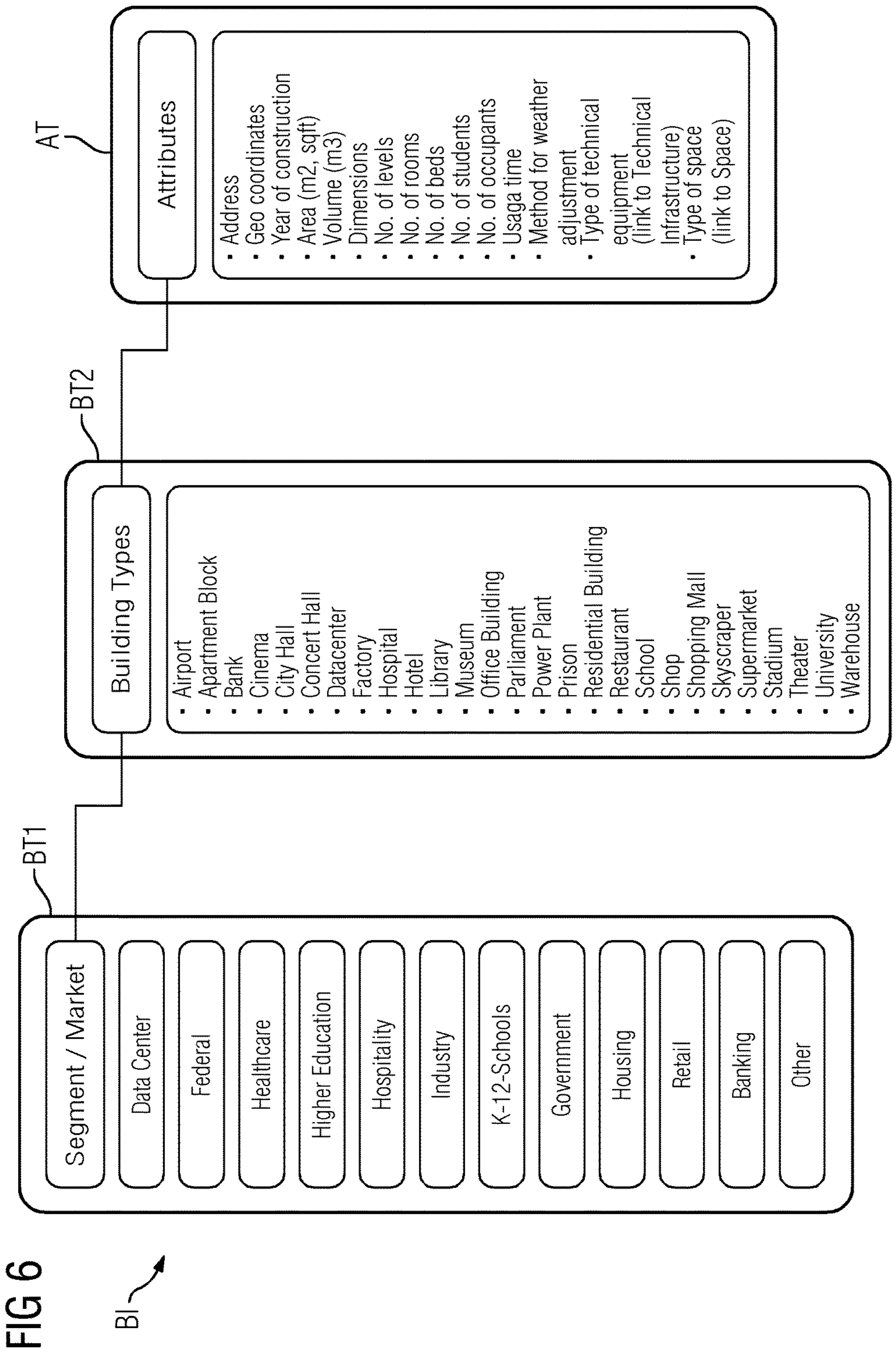
FIG. 6 illustrates an exemplary approach that may be employed by the service platform system in accordance with disclosed embodiments of the present invention for structuring asset data by market categories of buildings, corresponding building types and building attributes.

FIG. 6 illustrates an exemplary approach for structuring buildings by building types BT1, BT2 and further specifying attributes AT. FIG. 6 shows exemplary characteristics for a data structure representing building information BI asset data. The building type BT1 shows examples for characterizing a building regarding segments or markets: Data Center, Federal, Healthcare, Higher Education, Hospitality, Industry, K-12-Schools, Government, Housing, Retail, Banking, etc. The building type BT2 shows examples for characterizing a building regarding the type of the underlying building: Airport, Apartment Block, Bank, Cinema, . . . , Warehouse, etc. Further attributes AT can be used for a more detailed characterization of the underlying building or buildings: Address, Geo coordinates, Year of construction, Area, Volume, Dimensions, . . . , Type of space, etc. The more concise and comprehensive the asset data BI are, the better and more dedicated improvement measures for the customers or directly for the partner of the customers (see exemplary FIG. 4) can be provided.

Figure 7:
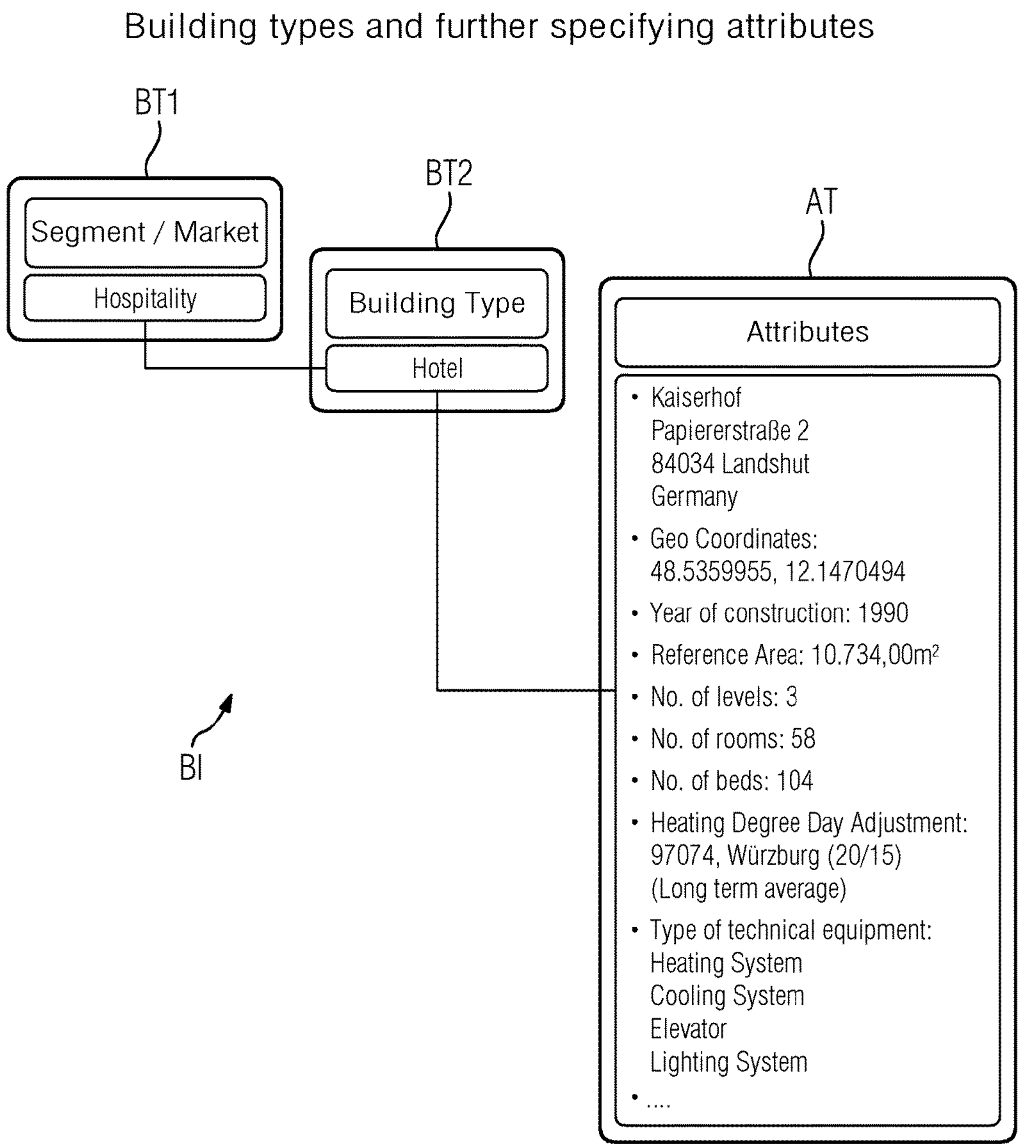
FIG. 7 illustrates an example of the asset data structure shown in FIG. 6 for one building type.

FIG. 7 shows an example for a building information data structure BI with exemplary characteristics for building types BT1, BT2 and further specifying attributes AT. FIG. 7 shows exemplary real world characteristics for a data structure representing building information BI asset data. The building type BT1 shows as characterizing attribute regarding segments or markets: Hospitality. The building type BT2 shows as characterizing attribute regarding the type of the underlying building: Hotel. Further attributes AT show as detailed (exemplary) characterization of the underlying building: Address (Kaiserhof, Papierstrasse 2, 84034 Landshut, Germany), Geo coordinates (48.5359955, 12.1470494), Year of construction (1990), Area (10.734.00 $m^2$), etc.

Figure 8:
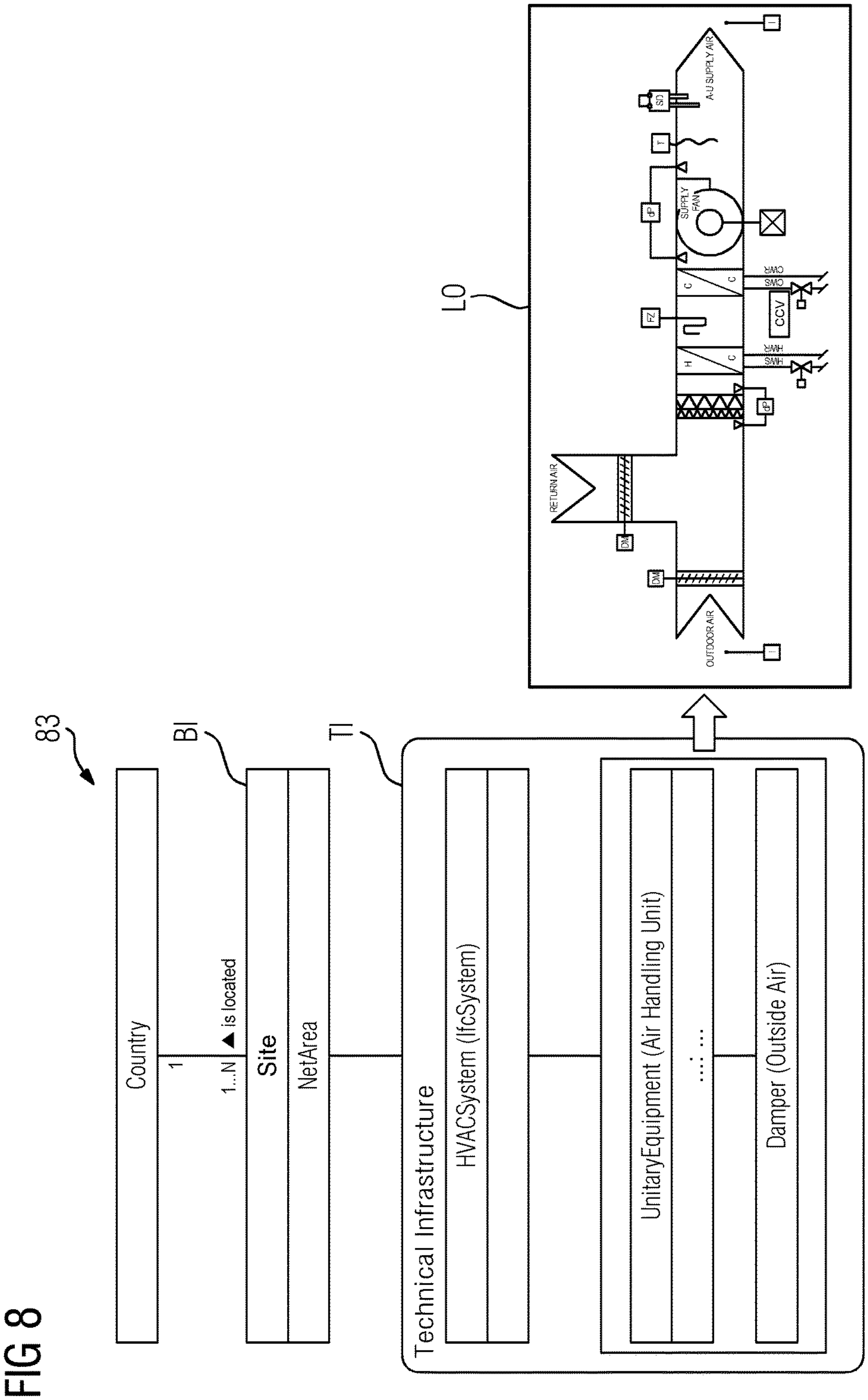
FIG. 8 illustrates on the left hand side an exemplary data model for asset data regarding a "Building" having a "Technical Infrastructure" that may be employed by the service platform system in accordance with disclosed embodiments of the present invention, and on the right hand side an exemplary layout of an air handling unit (AHU) employed in an HVAC system of building where the AHU depicts components and component attributes that may be used to define the "Technical Infrastructure"

FIG. 8 shows on the left hand side an exemplary data model for asset information 83 regarding "Building Information" BI and "Technical Infrastructure" TI, and on the right hand side an exemplary layout LO for an "Air Handling Unit". The exemplary data model 83 on the left hand side is illustrated in an OMT-like (Object-Modeling Technique) notation. The notation showing exemplary relationships between classes or objects of the data model. E.g. the site of the one or more buildings (1 . . . N) is located in a country (is located relation). The exemplary data structure for technical information TI (e.g. the installed equipment on customer side) shows a HVAC System comprising an air handling unit, the air handling unit comprising at least one damper.

The technical drawing on the right hand side shows an exemplary layout LO for a physical "Air Handling Unit". The physical "Air Handling Unit" is mapped to and represented by the OMT-like notation BI, TI on the left hand side in FIG. 8.

The more concise and comprehensive the asset data BI, TI are, the better and more dedicated improvement measures for the customers or directly for the partner of the customers (e.g. the manufacturer of the respective air handling unit or the maintenance/service worker for the respective air handling unit) can be provided.

Figure 9:
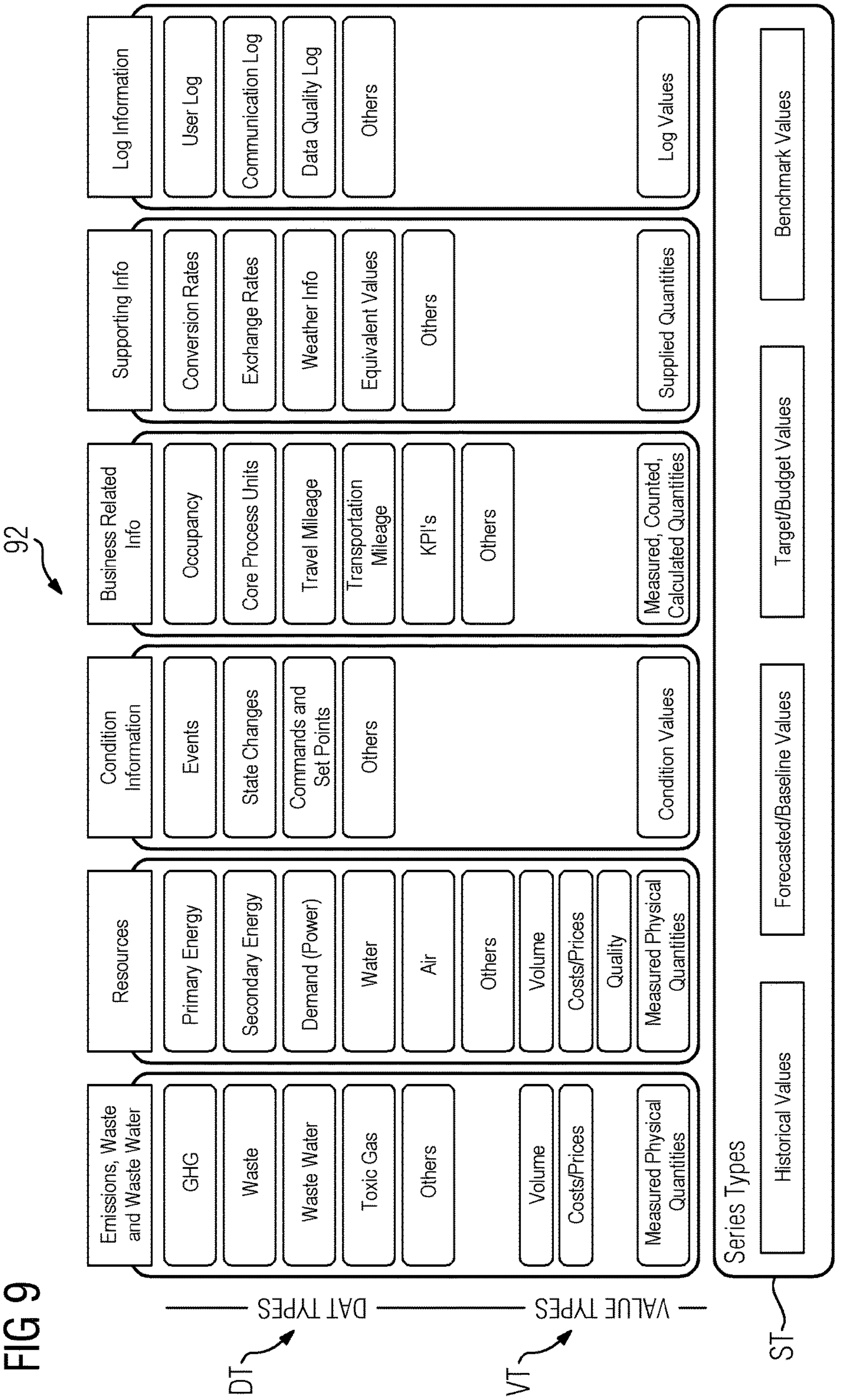
FIG. 9 illustrates exemplary data types, value types, and series types for performance data that may be employed and managed by the service platform system in accordance with disclosed embodiments of the present invention.

FIG. 9 illustrates exemplary data types DT, value types VT, and series types ST for performance data 92. The performance data 92 are exemplary categorized in "Emissions, Waste, and Waste Water", "Resources", "Condition Information", Business Related Information", "Supporting Information", and "Log Information". The data types DT are illustrated in boxes with white background and black font, the value types VT are illustrated in boxes with gray background and white font.

The category "Emissions, Waste, and Waste Water" comprises following exemplary data types DT: GHG (greenhouse gas), Waste, Waste Water, Toxic Gas, and others. The category "Emissions, Waste, and Waste Water" comprises following exemplary value types VT: Volume, Costs/Prices, and Measured Physical Quantities.

The lower part of FIG. 9 shows following exemplary series types ST: Historical Values, Forecasted/Baseline Values, Target/Budget Values, and Benchmark Values.

Typically the performance data 92 of the assets comprise measured and/or sensed data out of the field, e.g. from the equipment installed in the respective building to be optimized. The performance data 92 can be provided by sensors (e.g., thermometer), measuring devices, metering devices, or devices for providing the run-time or working time of the respective installed equipment (e.g. air handling unit, heating or damper).

Figure 10:
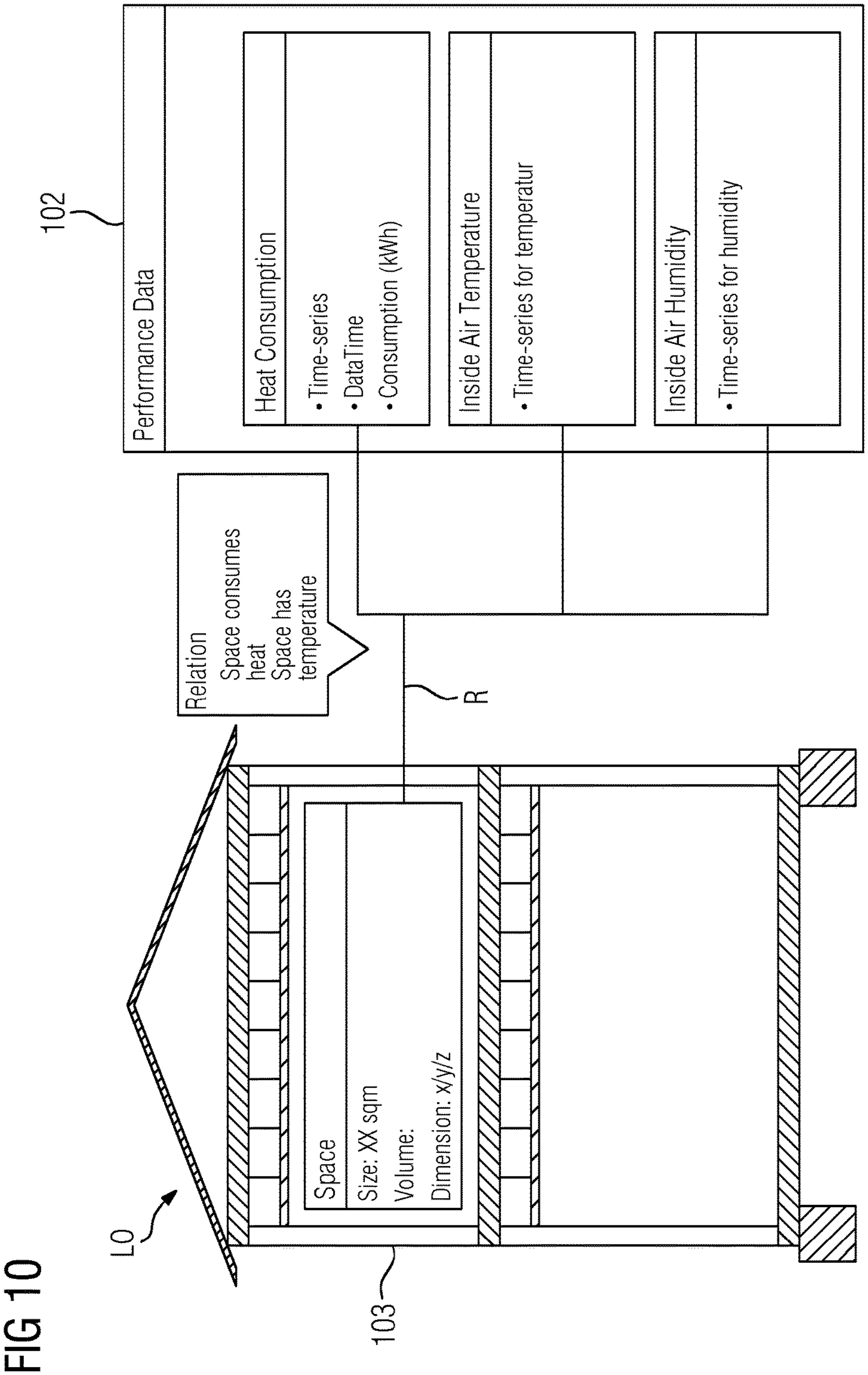
FIG. 10 illustrates a schematic diagram showing an exemplary link between asset data and performance data corresponding to a space within a building as recognized and managed by the service platform system in accordance with disclosed embodiments of the present invention.

FIG. 10 illustrates a schematic diagram showing an exemplary link or relation R between asset data 103 and performance data 102 regarding the aspect space of the building information data. FIG. 10 illustrates a schematic layout LO of a building. As exemplary asset data 103 the building comprises space (with size, volume, dimensions). The respective space or spaces of the building consumes or consumes heat; each space has a measurable temperature. From these information performance data 102 can be determined or derived, e.g. "HeatConsumption", "InsideAirTemperature", and "Inside AirHumidity". "InsideAirTemperature" and "Inside AirHumidity" are advantageously provided as time-series. Performance data for "HeatConsumption" advantageously comprise time-series, date time, and the consumption (e.g. in kWh).

Figure 11:
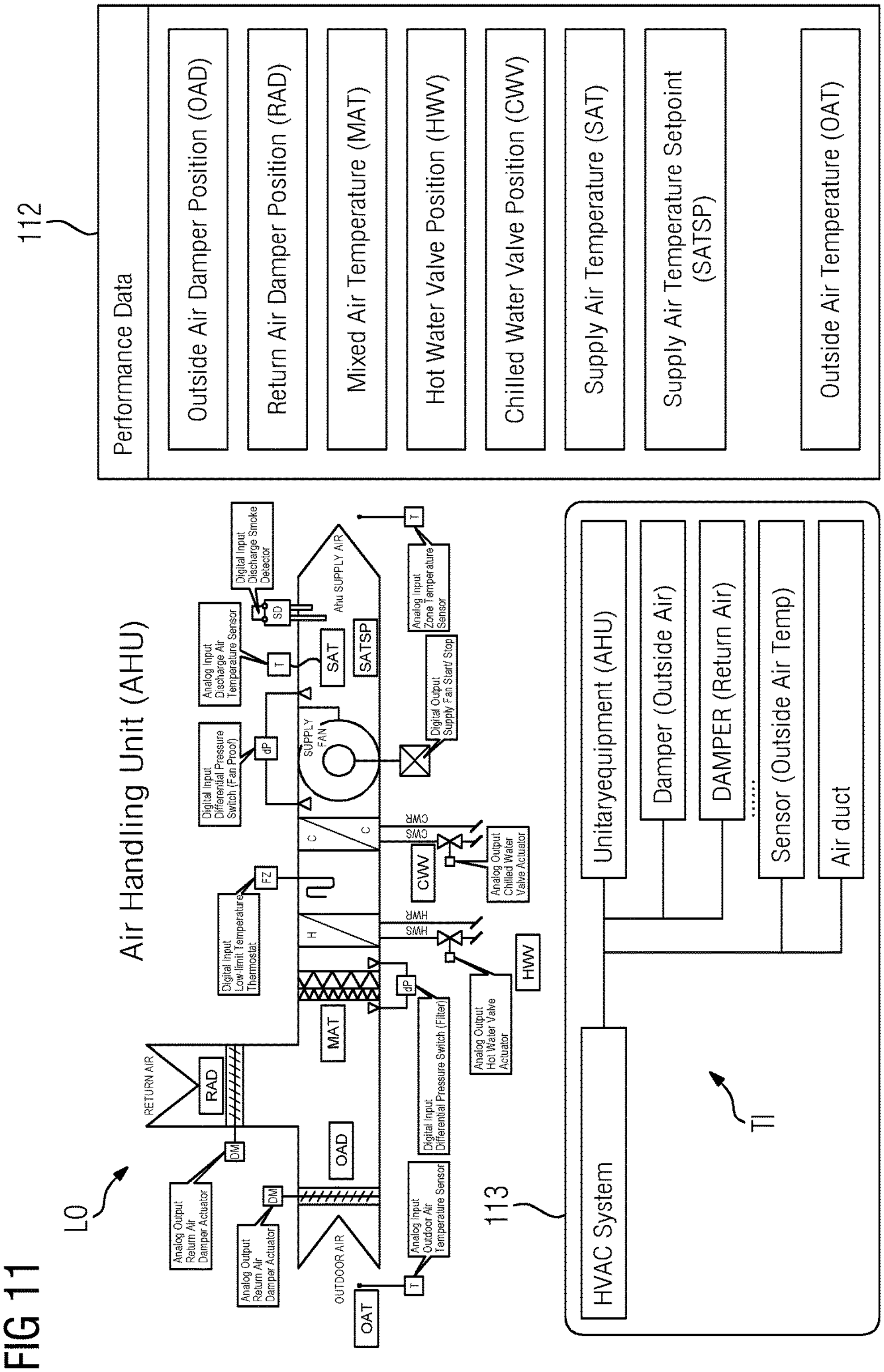
FIG. 11 illustrates a further schematic diagram showing an exemplary link between asset data and performance data corresponding to an air handling unit (AHU) within a building as recognized and managed by the service platform system in accordance with disclosed embodiments of the present invention.

FIG. 11 illustrates a further schematic diagram showing an exemplary link between asset data 113 and performance data 112 regarding the technical infrastructure asset data TI for an exemplary air handling unit (AHU). The top left area of FIG. 11 shows a layout diagram LO of an exemplary air handling unit (AHU). FIG. 11 illustrates under the layout diagram LO of the air handling unit (AHU) as an extract of asset data 113 (of the underlying building to be optimized) technical infrastructure data TI showing the data structure of an HVAC System (HVACSystem) comprising the exemplary air handling unit (Unitaryequipment (AHU)). The Unitaryequipment (AHU) having as components dampers for outside air and return air. The HVAC System (HVACSystem) furthermore exemplary comprises a sensor for outside air temp and an air duct.

FIG. 11 illustrates on the right hand side exemplary performance data 112 which can be derived, determined, measures or sensed from the technical infrastructure TI. Exemplary performance data 112 are: "Outside Air Damper Position (OAD)", "Return AIR Damper Position (RAD)", "Mixed Air Temperature (MAT)", Hot Water Valve Position (HWV)", "Chilled Water Valve Position (CWV)", "Supply Air Temperature (SAT)", "Supply Air Temperature Setpoint (SATSP)", or "Outside Air Temperature (OAT)".

FIG. 12 illustrates an example for structuring asset data regarding the technical infrastructure TI and related performance data 122. The asset data regarding the technical infrastructure TI comprise exemplary systems (e.g. HVAC System, Fire Safety System, Elevator), the systems comprising exemplary sub-systems (Heating System, Cooling System, Ventilation, Elevator), and the sub-systems comprising exemplary components (Boiler, Management Station, Chiller, Pump, Valve, Thermostat, Fire Panel, Smoke detector, Meter, Controller).

The performance data 122, derived, determined, measures or sensed from the technical infrastructure data TI can be exemplary classified in "Emissions, Waste, Water waste" (with exemplary entities or units: Volume, Costs, Measured Physical Values), "Resources" (with exemplary entities or units: Volume, Costs, Quality, Measured Physical Values), "Condition Information" (exemplary entity/unit: Status Information), "Business related Info" (exemplary entities/units: Measured or Counted Values), and "Supporting Info" (exemplary entities/units: Measured Values).

For the naming for all data points of measured performance data 122 advantageously the Haystack approach can be used. Project Haystack is an open source initiative to develop naming conventions and taxonomies for building equipment and operational data. It defines standardized data models for sites, equipment, and points related to energy, HVAC, lighting, and other environmental systems.

Figure 13:
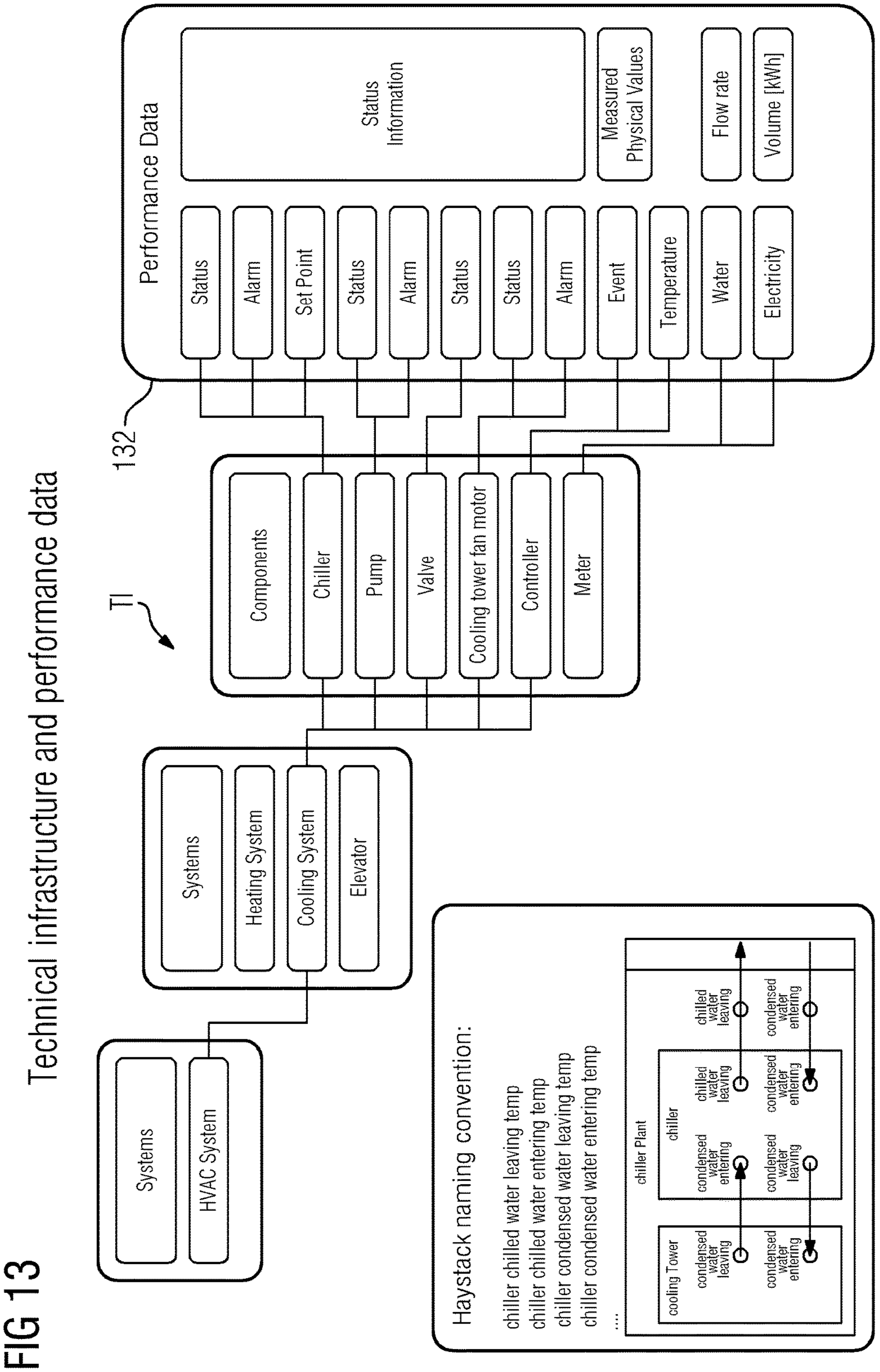
FIG. 13 illustrates a further example for structuring technical infrastructure and related performance data that may be employed by the service platform system in accordance with disclosed embodiments of the present invention.

FIG. 13 illustrates a further example for structuring asset data regarding the technical infrastructure TI and related performance data 132.

The asset data regarding the technical infrastructure TI comprise an exemplary HVAC System. The exemplary HVAC System comprises among others an exemplary Cooling System. The exemplary Cooling System comprises among others exemplary components: Chiller, Pump, Valve, Cooling tower fan motor, Controller, and Meter.

The performance data 132 shown on the right hand side of FIG. 13 comprise e.g. Status Information, Measured Physical Values, Flow rate, and Volume (kW/h). The chiller component provides as performance data: Status, Alarm, Set Point. The pump component provides as performance data: Status and Alarm. The valve component provides as performance data: Status. The cooling tower fan motor component provides as performance data: Status and Alarm. The controller component provides as performance data: Event and Temperature. The meter component provides as performance data: Water and Electricity. Performance data regarding a temperature can be provided as measured physical value, performance data regarding water can be provided as flow rate, performance data regarding electricity can be provided as volume (kWh).

The box illustrated in FIG. 13 on the left hand side on the bottom shows an example for a Haystack naming convention, regarding the exemplary chiller equipment:

chiller chilled water leaving temp
chiller chilled water entering temp
chiller condensed water leaving temp
chiller condensed water entering temp.

Figure 14:
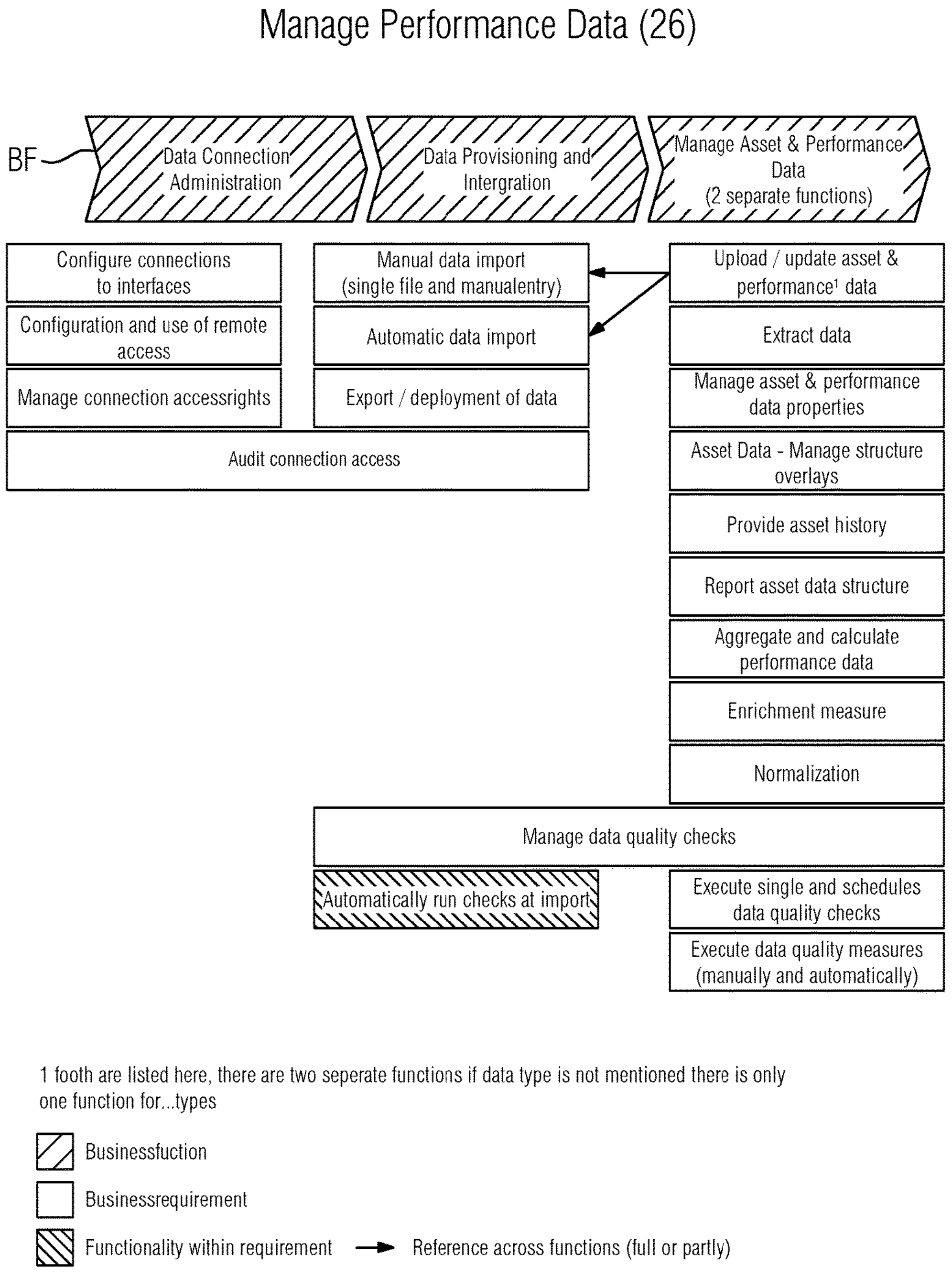
FIG. 14 illustrates exemplary function blocks for data connection administration, data provisioning and integration, managing asset data, and managing performance data that may be implemented in the management system and employed by the service platform system in accordance with disclosed embodiments of the present invention.

FIG. 14 illustrates exemplary function blocks for the business functions BF "data connection administration", "data provisioning and integration", "managing asset data", and "managing performance data" used for systems and methods (advantageously computer-facilitated methods) for providing optimization and/or improvement measures for one or more buildings. Advantageously the business functions "managing asset data", and "managing performance data" are regarded as two separate functions.

In FIG. 14 the gray arrows on the top showing the business functions BF "data connection administration", "data provisioning and integration", "managing asset data", and "managing performance data" used for systems and methods for providing optimization and/or improvement measures for one or more buildings. Below the business functions BF the respective business requirements for each of the business functions BF are listed as rectangles with white background and black font. Rectangles with gray background and black font represent functionality within a requirement. The black arrows represent references across functions (full or partly).

Figure 15:
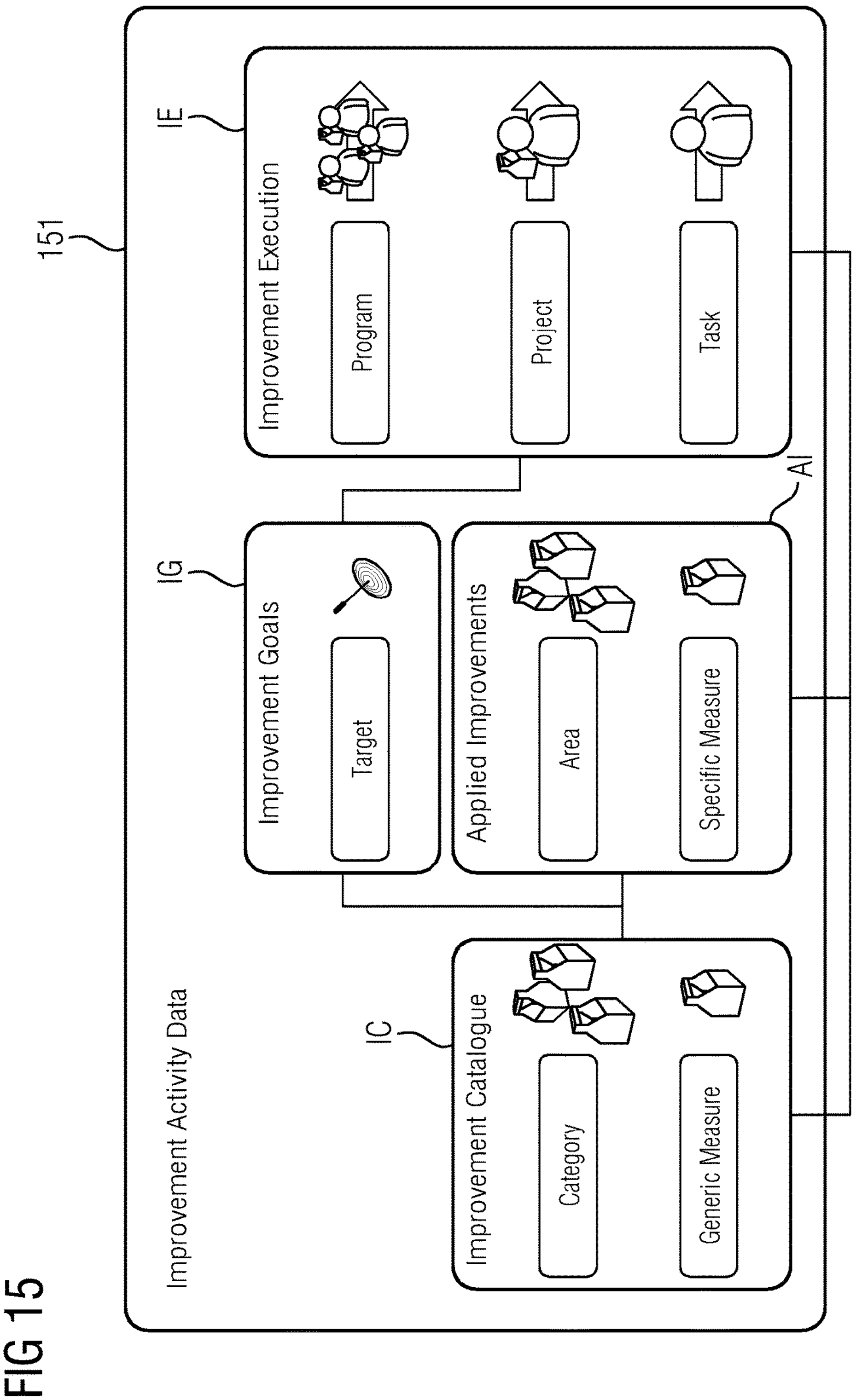
FIG. 15 illustrates an exemplary block diagram depicting improvement activity data that may be generated and managed by the service platform system in accordance with disclosed embodiments of the present invention.

FIG. 15 illustrates an exemplary block diagram regarding improvement activity data 151 regarding optimization and/or improvement measures for one or more buildings. The improvement activity data 151 are provided to the respective customer (e.g. owner or operator of the building) and/or directly to a partner of the customer (e.g. manufacturer or maintenance staff of an installed system (e.g. HVAC-System). The improvement activity data 151 are determined based on the asset data and on the respective performance data of the assets. The improvement activity data 151 and the respective improvement measures relate to one or more consumable resources in the one or more buildings and are determined by using a computer system configured for analyzing the asset data and the respective performance data based on internal and/or external key performance indicators (KPIs) and rules provided by a database, in particular by an expert database. Advantageously the improvement activity data 151 and the respective improvement measures are provided by using case based reasoning (CBR) mechanisms (suitable processor, database, and software). To provide improvement activity data 151 and the respective improvement measures also rule induction algorithms (machine learning) can be used. The improvement activity data 151 and the respective improvement measures can be provided (according to the needs of the respective customer) in different granularities. FIG. 15 illustrates examples of improvement activity data 151 or improvement measures:

Improvement Catalogue IC, providing improvement measures in a generic manner;

Improvement Goals IG, providing targets to be achieved by improvement measures;

Applied Improvements AI, providing specific measures for specific areas;

Improvement Execution IE, providing structured and dedicated information how improvement measures are to be deployed or implemented on customer side (e.g. in form of an improvement program, improvement project, or improvement task.

This means that dedicated and adequate improvement activities 151 or measures can be provided according to the respective type of customer and according to the respective customer needs and circumstances.

FIG. 15 illustrates a data structure for improvement activity data 151 on a high level. The connection-lines illustrates relations between the classes or objects. E.g. improvement goals IG are achieved by improvement execution IE (e.g. by implementing a task).

Figure 16:
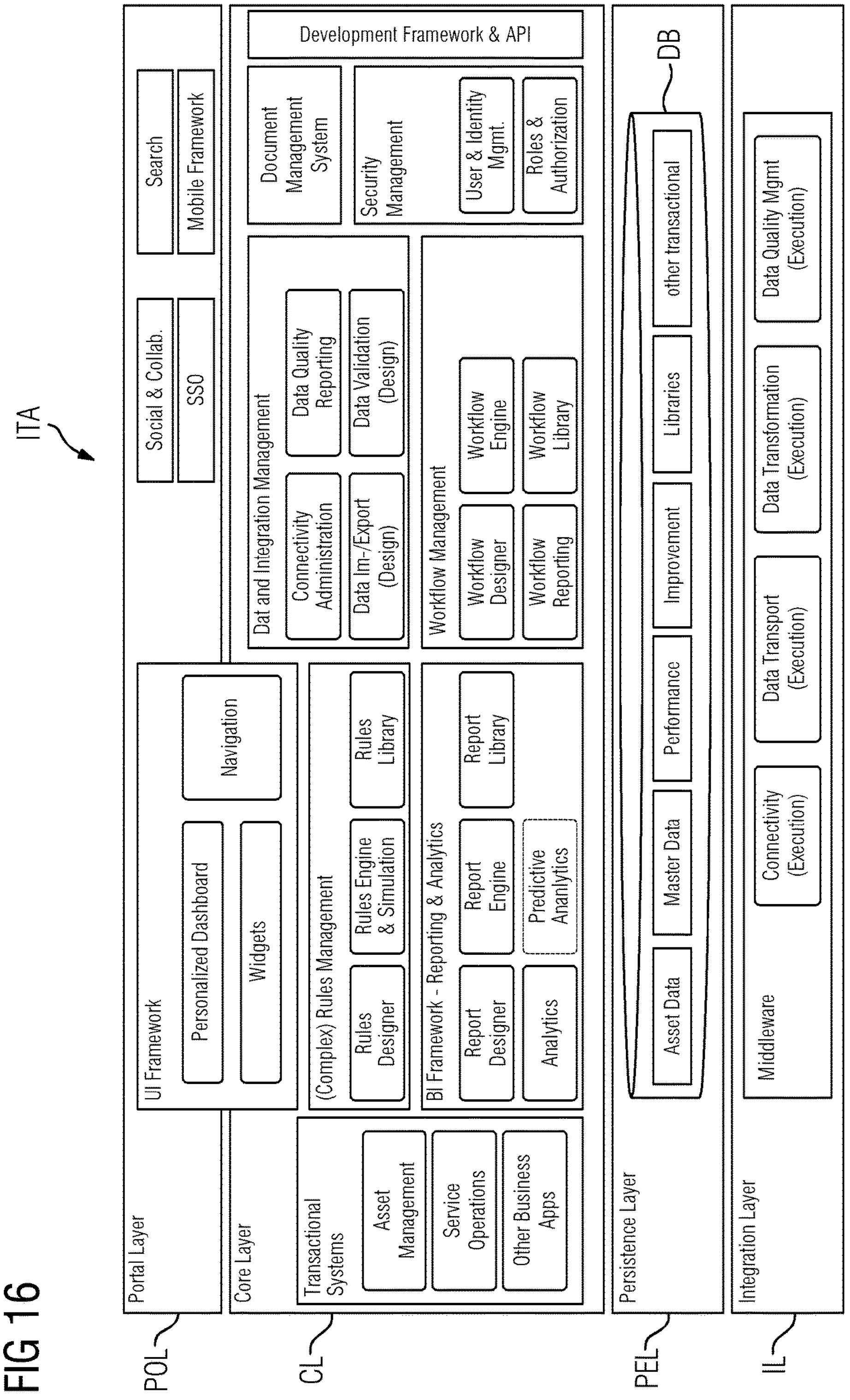
FIG. 16 illustrates an exemplary IT architecture diagram that may be employed by the service platform system in accordance with disclosed embodiments of the present invention.

FIG. 16 illustrates in one embodiment, an exemplary IT architecture diagram ITA for implementing the inventive systems and/or computer-facilitated methods for providing optimization or improvement measures for one or more buildings. FIG. 16 illustrates a tiered architecture having a plurality of layers, such as a Portal Layer POL having e.g. a user interface framework, a Core Layer CL having e.g. Transactional Systems, Rules Management Engine, a BI (Business Intelligence) Framework for Reporting & Analytics, a Data and Integration Management, a Workflow Management, a Document Management System, Security Management, and a Development Framework & API (Application Programming Interface), a Persistence Layer PEL, e.g. one or more flash memories DB for Asset Data, Master Data, Performance Data, Improvement Measures, respective Libraries, and an Integration Layer IL, e.g. Middleware for Connectivity, Data Transport, Data Transformation, and Data Quality Management. The BI Framework comprises an analytics engine suitable to process static asset data and the corresponding dynamic performance data, and the respective improvement activities data. The Middleware of Integration Layer IL can be used e.g. for connecting distributed software components and/or applications. As hardware and software components for implementing the inventive systems and/or computer-facilitated methods e.g. suitable commercially available components (processor, memory, communication, I/O devices, etc.) and software (word processor, spread sheets, databases, communication protocols, etc.) can be used.

Figure 17:
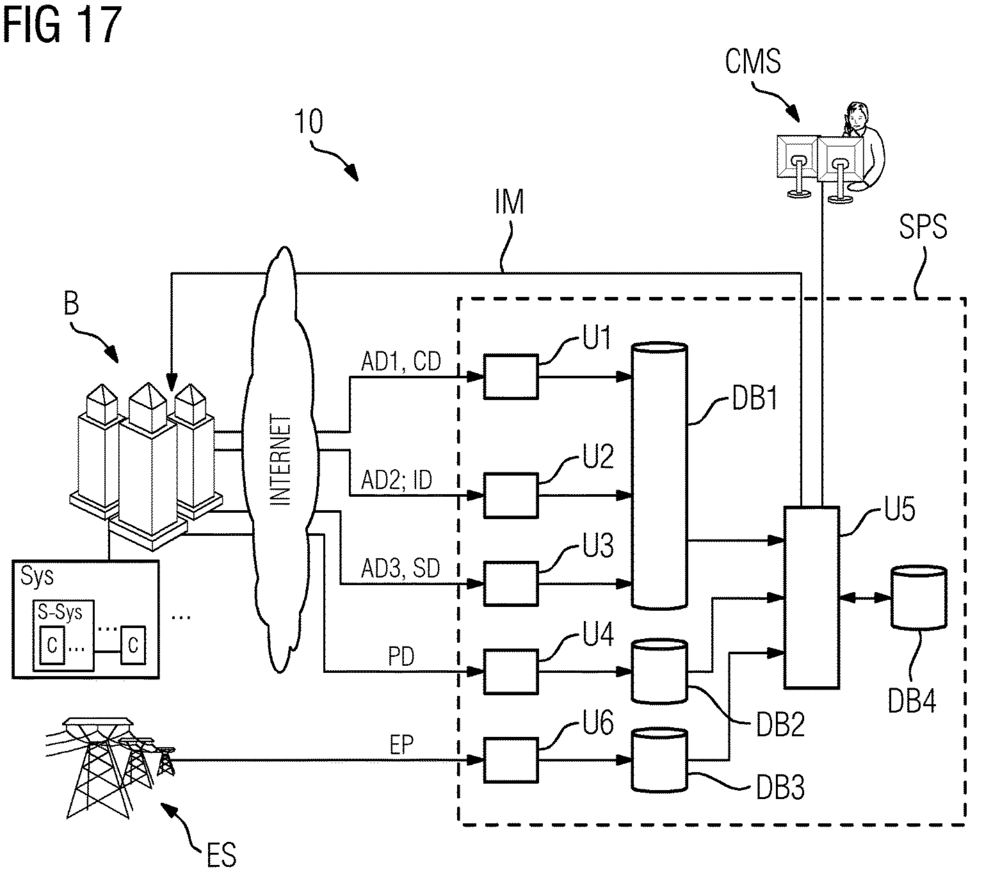
FIG. 17 illustrates an exemplary schematic diagram of a management system for providing optimization and/or improvement measures for one or more buildings in accordance with disclosed embodiments of the present invention.

FIG. 17 illustrates an exemplary schematic diagram showing an exemplary system SPS for providing optimization and/or improvement measures for one or more buildings B. Advantageously the system SPS is implemented as a service platform providing improvement measures to optimize or improve the operation of one or more buildings B. Customers (e.g. building owners) can request such improvement measures by interacting with the service platform system SPS by conventional network connections (e.g. Internet or remote data transmission connections). Advantageously a service level agreement between the provider of the service platform system SPS and the customer specifies the level of services the customer can request from the service platform system SPS.

Advantageously the service platform system SPS is realized by using one or a plurality of conventional servers having adequate processing power and adequate input/output means (keyboard, mouse, monitors, etc). Furthermore the service platform system SPS comprises adequate storage means (one or more database, RAM, etc.) and communication means for receiving the asset and performance data from the one or more buildings B and/or for receiving energy prices from an energy supplier ES.

FIG. 17 illustrates an exemplary service platform system SPS for providing optimization or improvement measures IM for one or more buildings B, the service platform system SPS comprising:

a unit U1 for receiving first asset data AD1 corresponding to assets of a category 1 in the one or more buildings B, wherein the assets of the category 1 include at least one of the one or more buildings B, components within such buildings B, or at least one space within such buildings and wherein the first asset data AD1 comprises information regarding the location of the assets of category 1;

a unit U2 for receiving second asset data AD2 corresponding to assets of a category 2 in the one or more buildings B, wherein the assets of the category 2 comprise at least one of the components within the technical infrastructure of such buildings B and the second asset data AD2 comprises information regarding said technical infrastructure components;

a unit U3 for receiving third asset data AD3 of assets of a category 3 in the one or more buildings B, wherein the assets of the category 3 comprise one or more spaces within such buildings B and the third asset data AD3 comprises information regarding the physical structure of such one or more spaces;

a unit U4 for receiving performance data PD of the assets of category 1 and/or category 2 and/or category 3, wherein the performance data PD comprising operating data, usage data, and sensed data;

a unit U5 for determining, based on the first, the second, and the third asset data AD1, AD2, AD3 and on the performance data PD, improvement measures IM related to a consumable resource in the one or more buildings B by using a computer system configured for analyzing the asset data and the respective performance data PD based on internal and/or external key performance indicators (KPIs) and rules provided by a database DB4. Advantageously the database DB4 is an expert database or a knowledge base (e.g. realized in a repository).

Advantageously the performance data PD are received in a resolution higher than 60 minutes (e.g. 5 minutes or 15 minutes).

Typically performance data PD are stemming from assets regarding the technical infrastructure of the one or more buildings B. Typically the technical infrastructure of the one or more buildings B comprises a plenty of systems Sys (e.g. Building Management System, HVAC System, water supply system,), a system Sys comprises sub-systems S-Sys (e.g. an air handling unit), and a sub-system S-Sys comprises components C (e.g. damper, valves, fans). Components C can also be actors or sensors operatively included in or connected to a sub-system S-Sys. Components C can also be controllers for controlling a sub-system S-Sys.

But performance data PD can also stem from assets regarding the physical structure of the one or more buildings B. For instance a space (e.g. a room) in a building B can consume energy and produce heat, depending on the respective occupancy.

Sources for providing performance data PD of the one or more buildings B can be a building management system (BMS), a controller of a building management system, meters in or for the building (e.g. for electricity, water), building automation devices (e.g. BACnet devices (Building Automation and Control Networks) or KNX devices), sensors (inside and/or outside the buildings). Furthermore performance data PD can comprise weather data, weather forecast data, or data regarding consumable resources utilized in the one or more buildings B. The data (e.g. tariffs, prices, shortages) regarding consumable resources can be provided by a utility or an energy supplier ES.

FIG. 17 shows a further exemplary schematic overview diagram of a management system 10 that depicts various aspects and embodiments of the present invention.

In FIG. 1 the service platform system SPS is exemplary illustrated with a dashed line rectangle.

The units U1 to U4 for receiving the asset data AD1 to AD3 or the performance data PD can be realized as interfaces or modules capable to receive data from conventional network connections. Also the unit U6 can be realized as interface or module capable to receive e.g. information regarding energy prices EP from one or more energy providers ES via conventional network connections (e.g. Internet).

In FIG. 17 the asset data AD1 to AD3 received by the units U1 to U3 are stored exemplary in a common database DB1, the received performance data PD are stored exemplary in a database DB2, and the information regarding energy prices EP are stored in a database DB3. It is also possible to store each asset data AD1 to AD3 in a respective separate database. In the illustration according to FIG. 17 the internal and/or external key performance indicators (KPIs) and rules are stored a separate database DB4, in particular in an expert database. The databases DB1 to DB4 can be implemented e.g. as physically separated databases (each database is realized and maintained on a separate database server) or the databases DB1 to DB4 can also be implemented in a common database (as a common database server). Advantageously some or all of the databases DB1 to DB4 are in-memory databases and/or multi-tenant databases.

The unit U5 for determining improvement measures related to a consumable resource in the one or more buildings B can be realized by a software program or software module running on an adequate processor of a computer system. The unit U5 is using rules and/or key performance indicators (KPIs) to analyze the received asset data AD1 to AD3 and the respective performance data PD to determine or to derive improvement measures IM related to a consumable resource in the one or more buildings B. Advantageously current and/or expected energy prices EP are taken into account by the unit U5 when determining improvement measures IM. A consumable resource can be e.g. water, air, gas, oil, or electricity.

The improvement measures IM can be provided on demand automatically to the respective customer (e.g. building owner) or by further review and/or treatment by staff (e.g. energy or environmental experts) of a control & monitoring center CMS of the provider of the service platform system SPS.

Advantageously the performance data PD are received in a resolution or frequency higher than 60 minutes (e.g. 5 minutes or 15 minutes). This enables a just in time response of the service platform system SPS to provide dedicated improvement measures IM which can be deployed on short-notice on customer side in the one or more buildings B.

Advantageously the service platform system SPS is realized as a cloud based platform, wherein the infrastructure and/or the platform and/or the software programs (or parts of the infrastructure or of the platform or of the software) are provided by a cloud service provider.

The service platform system SPS enables e.g. reduction of energy usage or an efficient energy usage in the one or more buildings B. Furthermore the service platform system SPS provides accurate and reliable information about the one or more buildings B to be optimized, to make timely and informed decisions regarding measures to decrease energy costs.

The service platform system SPS can be operated in different modes according to the respective service level agreement between customers and the provider of the service platform system SPS. The service platform system SPS can be operated in an open loop operating mode in which the improvement measures IM can be provided to a customer (e.g. building owner) in form of recommendations (e.g. in form of an improvement project plan). In this operating mode the recommendations or a subset of the recommendations are implemented by the customer or by responsibility of the customer.

The service platform system SPS can also be operated in a closed loop operating mode in which the improvement measures IM are directly provided to or implemented in a respective system, sub-system, or component. This can be accomplished e.g. by automatically populating new settings or parameters to a respective component, or by automatically sending out replacement orders for a sub-system or a component (e.g. damper) to a spare part provider in the proximity of the respective building.

In a further embodiment the service provisioning system SPS comprises:

- a first interface
  - for receiving connection data CD concerning the one or more buildings B, wherein the connection data CD at least comprise information regarding the location of the one or more buildings B and/or regarding the local networks for traffic, electricity distribution or gas distribution and/or regarding local service providers or replacement component suppliers for the infrastructure Sys, S-Sys, C (systems, sub-systems, components installed in the building) of the building B;
  - for receiving infrastructure data ID concerning the one or more buildings B, wherein the infrastructure data ID at least comprise information regarding systems of the one or more buildings B for heating, ventilating or cooling, for access control, for intrusion detection, for fire detection, for lighting, for elevator control, for electricity distribution, for electricity generation, or for heat collection;

for receiving at the computer structural data SD concerning the one or more buildings, wherein the structural data SD at least comprise information regarding the orientation of the one or more buildings B, or regarding the building envelope, in particular the materials, such as glass or concrete, with their properties, such as heat flow resistance, heat capacity or sound transmission, or regarding the inner structure, such as walls, rooms and their designated intended use, doors, stairs or elevators;

a memory device for storing the connection data CD, the infrastructure data ID, and the structural data SD;

a second interface for receiving performance data PD associated in each case with the connection data CD, the infrastructure data ID, or the structural data SD, or subsets of these data, wherein the performance data comprise at least lifecycle data of a device or a part thereof, utility usage data or sensed comfort data;

a computer for determining improvement measures IM related to at least one consumable resource in the one or more buildings B, based on the connection data CD, the infrastructure data ID, and the structural data SD and on the performance data PD, or on subsets of these data, wherein the computer comprises a rules engine configured for analyzing and/or assessing the connection data CD, the infrastructure data ID, the structural data SD, and the respective performance data PD, or subsets of these data, based on internal and/or external key performance indicators (KPIs) and rules. Advantageously the key performance indicators (KPIs) and rules are provided by a database DB4, in particular by an expert database.

The connection data CD comprise information regarding the location, the vicinity, and the surroundings of the one or more buildings B. Connection data CD can comprise also information regarding the settlement of utilities, building equipment provider, or building service provider in the vicinity of the one or more buildings B.

Infrastructure data ID comprise information regarding assets, equipment, installations obstructed in the one or more buildings B or used to operate the one or more buildings B.

Structural data SD comprise information regarding the physical structure (e.g. space, floors, rooms, windows) or the construction material of the one or more buildings B.

The first interface for receiving connection data CD, infrastructure data ID, and structural data SD can be realized by a common interface or by separate interfaces or modules U1 to U3. The information provided by utilities (e.g. energy provider or energy supplier ES) can be received at the system via the first common interface or by a separate interface or module U6.

An embodiment is that the service provisioning system SPS further comprises an output device for displaying in particular information indicative to the improvement measures IM related to a consumable resource.

An embodiment is that the service provisioning system SPS further comprises an output device (e.g. monitor station) for displaying in particular information indicative to the improvement measures related to a consumable resource, in particular to predicted consequences of applying the improvement measures to the consumable resource, in particular in a defined time frame.

An embodiment is that the performance data PD are received and processed at the system (e.g. at the service provisioning platform or at a management system) in a resolution higher than 60 minutes, in particular in a resolution higher than 15 minutes.

Advantageously the service provisioning system SPS is part of a management system, in particular of a building management system.

Advantageously the service provisioning system SPS is realized as a web-based platform having a portal to interconnect with customers (e.g. building owners).

Figure 18:
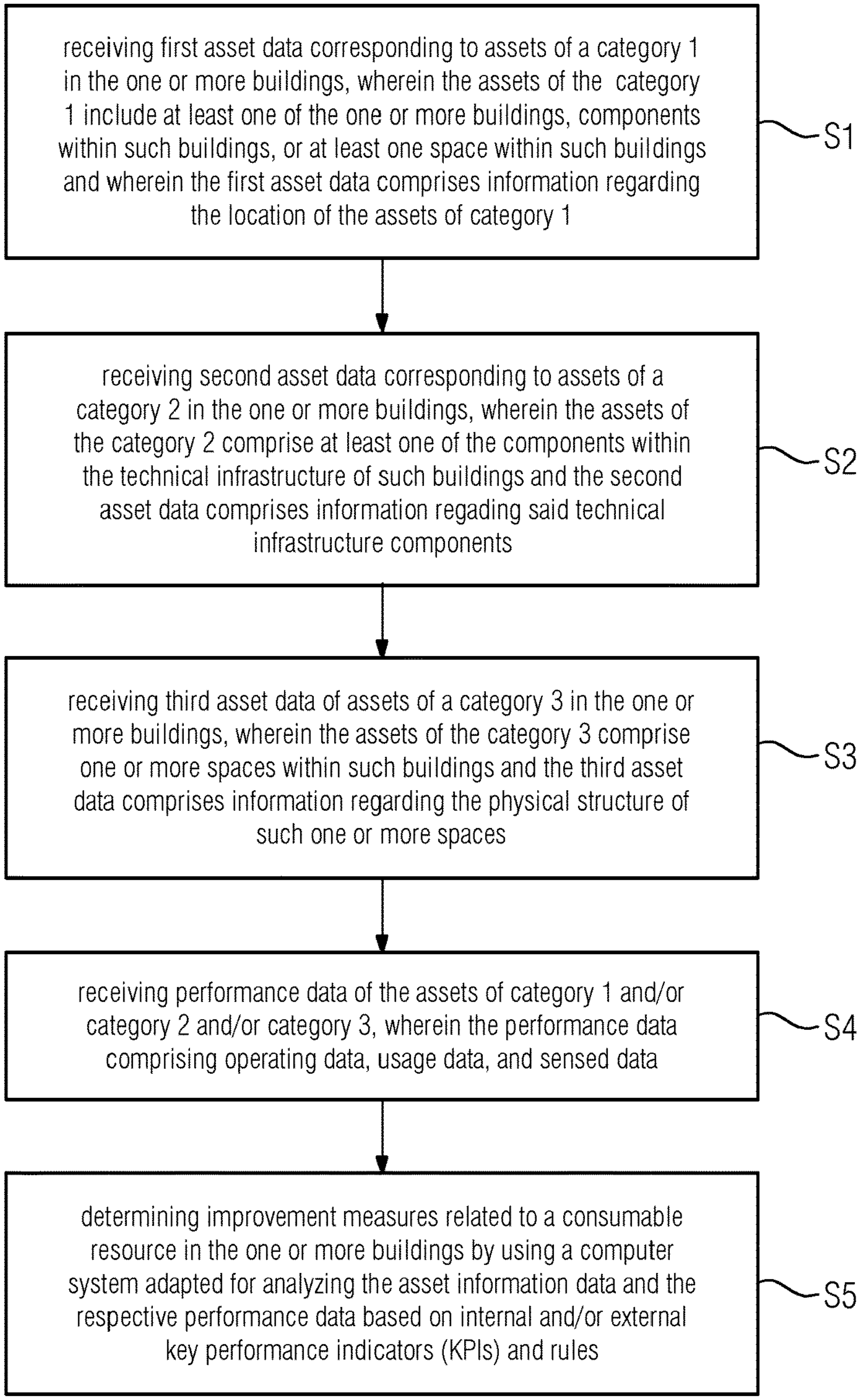
FIG. 18 illustrates a first exemplary flow diagram depicting a process in e.g. a management system for providing optimization and/or improvement measures for one or more buildings in accordance with disclosed embodiments of the present invention.

FIG. 18 illustrates an exemplary flow diagram showing method steps S1 to S5 for providing optimization and/or improvement measures for one or more buildings, the method comprising:

(S1) receiving first asset data corresponding to assets of a category 1 in the one or more buildings, wherein the assets of the category 1 include at least one of the one or more buildings, components within such buildings, or at least one space within such buildings and wherein the first asset data comprises information regarding the location of the assets of category 1;

(S2) receiving second asset data corresponding to assets of a category 2 in the one or more buildings, wherein the assets of the category 2 comprise at least one of the components within the technical infrastructure of such buildings and the second asset data comprises information regarding said technical infrastructure components;

(S3) receiving third asset data of assets of a category 3 in the one or more buildings, wherein the assets of the category 3 comprise one or more spaces within such buildings and the third asset data comprises information regarding the physical structure of such one or more spaces;

(S4) receiving performance data of the assets of category 1 and/or category 2 and/or category 3, wherein the performance data comprising operating data, usage data, and sensed data;

(S5) determining, based on the first, the second, and the third asset data and on the performance data, improvement measures related to a consumable resource in the one or more buildings by using a computer system configured for analyzing the asset data and the respective performance data based on internal and/or external key performance indicators (KPIs) and rules provided by a database, in particular by an expert database.

Advantageously the respective performance data are received in each case dynamically in a resolution or frequency in between 1 and 60 minutes, in particular in a resolution or frequency in between 1 and 15 minutes. This enables a fast and more or less just in time response with dedicated improvement measures IM to customer needs.

A consumable resource can be waste, sewage water, water, air, energy, electrical power, gas, or oil.

The method steps S1 to S5 can be implemented by using commercially available hardware (e.g. processor, memory, communication means) and software (rule engines for e.g. case based reasoning; decision tables for artificial intelligence; data bases (e.g. suitable in-memory data bases); programs for root cause analysis (RCA); or programs for root cause failure analysis (RCFA)).

Advantageously the method steps are all performed on side of the provider of the service platform system. This enables for instance a fast and efficient response to customer improvement requests.

FIGS. 19 to 24 describe an exemplary use case scenario for applying a complex rule to provide improvement measures based on asset data and corresponding performance data.

The use case scenario has been derived from an exemplary real life situation where the customer has a campus with several buildings, within each building different types of equipment (Air Handling Units (AHU), Chillers, Boilers etc.) with multiple instances of each type are operated. Within the exemplary use case scenario the focus is on performing a specific examination on a set of Air Handling Units with the goal to find periods where the equipment is not operated in an optimal way. This kind of approach is also known as "Fault Detection and Diagnostics (FDD).

The National Institute of Standards and Technology (NIST) has developed and published a set of rules to monitor AHU operational performance called APAR (AHU Performance Assessment Rules). From this set of 28 rules, rule no. 5 related to cooling with outdoor air has been selected for the present use case.

For further details see: http://fire.nist.gov/bfrlpubs/build07/PDF/b07023.pdf

For applying the rules following exemplary approach can be used:

Steps of Rules

- Step 1: Determine mode of operation (heating/cooling/economizer) for given AHUs in defined time period.
- Step 2: Determine time slots, where outside air temperature is too warm to cool the interior spaces with outdoor air
- Step 3: Calculate coil energy wastage from off-optimal operation
- Step 4: Calculate cost for energy wastage (for determined time slots)

Results of Rule Execution

- Graphical representation of duration of occurrences on a time line (see example for a suitable user interface illustrated in FIG. 24)
- Number of occurrences of this situation (in given time period)
- Total time of occurrences of this situation (in hours/minutes)
- Total wasted energy and total cost of wasted energy Additional Results to be Visualized

- Graphs for all rule input data for defined time period

FIG. 19 illustrates on the left hand side an exemplary data model for asset data AD4 regarding a building to which rules for providing improvement measures shall be applied, and on the right hand side the mapping of the exemplary data model into a suitable implementation tree-structure TS. The exemplary asset data AD4 indicate that the building to be analyzed comprises a HVAC System "HVACSystem" having air handling units "AHU(1)" to "AHU(3)". Exemplary air handling units "AHU(1)" comprising a fan and a plurality of sensors, e.g. for sensing Supply-Air-Temperature, Return-Air-Temperature, Mixed-Air-Temperature, Outside-Air-Flow-Volume, Supply-Air-Flow-Volume, or Return-Air-Humidity.

The FDD rule (Fault Detection and Diagnostics) runs on a set of performance data points (time series) like temperatures, valve positions, set points. These data points are assigned to the assets above. Input, calculations and results are being based on 15 minute interval data, since advantageously the performance data are provided in a resolution of 15 minutes or less.

Time series data, used during calculations in complex rules, are provided for each of the three air handling units AHU(1), AHU(2), and AHU(3).

In the tree-structure TS on the right hand side of FIG. 19 for the naming for the data points of measured performance data the Haystack approach or Haystack notation was used for naming identifiers (e.g. 1001-1-1-SYSTEM-1-HVAC-AHU-1.OCCUPIEDMODE, 1001-1-1-SYSTEM-1-HVAC-AHU-1-SENSOR.SUPPLYAIRTEMP, or 1001-1-1-SYSTEM-1-HVAC-AHU-1-SUPPLYAIRTEMPSETPOINT).

Figure 20:
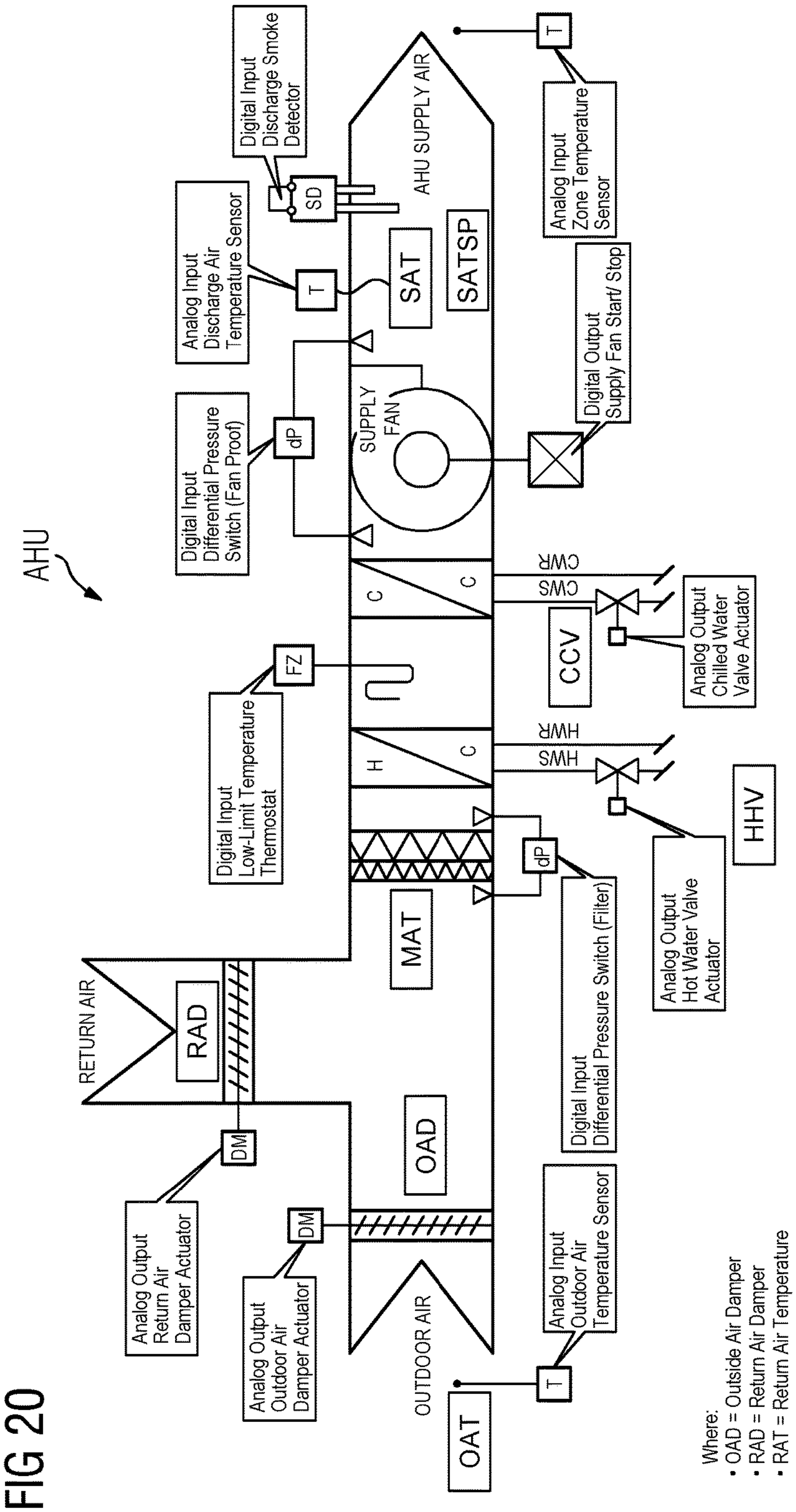
FIG. 20 illustrates an exemplary layout diagram of the air handling unit AHU(1) specified in the exemplary data model of FIG. 19.

FIG. 20 illustrates an exemplary layout diagram of an air handling unit AHU specified in the exemplary data model of FIG. 19. Typically, an air handling unit AHU mixes return air from space and outdoor air and modulates the cooling coil valve and heating coil valve in order to supply air at a desired temperature. The mixing of air is done by modulating dampers for outdoor air and return air. FIG. 20 illustrates the technical and mechanical background of an air handling unit e.g. for variable air volume (VAV) recirculation systems.

The layout of the air handling unit AHU illustrated in FIG. 20 is typically used for Building Office Areas.

Abbreviations used in FIG. 20:

OAD=Outside Air Damper
RAD=Return Air Damper
RAT=Return Air Temperature
MAT=Mixed Air Temperature
OAT=Outside Air Temperature
SAT=Supply Air Temperature
SATSP=Supply Air Temperature Setpoint
STPT=Setpoint
HHV=Hot water Heating Valve
CCV=Chilled water Cooling Valve FIG. 21 illustrates a table comprising the input parameters ITS, ISP of the NIST APAR Rule 5 "Outside air temperature to warm for economic cooling". Advantageously NIST APAR Rule 5 is applied if the outside air temperature is too warm to cool the interior spaces with outdoor air.

The table illustrated in FIG. 21 comprises two types of input parameters which are used for applying NIST APAR Rule 5: "Input Time Series" ITS (see left hand side of FIG. 21), and "Input Static Parameters" ISP (see right hand side of FIG. 21).

Advantageously the time series comprising the respective performance data are provided in a resolution of 15 minutes or less.

Figure 22:
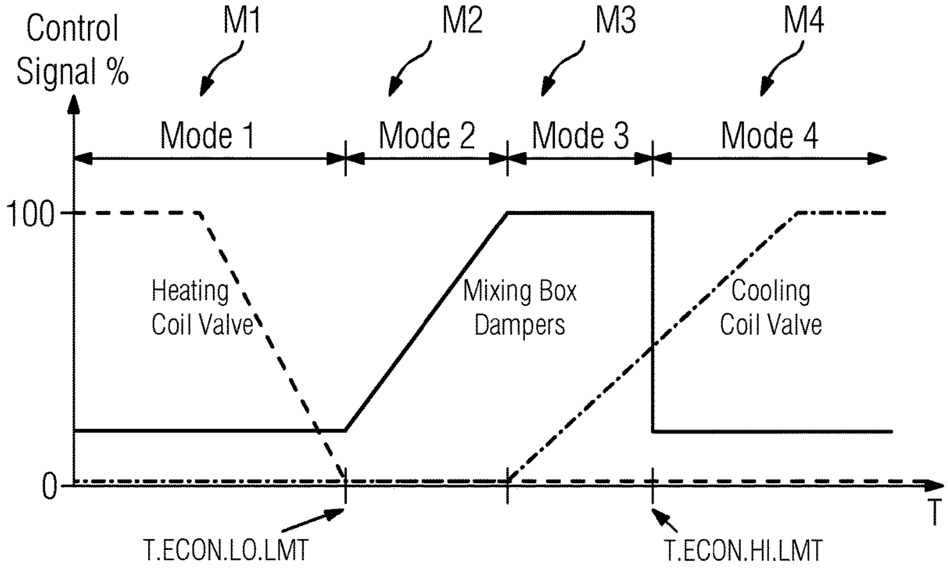
FIG. 22 illustrates an example for determining the mode of operation for the exemplary air handling unit of FIG. 20.

FIG. 22 illustrates an example for determining the mode of operation for e.g. the exemplary air handling unit illustrated in FIG. 20. In the presented exemplary approach for applying the rules for determining improvement measures regarding air handling units in Step 1 the modes of operation for the given air handling units AHUs in defined time in defined time periods are determined (e.g. heating/cooling/economizer).

The exemplary air handling units use common high-limit dry-bulb, temperature-based economizer logic, which is described as follows: "The outside-air dry-bulb temperature is compared to a high limit dry-bulb temperature. If the outside-air dry-bulb temperature is below the high limit dry-bulb temperature, then outside air is used to meet all or part of the cooling demand; the remainder of the cooling load is provided by mechanical cooling".

If the trended values do not include unit operation modes the diagram illustrated in FIG. 22 can be used to determine the respective mode of operation of the given air handling units. FIG. 22 illustrates a two dimensional coordinate system, wherein the x-axis represents the temperature T, and the y-axis represents control signals in percentage (%). In particular the diagram illustrated in FIG. 22 shows OA/RA (outside air/return air) damper and heating/cooling valve control signals settings and their associated modes M1 to M4.

In the diagram illustrated in FIG. 22 the values for "economizer low limit temperature" (T.ECON.LO.LMT) and for "economizer high limit temperature" (T.ECON.HI.LMT) are marked with arrows.

In the use case scenario specified in FIGS. 19 to 24 the rules are applied to air handling units operating in Mode 2 (M2). Mode 2 means cooling with outdoor air only (100% economizer).

In the diagram illustrated in FIG. 22 operating mode 2 (M2) for an air handling unit lies in the temperature band between "economizer low limit temperature" (T.ECON-.LO.LMT) and the temperature as of which control signals for "Cooling Coil Valve" are identified.

FIG. 23 illustrates a table depicting exemplary modes M0 to M5 for operating an air handling unit and rules MR assigned to the respective modes. Each exemplary (or defined) operating mode M0 to M5 is represented in a respective line of the table. The first column (MC) represents a code for the respective mode. The second column (MD) represents a description for the respective mode M0 to M5. The third column (MR) represents a rule for the respective mode M0 to M5.

As mentioned above the use case scenario specified in FIGS. 19 to 24 is focused on operation mode 2 of air handling units. Mode 2 means cooling with outdoor air only (100% economizer). To determine improvement measures for air handling units which are operating in mode 2, the following rule will be applied:

"T.ECON.LO.LMT≤OAT≤T.ECON.HI.LMT

And

MAT≤SATSP−DT.SFAN"

Where:

- OCC=Unit Occupied Mode Status
- MAT=measured or calculated mixed air temperature
- SATSP=supply (coil discharge) air temperature set-point
- OAT=outside air temperature (sensor)
- DT.SFAN=temperature rise across supply fan (e.g. 2° F.)
- T.ECON.LO.LMT=low limit temperature for economizer operation
- T.ECON.HI.LMT=high limit temperature for economizer operation In step 2 of the approach timeslots of error occurrence are determined. During these timeslots the air handling unit is working inefficiently, since the outside air temperature is too warm to cool the interior spaces with outdoor air.

An Error is existent (or inefficiency is present) when all the following conditions occur:

- AHU is in operation (SFS=ON)
- AHU is in Occupied Mode (OCC=ON)
- MODE=2 (Cooling with outdoor air)
- Outside air temperature is greater than supply air temperature setpoint minus the temperature rise across supply fan plus the threshold for errors in temperature measurements. In mathematical form:

OAT>SATSP−DR.SFAN+EPSILON.T (1)

In step 3 of the approach the coil energy wastage from off-optimal operation is calculated. Coil thermal power waste is defined as the energy per unit time (per 15-minute interval in the given case) that is wasted by providing mechanical cooling, when there is no free economizer cooling available to totally or partially satisfy cooling load.

Therefore, coil thermal power wastage is calculated as any detectable enthalpy drop across the cooling coil from the equation:

$$\dot{q}_{cc}=\rho_{ma}\dot{v}_{sa}h_{ma}-\rho_{sa}\dot{v}_{sa}h_{da}=\dot{v}_{sa}(\rho_{ma}h_{ma}-\rho_{sa}h_{da}) \quad (2)$$

Where:

- $\dot{q}_{cc}$ is the thermal power (energy per unit time) waste across the cooling coil
- $\dot{v}_{sa}$ is the measured volumetric flow rate of the air across the coil (supply air flow, SAFLOW)
- $h_{ma}$ is the calculated mixed air enthalpy (air upstream of the cooling coil)
- $h_{da}$ is the calculated coil discharge air enthalpy (air downstream of the cooling coil)

To implement this equation a sequence of calculations is necessary. But besides this the main target of this use case is to show how the solution supports the implementation through an easy to use interface and without programming knowledge.

This is a suggested sequence—in reverse order—of calculations for the thermal power. These calculations have to be performed per 15-minute interval within the fault periods based on equation (2).

$\dot{q}_{cc}=\dot{q}_{ccDry}+\dot{q}_{ccWet}$ (in btu/h)

$\dot{q}_{ccDry}$=60*SAFLOW*2117/PAirDuct/GasContant/(SAT+460)*($H_{ma}-H_{da}$)

$\dot{q}_{ccWet}$=$\text{Term}_1-\text{Term}_2$ $\text{Term}_1$=60*SAFLOW*2117/PAirDuct/GasConstant/(MAT+460)*$H_{ma}$ $\text{Term}_2$=60*SAFLOW*2117/PAirDuct/GasConstant/(MAT+460)*$H_{da}$ $H_{ma}$=HeatOfDryAir+0.45*$W_{ma}$*MAT+WaterEnthalpyZero$F$*$W_{ma}$ $H_{da}$=(HeatOfDryAir+0.45*$W_{ma}$)*SAT+WaterEnthalpyZero$F$*$W_{ma}$ $W_{ma}$=((1/(RAT+460))*(SAFLOW−OAFLOW)*$W_{ra}$+(1/(OAT+460))*OAFLOW*$W_{oa}$)/((1/(RAT+460))*(SAFLOW−OAFLOW)+(1/(OAT+460))*OAFLOW)

$W_{ra}$=RatioWaterVaporToAir*RARH/100*$10^{ExpRA/(1\text{-}RARH/100*10^{ExpRA}}$)

$W_{oa}$=RatioWaterVaporToAir*OARH/100*$10^{ExpOA/(1\text{-}OARH/100*10^{EpOA}}$)

ExpRA=10.79586*(1−ThetaRA)+5.02808*log 10(ThetaRA)−2.219598

ExpOA=10.79586*(1−ThetaOA)+5.02808*log 10(ThetaOA)−2.219598

ThetaRA=WaterTriplePointKelvin/((RAT−WaterTriplePoint$F$)/1.8+WaterTriplePointKelvin ThetaRA=WaterTriplePointKelvin/((OAT−WaterTriplePoint$F$)/1.8+WaterTriplePointKelvin (3)

Used Constants in Formulas Above:

| Constant | Value |
|---|---|
| PAirDuct | 29.921 |
| GasConstant | 53.4706 |
| HeatOfDryAir | 0.24 |
| WaterEnthalpyZeroF | 1061 |
| RatioWaterVaporToAir | 0.622 |
| WaterTriplePointF | 32 |
| WaterTriplePointKelvin | 273.16 |

Time series and constants—like SAFLOW, OAFLOW, MAT, SAT, RAT, OAT—are defined in table illustrated in FIG. 21.

In step 4 of the approach the corresponding costs for energy wastage (for determined time slots) are calculated.

Calculating costs for energy wastage (Energy Cost waste) Cw (in $) per 15-minute interval is based on results from equation (3), explained above.

Formula to Determine Energy Cost Waste Cw:

$$C_w=\dot{q}_{cc}*\text{AVE.PLANT.KW.PER.TON}*\text{ELECT.RATE}*0.25/120000 \quad (4)$$

Time series and constants (AVE.PLANT.KW.PER.TON, ELECT.RATE) are defined in the table illustrated in FIG. 21.

The final step is calculating the total cost of wasted energy based on the sum of all 15-minute values from equation (4).

Figure 24:
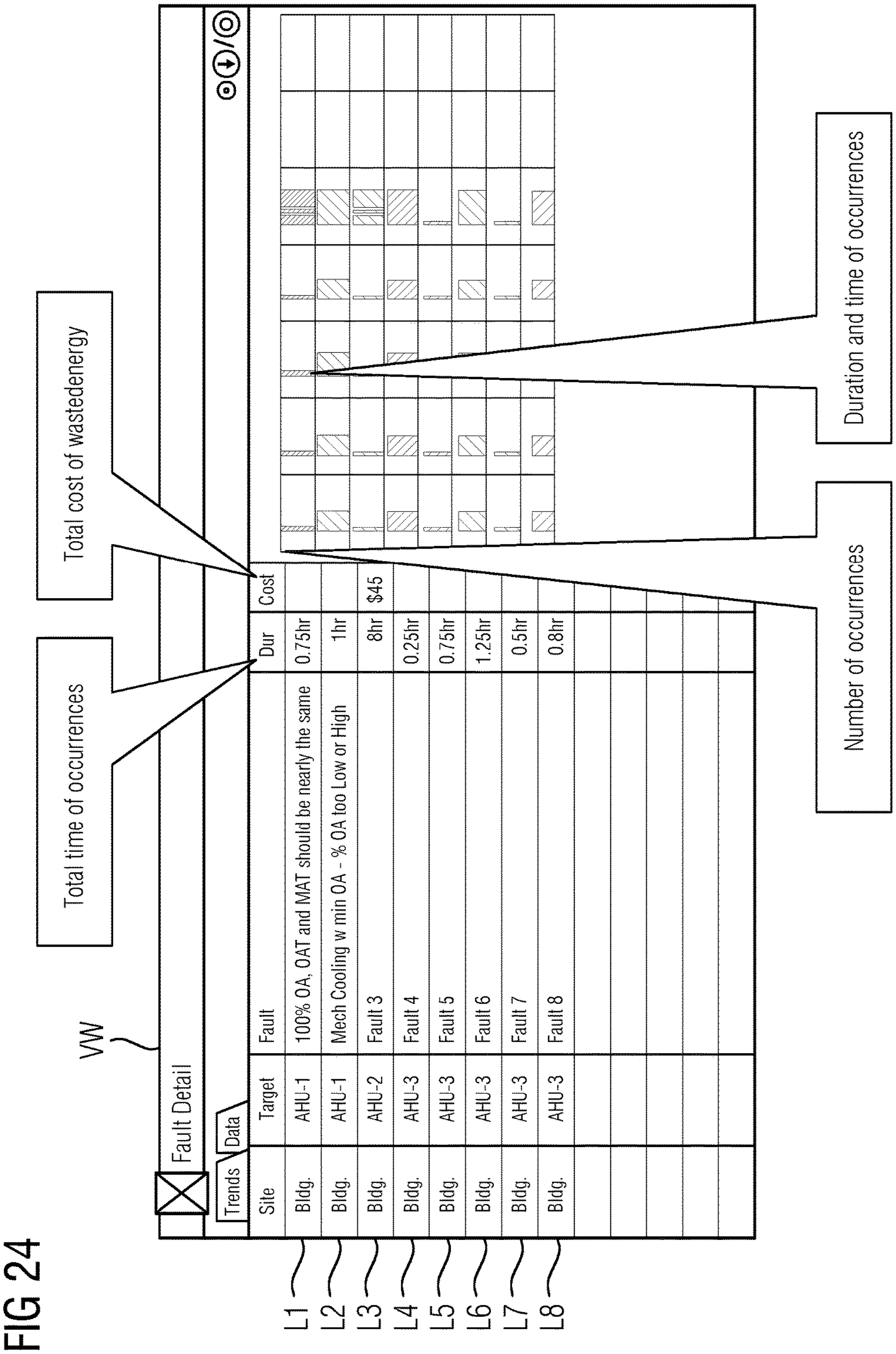
FIG. 24 illustrates an exemplary visualization window for showing the results of applying one or more rules.

FIG. 24 illustrates an exemplary visualization window VW for showing the results of applying one or more rules. The exemplary visualization window VW can be part of a dashboard user inter face or of the user interface of a control & monitoring station.

The exemplary visualization window VW is mainly arranged in a line-oriented structure. Line L1 illustrates that a rule was applied to the air handling unit AHU-1 of building 1. Line L2 illustrates that a further rule was applied to the air handling unit AHU-1 of building 1. Line L3 illustrates that a rule was applied to the air handling unit AHU-2 of building 1. Line L4 illustrates that a rule was applied to the air handling unit AHU-3 of building 1. Lines L5 to L6 illustrate that further rules were applied to the air handling unit AHU-3 of building 1.

Column "Dur" of the visualization window VW shows the "Total time of occurrences" of errors or inefficiencies determined by the respective rule. The rule represented in line L2 and applied to the air handling unit AHU-1 of building 1 determines 1 hour time of inefficiency by air handling unit AHU-1.

Column "Cost" of the visualization window VW shows the "Total cost of wasted energy", means the cost which were caused by operating an air handling unit inefficiently.

The rule represented in line L3 and applied to the air handling unit AHU-2 of building 1 determines 8 hours of inefficiency by air handling unit AHU-2 which causes $45 cost of wasted energy.

The exemplary graphical user interface VW illustrated in FIG. 24 shows on the right hand side exemplary graphical representations (in the shape of schematic horizontal bar diagrams) for illustrating the "Number of occurrences" and the "Duration and time of occurrences".

Occurrences means "occurrences of errors or inefficiencies".

Advantageously the rules are "coded" by using a script language (means a programming language which support scripts, e.g. Perl or Phyton). The scripts are fed with asset data and performance data (e.g. provided by one or more databases). Advantageously the rules are processed by a suitable rules based analytics engine (e.g. a run-time environment) that interprets the rules automatically and performs assessments based on the provided asset data and performance data, and provides improvement measures. Advantageously the results of assessments are provided in a graphical way.

Figure 25:
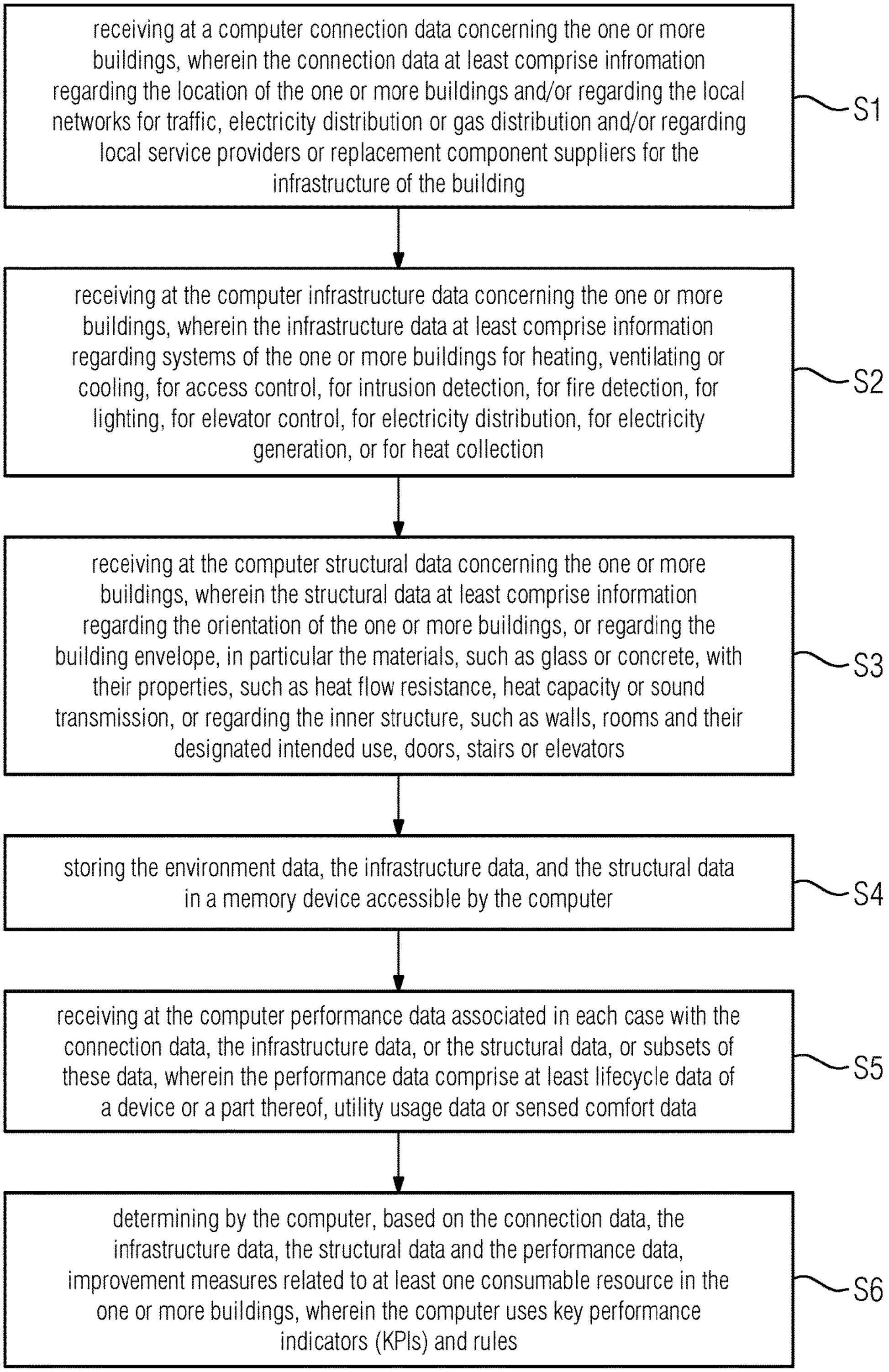
FIG. 25 illustrates a second exemplary flow diagram depicting a further process for providing optimization and/or improvement measures for one or more buildings in accordance with disclosed embodiments of the present invention.

FIG. 25 illustrates a second exemplary flow diagram depicting a further process for providing optimization and/or improvement measures for one or more buildings in accordance with disclosed embodiments of the present invention.

FIG. 25 illustrates a computer-implemented method for providing optimization or improvement measures for one or more buildings B, the method comprising:

(S1) receiving at a computer connection data CD concerning the one or more buildings, wherein the connection data CD at least comprise information regarding the location of the one or more buildings and/or regarding the local networks for traffic, electricity distribution or gas distribution and/or regarding local service providers or replacement component suppliers for the infrastructure of the building;

(S2) receiving at the computer infrastructure data ID concerning the one or more buildings, wherein the infrastructure data ID at least comprise information regarding systems of the one or more buildings B for heating, ventilating or cooling, for access control, for intrusion detection, for fire detection, for lighting, for elevator control, for electricity distribution, for electricity generation, or for heat collection;

(S3) receiving at the computer structural data SD concerning the one or more buildings, wherein the structural data SD at least comprise information
- regarding the orientation of the one or more buildings, or
  - regarding the building envelope, in particular the materials, such as glass or concrete, with their properties, such as heat flow resistance, heat capacity or sound transmission, or
- regarding the inner structure, such as walls, rooms and their designated intended use, doors, stairs or elevators;

(S4) storing the connection data CD, the infrastructure data ID, and the structural data SD in a memory device accessible by the computer;

(S5) receiving at the computer performance data PD associated in each case with the connection data CD, the infrastructure data ID, or the structural data SD, or subsets of these data, wherein the performance data PD comprise at least lifecycle data of a device or a part thereof, utility usage data or sensed comfort data;

(S6) determining by the computer, based on the connection data CD, the infrastructure data ID, the structural data SD and the performance data PD, improvement measures IM related to at least one consumable resource in the one or more buildings B, wherein the computer uses key performance indicators (KPIs) and rules.

Advantageously the computer is configured for analyzing and/or assessing the connection data CD, the infrastructure data ID, the structural data SD, and the respective performance data PD based on internal and/or external key performance indicators (KPIs) and rules provided by a database, in particular by an expert database.

An embodiment is that the improvement measures IM are determined by regression analysis, in particular by applying the least squares method. There exist robust and accurate software programs off the shelf for implementing statistical methods.

An embodiment is that the infrastructure data ID comprise information regarding the location of system components. This enables that an improvement measure can comprise specific and purposive information e.g. for service persons where in a building a component is to be replaced or repaired.

An embodiment is that the information regarding the inner structure comprises information regarding computers, copy machines, printers, coffee machines, refrigerator, or other white goods, in particular their location in the one or more buildings. Taking into account this kind of information increases the efficiency of the determined improvement measures.

An embodiment is that the performance data PD are received at the computer in a time resolution higher than 60 minutes. This enables a fast response in providing improvement measures.

An embodiment is that the performance data PD are received at the computer in a time resolution in between 1 and 15 minutes. This enables an even faster response in providing improvement measures. The faster improvement measures IM can be provided to a customer (e.g. a building owner), the faster the improvement measures can be implemented regarding the one or more buildings.

An embodiment is that the improvement measures IM comprise adding and/or adjusting and/or replacing an infrastructure system component. This means that dedicated and adequate improvement measures can be applied to an infrastructure system component in the one or more buildings. Advantageously the respective cost impacts are taken into account and provided to the customer.

An embodiment is that at least one of the improvement measures IM reduces the consumption of at least one consumable resource in the one or more buildings. Reducing the consumption of supplied resources means reducing the costs in operation a building and has furthermore a positive impact to environmental sustainability. The resource can be e.g. water, air, electrical power, gas, oil, organic waste for heating or sewage water for cooling.

An embodiment is that receiving of the connection data, the infrastructure data, the structural data, and of the performance data, and providing of the improvement measures is accomplished by a web portal. A customer can easily use the services provided by the service provisioning system.

An embodiment is that the method further comprises the step displaying information indicative to the improvement measure related to the respective consumable resource on a suitable output device. This enables that the impact of improvement measures can be illustrated in a graphical way.

An embodiment is that the method is performed in a web-based service platform or in a management system, in particular a building management system. The method can be integrated in existing building management systems.

The present invention provides in particular the following advantages:

- Analysis on all types of infrastructure within a building
- Continual analysis of building data over long periods of time
- Analysis of the building performance
- Analysis of several buildings in parallel
- Identification of errors (occurrences of inefficiency)
- Rule processes operate autonomously and/or interactively
- Automatically increasing the number of rules (e.g. by using an integrated self-learning-system)
- Based on the analysis and assessment of "data out of the building" the improvement measures can be determined abstractly of the installed equipment of the building
- The operating expenses of a building (OPEX cost) can be reduced by focusing of the "data out of the building", means by using a data centric approach A computer-facilitated method and a computerized system for providing optimization or improvement measures for one or more buildings, whereby based on asset data regarding the building and on corresponding performance data, improvement measures related to a consumable resource in the one or more buildings are determined by using a computer system configured for analyzing the asset data and the respective corresponding performance data based on internal and/or external key performance indicators (KPIs) and rules provided by a database, in particular by an expert database.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

Throughout the specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including", will be understood to imply the inclusion of a stated integer or group of integers but not the exclusion of any other integer or group of integers.

REFERENCE SIGNS

10 Management System
11,21,31,151,IM Improvement Data
12,22,32,92,102,112,122,PD Performance Data
13,23,33,43,53,83,103,113,AD1-AD4 Asset Data
14, B Building
15, ES Energy Suppliers
24,34,44 Customer
45 Customer Partner
BI Building Information
TI Technical Infrastructure
BS Building Structure
P Project
OL Overlay
LO Layout
BT1,BT2 Building Type
AT Attribute
DT Data Type
VT Value Type
ST Series Type
R Relation
BF Business Function
IC Improvement Catalogue
IG Improvement Goal
AI Applied Improvements
IE Improvement Execution
ITA IT Architecture
POL Portal Layer CL Core Layer
PEL Persistance Layer
IL Integration Layer
DB, DB1-DB4 Database
U1-U6 Unit
CMS Control & Monitoring Center
SPS Service Platform System
EP Energy Price
S1-S6 Method Step
TS Tree-Structure
AHU Air Handling Unit
ITS Input Time Series
ISP Input Static Parameters
M0-M5 Mode
MC Mode Code
MD Mode Description
MR Mode Rule
VW Visualization Window
L1-L8 Line
Sys System
Sub-Sys Sub-System
C Component
CD Connection Data
ID Infrastructure Data
SD Structural Data

What is claimed is:

1. A computer-facilitated method for providing optimization or improvement measures for one or more buildings, the method comprising:

receiving first asset data corresponding to assets of a category 1 in the one or more buildings, wherein the assets of the category 1 include at least one of the one or more buildings, components within such buildings, or at least one space within such buildings, and wherein the first asset data comprises location information regarding the assets of category 1;

receiving second asset data corresponding to assets of a category 2 in the one or more buildings, wherein the assets of the category 2 comprise at least one of components within a technical infrastructure of such buildings, and wherein the second asset data comprises information regarding said technical infrastructure components;

wherein the assets of category 2 comprise at least one ventilator drive that is operatively connected to a ventilator, or damper drives that are operatively connected to dampers, such ventilators and dampers being integrated into interconnected air ducts of the building;

the asset data of the assets of category 2 comprise the air flow capacity and energy consumption specifications of such ventilators and comprise air flow capacity specifications of such dampers;

receiving third asset data of assets of a category 3 in the one or more buildings, wherein the assets of the category 3 comprise one or more spaces within such buildings and the third asset data comprises information regarding a physical structure of such one or more spaces;

receiving performance data of the assets of category 1 and/or category 2 and/or category 3, wherein the performance data comprising operating data, usage data, and sensed data;

wherein the performance data of the assets of category 2 comprise an indication of the energy consumption of the ventilator drive and indications of the positions of the dampers; and determining, based on the first, the second, and the third asset data and on the performance data, improvement measures related to a consumable resource in the one or more buildings by using a computer system configured for analyzing the asset data and the respective performance data based on internal and/or external key performance indicators and rules;

wherein at least one of the internal key process indicators or external key process indicators comprise the indicated energy consumption of the ventilator drive at various position indications of the dampers, as well as the energy consumption specifications of the ventilator, wherein the rules are appropriate for concluding increased flow resistance in a specific air duct section or for concluding ventilator or damper impediment, and whereas the improvement measures comprise at least one of recommending inspection of ventilator, ventilator drive, damper, damper drive or air duct section, or inducing replacement thereof.

2. The method of claim 1, wherein the assets of category 1 comprise information regarding the country and/or the state and/or the county and/or the city and/or the site and/or the address of the one or more buildings and/or information regarding some or all of the local networks for traffic, electricity distribution, water distribution and gas distribution and/or regarding some or all of the local building service providers or replacement building component suppliers and/or regarding some or all of the local services for waste disposal or waste water removal.

3. The method of claim 1, wherein the assets of category 2 regarding the technical infrastructure comprise information regarding at least one of the equipment for climate control, access control, energy supply and control, security, fire safety, computers, printers, or mobile phones associated with the one or more buildings.

4. The method of claim 1, wherein the assets of category 3 regarding the physical building structure comprise information regarding at least one of the structural level, the number and structure of the floors, or the plant layout of the one or more buildings.

5. The method of claim 1, wherein the asset data comprise at least one of quantities, types, parametrization, or configuration data of the respective assets.

6. The method of claim 1, wherein the consumable resource comprises waste, sewage water, water, air, energy, electrical power, gas, or oil.

7. The method of claim 1, wherein the performance data comprise at least one of building control system data, electricity metering, heat metering, water metering, temperature data, humidity data, pressure data, event data, alarm data, status data, weather data, price data, or data from other buildings.

8. The method of claim 1, comprising displaying at least one of the asset data, the performance data, or the improvement measures on an output device in the form of at least one dashboard comprising at least one animated widgets.

9. The method of claim 1, wherein the improvement measures comprise at least one of a replacement of assets or changing an operation modus of an asset.

10. The method of claim 1, further comprising:

providing dedicated actions associated with the consumable resource based on the improvement measures, in the form of a project plan.

11. The method of claim 1, wherein the improvement measures comprise at least one of adjusting settings or configurations of dedicated actors or sensors in the one or more buildings.

12. A system for providing optimization or improvement measures for one or more buildings, the system comprising:

a unit configured to receive first asset data corresponding to assets of a category 1 in the one or more buildings, wherein the assets of the category 1 include at least one of the one or more buildings, components within such buildings, or at least one space within such buildings and wherein the first asset data comprises information regarding the location of the assets of category 1;

a unit configured to receive second asset data corresponding to assets of a category 2 in the one or more buildings, wherein the assets of the category 2 comprise at least one of the components within the technical infrastructure of such buildings and the second asset data comprises information regarding said technical infrastructure components;

a unit configured to receive third asset data of assets of a category 3 in the one or more buildings, wherein the assets of the category 3 comprise one or more spaces within such buildings and the third asset data comprises information regarding the physical structure of such one or more spaces;

a unit configured to receive performance data of the assets of category 1 and/or category 2 and/or category 3, wherein the performance data comprising operating data, usage data, and sensed data;

wherein the performance data of the assets of category 2 comprise an indication of the energy consumption of the ventilator drive and indications of the positions of the dampers; and a unit configured to determine, based on the first, the second, and the third asset data and on the performance data, improvement measures related to a consumable resource in the one or more buildings by using a computer system configured for analyzing the asset data and the respective performance data based on internal and/or external key performance indicators and rules;

wherein at least one of the internal key process indicators or external key process indicators comprise the indicated energy consumption of the ventilator drive at various position indications of the dampers, as well as the energy consumption specifications of the ventilator, wherein the rules are appropriate for concluding increased flow resistance in a specific air duct section or for concluding ventilator or damper impediment, and whereas the improvement measures comprise at least one of recommending inspection of ventilator, ventilator drive, damper, damper drive or air duct section, or inducing replacement thereof.

13. The system according to claim 12, wherein assets of category 2 comprise at least one of equipment for climate control, air ducts, dampers, lamps, chillers, boilers, controllers, building management system, access control, energy supply and control, or security or fire safety.

14. A computer-implemented method for providing optimization or improvement measures for one or more buildings, the method comprising:

receiving at a computer connection data concerning the one or more buildings, wherein the connection data at least comprise information regarding the location of the one or more buildings and/or regarding the local networks for traffic, electricity distribution or gas distribution and/or regarding local service providers or replacement component suppliers for the infrastructure of the building;

receiving at the computer infrastructure data concerning the one or more buildings, wherein the infrastructure data at least comprise information regarding systems of the one or more buildings for heating, ventilating or cooling, for access control, for intrusion detection, for fire detection, for lighting, for elevator control, for electricity distribution, for electricity generation, or for heat collection;

receiving at the computer structural data concerning the one or more buildings, wherein the structural data at least comprise information regarding:

an orientation of the one or more buildings, or a building envelope, including data regarding building materials and material properties including at least one of heat flow resistance, heat capacity, or sound transmission, or an inner structure of the one or more buildings, including data regarding at least one of walls, rooms and designated intended use of rooms, doors, stairs, or elevators;

storing the connection data, the infrastructure data, and the structural data in a memory device accessible by the computer;

receiving at the computer performance data associated in each case with the connection data, the infrastructure data, or the structural data, or subsets of these data, wherein the performance data comprise at least lifecycle data of a device or a part thereof, utility usage data, or sensed comfort data;

wherein assets of a category 2 comprise at least one ventilator drive that is operatively connected to a ventilator, or damper drives that are operatively connected to dampers, such ventilators and dampers being integrated into interconnected air ducts of the building;

asset data of the assets of category 2 comprise the air flow capacity and energy consumption specifications of such ventilators and comprise air flow capacity specifications of such dampers;

performance data of the assets of category 2 comprise an indication of the energy consumption of the ventilator drive and indications of the positions of the dampers; and determining by the computer, based on the connection data, the infrastructure data, the structural data and the performance data, improvement measures related to at least one consumable resource in the one or more buildings, wherein the computer uses key performance indicators and rules;

wherein at least one of the internal key process indicators or external key process indicators comprise the indicated energy consumption of the ventilator drive at various position indications of the dampers, as well as the energy consumption specifications of the ventilator, wherein the rules are appropriate for concluding increased flow resistance in a specific air duct section or for concluding ventilator or damper impediment, and whereas the improvement measures comprise at least one of recommending inspection of ventilator, ventilator drive, damper, damper drive or air duct section, or inducing replacement thereof.

15. The method of claim 14, wherein the improvement measures are determined by a least squares based regression analysis.

16. The method of claim 14, wherein the infrastructure data comprise location information regarding system components.

17. The method of claim 14, wherein the information regarding the inner structure comprises location information regarding at least one of computers, copy machines, printers, coffee machines, or refrigerators.

18. The method of claim 14, wherein the improvement measures comprise at least one of adding an infrastructure system component, adjusting an infrastructure system component, or replacing an infrastructure system component.

19. The method of claim 14, wherein at least one of the improvement measures reduces consumption of at least one consumable resource in the one or more buildings.

20. The method of claim 14, wherein the resource is water, air, electrical power, gas, oil, organic waste for heating, or sewage water for cooling.

21. The method of claim 14, wherein the receiving of the connection data, the infrastructure data, the structural data, and of the performance data, and providing of the improvement measures are performed via a web portal.

22. The method of claim 14, further comprising:

displaying information indicative to the improvement measure related to the respective consumable resource on an output device.

23. The method of claim 14, wherein the method is performed in a web-based service platform or in a building management system.

* * * * *